(12) United States Patent
Lee et al.

(10) Patent No.: US 8,515,990 B2
(45) Date of Patent: Aug. 20, 2013

(54) MOBILE TERMINAL AND METHOD OF MANAGING VIDEO USING METADATA THEREIN

(75) Inventors: Choonsik Lee, Seoul (KR); Younghun Nam, Seoul (KR); Donghyun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/193,516

(22) Filed: Jul. 28, 2011

(65) Prior Publication Data

US 2012/0131043 A1 May 24, 2012

(30) Foreign Application Priority Data

Nov. 19, 2010 (KR) .......... 10-2010-0115509
Nov. 22, 2010 (KR) .......... 10-2010-0116024

(51) Int. Cl.
*G06F 17/30* (2006.01)

(52) U.S. Cl.
USPC ..... 707/769; 707/758; 707/705; 707/E17.014

(58) Field of Classification Search
USPC .......... 707/769, 758, E17.014, 705, 999.001, 707/999.002, 999.003, 999.004, 999.005, 707/999.006
See application file for complete search history.

(56) References Cited

U.S. PATENT DOCUMENTS

| | | | |
|---|---|---|---|
| 6,731,825 B1 * | 5/2004 | Acampora et al. | 382/284 |
| 2003/0093810 A1 * | 5/2003 | Taniguchi | 725/112 |
| 2008/0016541 A1 * | 1/2008 | Murakami et al. | 725/114 |
| 2008/0193099 A1 * | 8/2008 | Nakai et al. | 386/52 |
| 2009/0094520 A1 * | 4/2009 | Kulas | 715/723 |
| 2009/0132924 A1 * | 5/2009 | Vasa et al. | 715/723 |
| 2012/0079380 A1 * | 3/2012 | Tsai et al. | 715/716 |

* cited by examiner

*Primary Examiner* — Mahesh Dwivedi
*Assistant Examiner* — Shiow-Jy Fan
(74) *Attorney, Agent, or Firm* — Lee, Hong, Degerman, Kang & Waimey

(57) ABSTRACT

A mobile terminal and method of managing a video using metadata therein are disclosed, by which videos matching search conditions of various types can be found. The present invention includes searching for metadata set on each of at least one partial section included in each of at least one video, obtaining an identification information on each of the at least one partial section having the found metadata set thereon, obtaining a section information on each of the at least one partial section having the found metadata set thereon, and displaying the obtained identification or section information.

18 Claims, 58 Drawing Sheets

```
        1571  1571-1        1571-2              1571-3         1571-4
              |  07:00      |  15:00            |  25:00       |  30:00
Video 1  | Question 1-1 | Correct answer 1-1 | Question 1-2 | Correct answer 1-2 |

1572  1572-1        1572-2              1572-3         1572-4
              |  07:00      |  15:00            |  25:00       |  30:00
Video 2  | Question 2-1 | Correct answer 2-1 | Question 2-2 | Correct answer 2-2 |

1573  1573-1        1573-2              1573-3         1573-4
              |  07:00      |  15:00            |  25:00       |  30:00
Video 3  | Question 3-1 | Correct answer 3-1 | Question 3-2 | Correct answer 3-2 |
```

FIG. 15F

```
        1581              1581-1                  1581-2
         |  03:00         |  05:00        08:00    |  10:00
Video 1  |         | Match 1-1 |         | Mismatch 1-1 |

1582-1  1582-2           1582-3        1582
         |  02:00 | 03:00  05:00  |  07:00              10:00
Video 2  | Mismatch 2-1 | Match 2-1 |   | Match 2-2 |         |

1583              1583-1                  1583-2
         |  02:00         |  05:00        08:00    |  10:00
Video 3  |      | Match 3-1 |              | Mismatch 3-1 |
```

| Output setting |
|---|
| 1. 1st target preferential output |
| 2. 2nd target preferential output |
| 3. Simultaneous output |

(a)

(b)

(a)

(b)

(a)

(b)

(a)          (b)

(a)

(b)

(a)

(b)

MOBILE TERMINAL AND METHOD OF MANAGING VIDEO USING METADATA THEREIN

CROSS-REFERENCE TO RELATED APPLICATIONS

Pursuant to 35 U.S.C. §119(a), this application claims the benefit of earlier filing date and right of priority to Korean Patent Application Nos. 10-2010-0115509, filed on Nov. 19, 2010, and 10-2010-0116024, filed on Nov. 22, 2010, the contents of which are hereby incorporated by reference herein in their entirety.

BACKGROUND OF THE INVENTION

1. Field of the Invention

The present invention relates to a mobile terminal, and more particularly, to a mobile terminal and method of managing a video using metadata therein. Although the present invention is suitable for a wide scope of applications, it is particularly suitable for managing a video using metadata.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

Generally, metadata plays a role in providing creation information on a corresponding content. For instance, in case of playing a video (i.e., example of a content), the mobile terminal is able to just provide an information on a created date of the video or an information on a person having created the video.

According to the related art, in case of receiving an input of a search condition, the mobile terminal searches for a video matching the inputted search condition and is then able to provide the found video to a user.

However, since metadata settable on a search target video is limited, a form of an inputtable search condition is limited as well. Moreover, in searching for a video matching a search condition, the related art does not provide information on a detailed part corresponding to the search condition within the found video at all. Therefore, a user is unable to check whether the detailed part substantially corresponds to the search condition within the video to correspond to the search condition.

According to the related art, in case of attempting to edit a video, the mobile terminal is able to receive a selection of a part to be edited in the course of playing the video to be actually edited.

However, the related art does not provide a method or means for editing an editing target video without using the editing target video in direct. Moreover, the related art does not provide a method or means for creating a new video by selecting and using a plurality of partial sections respectively included in a plurality of videos.

SUMMARY OF THE INVENTION

Accordingly, the present invention is directed to a mobile terminal and method of managing a video using metadata therein that substantially obviate one or more problems due to limitations and disadvantages of the related art.

An object of the present invention is to provide a mobile terminal and method of managing a video using metadata therein, by which videos matching search conditions of various types can be found.

Another object of the present invention is to provide a mobile terminal and method of managing a video using metadata therein, by which identification or section information on a partial section having a found metadata set thereon can be provided.

Another object of the present invention is to provide a mobile terminal and method of managing a video using metadata therein, by which a new video can b created using at least one partial section included in each of at least one or more videos.

A further object of the present invention is to provide a mobile terminal and method of managing a video using metadata therein, by which a new video including at least one partial section included in each of at least one or more videos can be created using a corresponding metadata only without searching or playing the at least one or more videos.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a controller searching for metadata set on each of at least one partial section included in each of at least one video, the controller obtaining an identification or section information on each of the at least one partial section having the found metadata set thereon and an output unit displaying the obtained identification or section information under the control of the controller. Moreover, the at least one partial section includes a partial section corresponding to at least one selected from the group consisting of an object having the metadata set thereon within the corresponding video, a still image having the metadata set thereon within the corresponding video and a partial video having the metadata set thereon within the corresponding video.

In another aspect of the present invention, a method of managing a video in a mobile terminal includes the steps of searching for metadata set on each of at least one partial section included in each of at least one video, obtaining an identification information on each of the at least one partial section having the found metadata set thereon, obtaining a section information on each of the at least one partial section having the found metadata set thereon, and displaying the obtained identification or section information. Moreover, the at least one partial section includes a partial section corresponding to at least one selected from the group consisting of an object having the metadata set thereon within the corresponding video, a still image having the metadata set thereon within the corresponding video and a partial video having the metadata set thereon within the corresponding video.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 15A to 15F are diagrams of screen configurations for displaying a metadata set section included in each of a plurality of videos according to the present invention;

FIGS. 21A to 21D are diagrams of screen configurations for setting a divergence related metadata added to a combined metadata according to the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
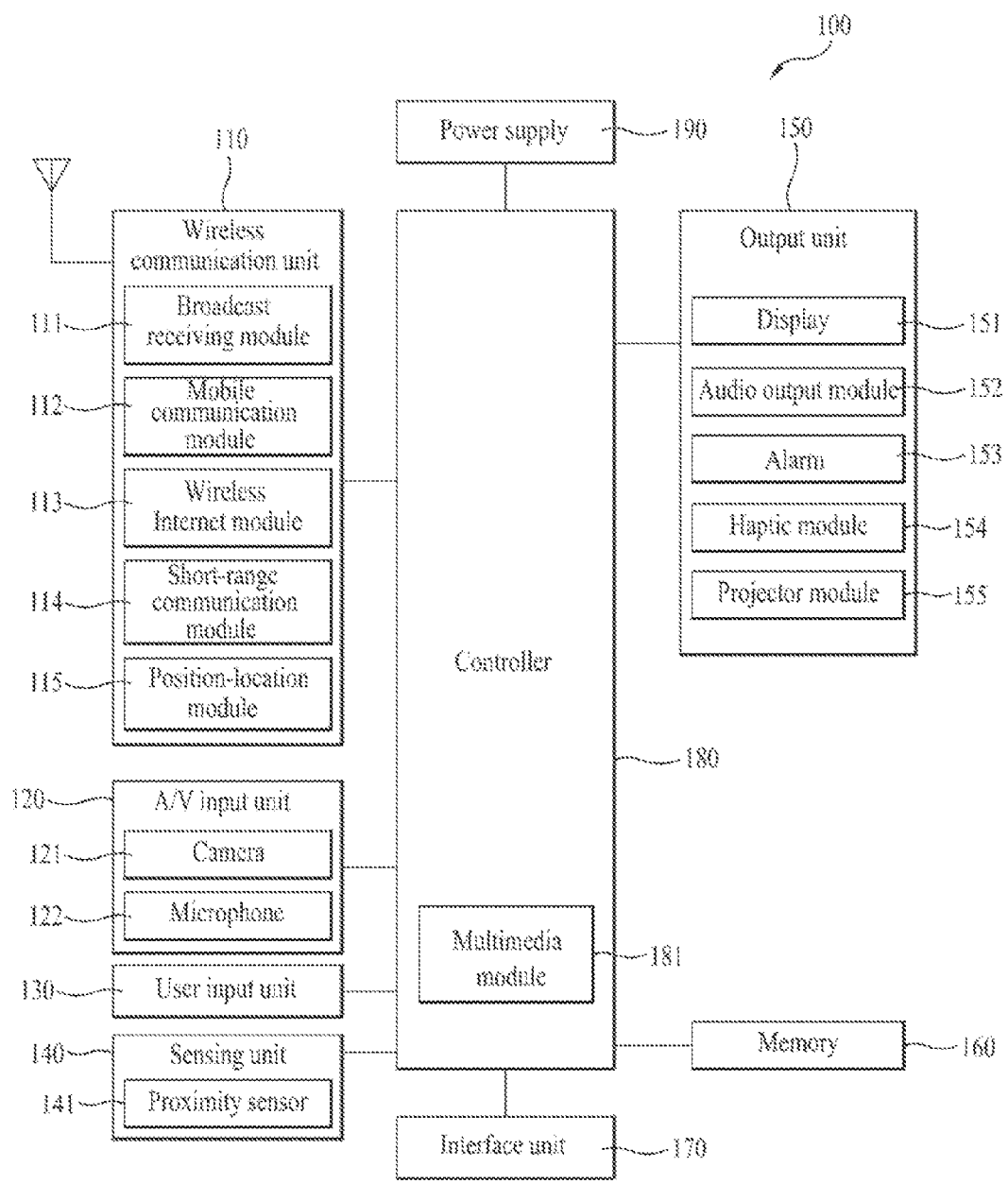
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

According to one embodiment of the present invention, the above-described video searching and editing methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

First of all, a mobile terminal mentioned in the following description can include at least one of the components shown in FIG. 1. Moreover, the mobile terminal can include a wireless communication unit 110 configured to transceive data with an external server via a network.

Contents or data, on which the metadata mentioned in the present specification can be set, can include images (e.g., still images, videos, etc.), audios, document files, flash files, applications, web documents, webpages and the like, by which the present invention is non-limited.

In case that a corresponding content is an image, a metadata can be set on the image or a specific object included in the image. In particular, if a corresponding content is a video, a metadata can be set on a specific one of a plurality of still images included in the video.

Metadata (or attribute information) mentioned in the present specification is the data set on a content according to a predetermined rule to describe or define data. The metadata is usable for the purpose of representing a corresponding content. And, the metadata is also usable for the purpose of finding a corresponding content quickly.

For instance, a date/hour information of creation of a metadata set content or a date/hour information of upload to a content managing server, a creation subject information (e.g., person or terminal information) of a corresponding content or an upload subject information of a corresponding content, a weather information (e.g., temperature, humidity, etc.) on creation of a corresponding content, a terminal position information on a corresponding content creation and the like can be included in the metadata.

Moreover, a comment information (e.g., comment) on a corresponding content, an information (e.g., phone number, blog address, ID information registered with a social network service, etc.) on a specific terminal (or a specific person), a history information (e.g., information on terminals having used a corresponding content, etc.) on a use of the corresponding content, an information searched from a web server using a corresponding content or a specific object included in the corresponding content and the like can be included in the metadata.

Assuming that a corresponding content is an image, a specific object itself included in the image, a position information of a specific object included in the image, a sex distinction index (or a sex distributed extent) of persons included in the image, an activity index (or a motion extent) of objects included in the image, a color index (or a color distribution extent) of color included in the image and the like can be included in the metadata.

Assuming that a corresponding content is a video, a motion pattern (e.g., motion of interest: MOD for a predetermined period of time of a specific object included in the video, a mark information on a specific part (e.g., an interval between 30 seconds and 1 minute from a play start point, etc.) within the video and the like can be included in the metadata.

Identification information on a content having metadata set thereon is included in the metadata. And, an identification information on a metadata set on a content can be included in the corresponding content. This is to search for a content having a metadata set thereon using the corresponding metadata and to search for a content set on the metadata using the corresponding content. In this case, regarding the identification information, any information for identifying a corresponding content or a corresponding metadata is non-limited by its type or configuration.

Metadata can be stored and managed separately from a content having the metadata set thereon. Alternatively, the metadata can be stored and managed in a manner of being included in the content having the metadata set thereon.

Of course, the metadata is non-limited by the above examples and can be set to have more various information in association with the corresponding content. The settings of the metadata shall be described in detail later.

In the following description, a metadata managing system, to which the present invention is applicable, is described with reference to FIG. 2. In the following description, a transmission by a terminal (or a reception by a server) conceptually includes an upload. And, a reception by a terminal (or a transmission by a server) can conceptionally include a download.

Figure 2:
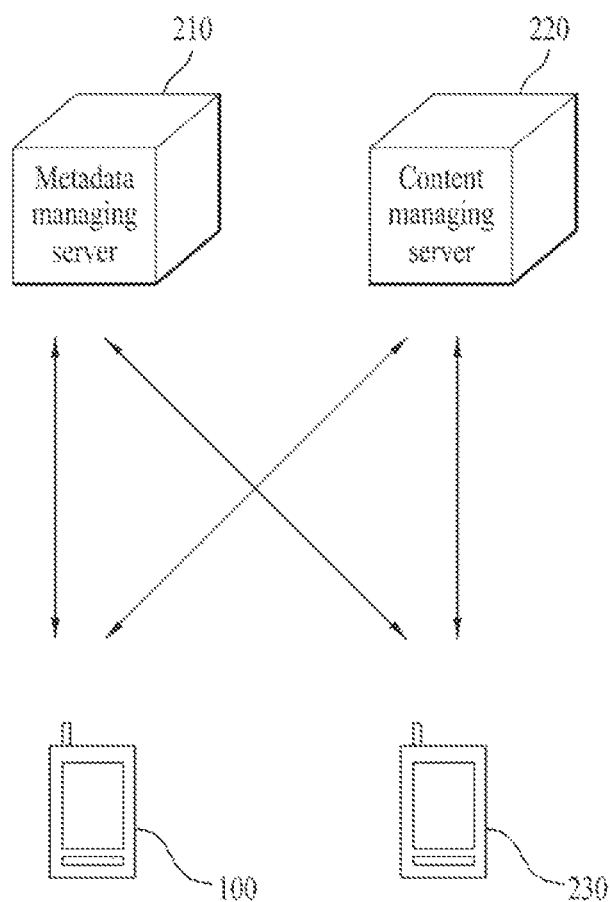
FIG. 2 is a diagram of a metadata managing system according to the present invention.

FIG. 2 is a diagram of a metadata management system according to the present invention.

Referring to FIG. 2, a metadata management system according to the present invention includes a metadata managing server 210 configured to manage and store metadata, a content managing server 220 configured to manage and store contents, and a plurality of terminals (e.g., a mobile terminal 110 and a counterpart terminal 230 included) configured to transceive the metadata and the contents with the metadata managing server 210 and the content managing server 220, respectively.

The mobile terminal 100 or the counterpart terminal 230 transmits a content to the content managing server 220 and is also able to transmit a metadata set on the transmitted content to the metadata managing server 210.

The mobile terminal 100 or the counterpart terminal 230 receives the content stored in the content managing server 220 from the content managing server 220 and is able to receive the metadata set on the received content from the metadata managing server 210.

For instance, the content managing server 220 provides the metadata managing server 210 with the identification information of the content currently provided to the mobile terminal 100. And, the metadata managing server 210 is able to provide the mobile terminal 100 with the metadata containing the provided identification information as the metadata set on the content currently provided to the mobile terminal 100.

So to speak, the mobile terminal 100 is able to individually transceive the metadata and the content having the metadata set thereon with the servers 210, 220 for managing and storing the metadata and the content, respectively.

Therefore, a plurality of the terminals 100 and 230 can share the metadata and the metadata set content with each other via the metadata managing server 210 and the content managing server 220.

If the terminals are accessible to the metadata managing server 210 and the content managing server 220, they can share the metadata and the corresponding metadata set content with each other. Alternatively, only the terminals registered with the metadata and contents sharing service are allowed to share the metadata and the metadata set contents with each other.

Furthermore, the mobile terminal 100 is able to set a restriction condition on a content and a metadata set on the content. In this case, the restriction condition can be set as a sort of metadata. And, identification information of the corresponding content or identification information of the corresponding metadata can be included in the metadata including the restriction condition.

For instance, the mobile terminal 100 is able to put restriction on a content transmitted by the mobile terminal 100 itself or a specific metadata set on the corresponding content so that the corresponding content or the corresponding metadata is not available for a specific terminal. In this case, a specific terminal information (e.g., a phone number, an IP address, etc.) can be further set to the metadata. Therefore, if the specific terminal makes a request for a specific content transmission, the content managing server 220 transmits a content identification information and a specific terminal information to the metadata managing server 210. If the received specific terminal information matches a previously stored specific terminal information as metadata and a content identification information included in the matched metadata matches the received content identification information, the metadata managing server 210 does not provide the specific terminal with specific metadata or informs the content managing server of the match information not to provide the transmission requested content.

The restriction condition can further include at least one of a use time information, a use place information and the like. Therefore, the content or metadata may not be provided to terminals belonging (or not belonging) to a time zone corresponding to the use time information set as the restriction condition or a place corresponding to the use place information [cf. a case of setting a restriction condition to a specific terminal].

According to the above description, the metadata and the metadata-set content are managed and stored by the corresponding servers 210 and 220, respectively. Yet, the metadata and the metadata-set content can be managed by an integrated server by separating storage regions of the metadata and the metadata content from each other. Moreover, the metadata can be stored and managed in a manner of being contained in the content on which the metadata is set. In other words, the metadata and the corresponding metadata-set content can be stored and managed as one data instead of being managed and stored as separate data.

In the following description, a method of searching for a video using metadata in a mobile terminal is explained in detail with reference to the accompanying drawings. For clarity and convenience of the following description, a search target content is limited to a video.

Figure 3:
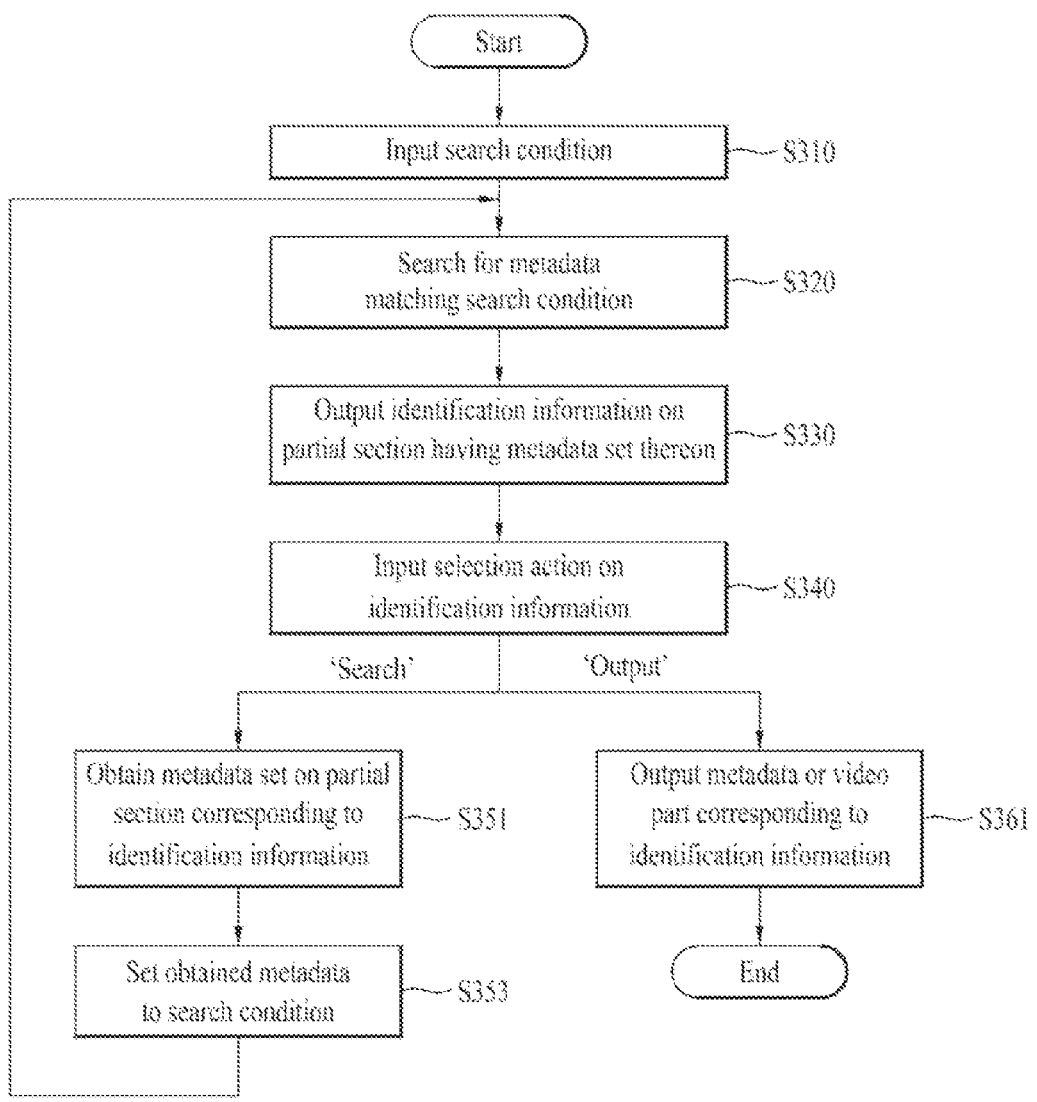
FIG. 3 is a flowchart for a method of searching for a video using metadata in a mobile terminal according to one embodiment of the present invention.

FIG. 3 is a flowchart for a method of searching for a video using metadata in a mobile terminal according to one embodiment of the present invention.

Referring to FIG. 3, the mobile terminal 100 receives an input of a search condition for searching for a video using the user input unit 130 [S310].

In particular, the search condition can mean the condition for searching metadata matching the search condition for metadata set on at least one partial section included in the video. Moreover, the search condition can mean the condition for searching for at least one partial section, on which the metadata matching the search condition is set, and a video including the at least one partial section.

In the following description, the search condition inputting step S310 is explained in detail with reference to FIGS. 4A to 4H.

FIGS. 4A to 4H are diagrams for receiving a search condition according to the present invention.

Figure 4A:
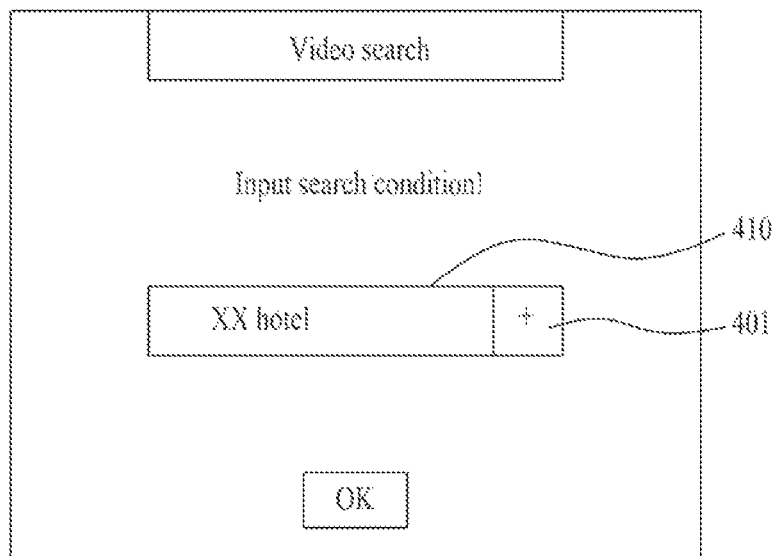
FIGS. 4A to 4H are diagrams for receiving a search condition according to the present invention.
Figure 4A:
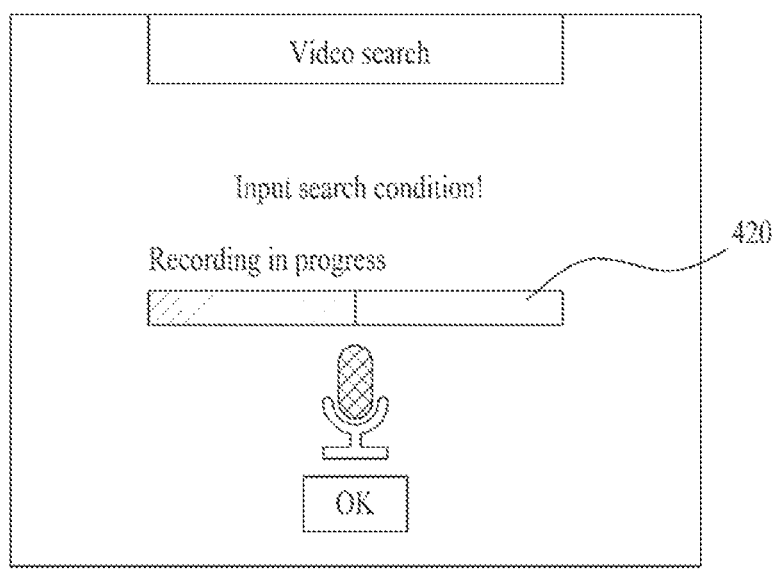

FIG. 4A shows a search condition input using a text or voice.

Referring to FIG. 4A, the mobile terminal 100 receives an input of a search condition including a text (optionally, numerals, symbols and the like can be included) via a keypad manipulation performed by a user [FIG. 4A (a)] or is able to receive a search condition corresponding to a voice inputted via the microphone 122 [FIG. 4A (b)].

For instance, no limitation is put on a type of the search condition inputted as the text or voice unless such a search condition type as a keyword, a place, a name, a building name, a person name, a date, a weather, a color, an object type and the like is unable to indicate metadata.

In particular, referring to FIG. 4A (a), the inputted search condition can be displayed on a search condition input window 410. If an add zone (+) 401 is selected, a plurality of search conditions are inputtable. Referring to FIG. 4A (b), a progress 420 in recording the voice inputted via the microphone 122 is displayed on the screen. If the voice recording is completed, the recorded voice can be inputted as a search condition.

In FIG. 4A, a plurality of search conditions (e.g., 2 text inputs, 2 voice inputs, 1 text input & 1 voice input, etc.) are inputtable. Alternatively, a condition (OR condition) for including at least one of a plurality of search conditions is inputtable as a search condition. Alternatively, a condition (AND condition) for including all of a plurality of search conditions is inputtable as a search condition. Alternatively, 'condition not to include something' or 'condition to include something' is inputtable as a search condition.

Figure 4B:
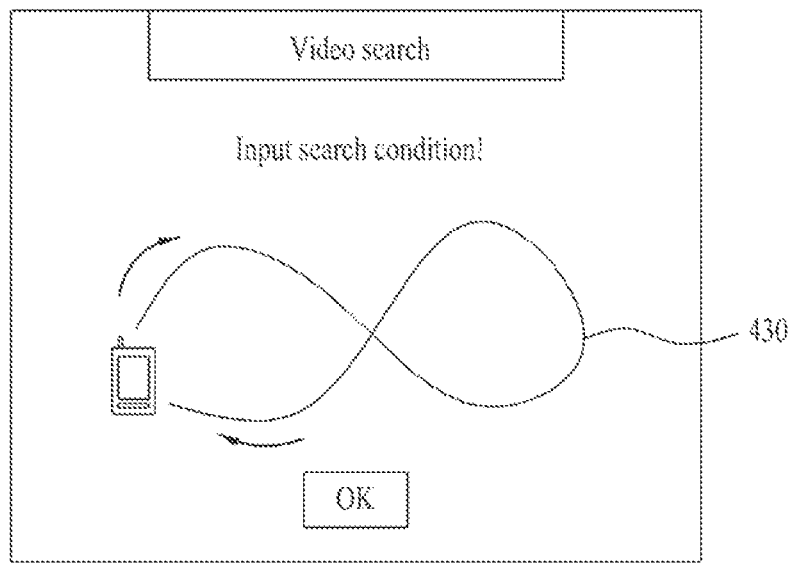

FIG. 4B shows a search condition input using a terminal motion.

Referring to FIG. 4B, the mobile terminal 100 detects a terminal motion having a predetermined motion pattern 430 and is then able to receive an input of the detected terminal motion as a search condition. In doing so, the motion pattern 430 can be displayed on the screen.

In this case, the motion pattern can be determined in accordance with a direction, distance, speed, size and the like of the terminal motion. In order to perform a search condition input, a user is able to shift the mobile terminal 100 to have a predetermined motion pattern artificially.

Figure 4C:
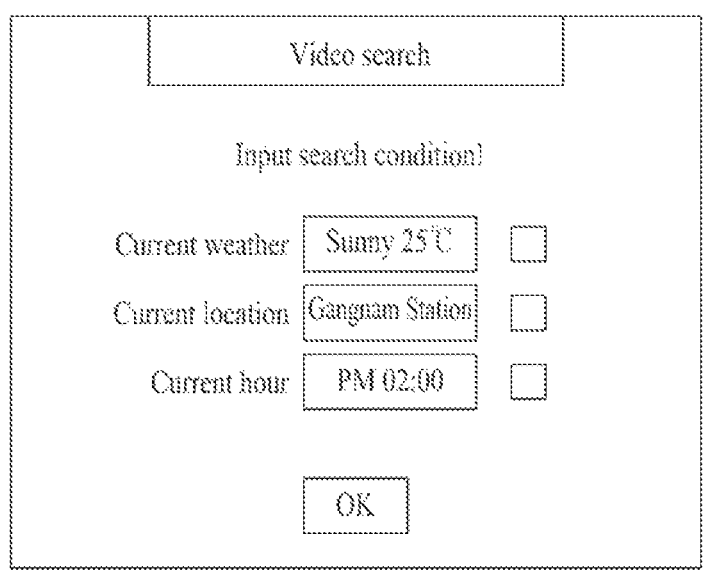

FIG. 4C shows a search condition input using a current status condition. In particular, the current status condition can include a condition reflecting such a current status as a current weather, a current location (or place), a current hour and the like.

Referring to FIG. 4C, the mobile terminal 100 is able to receive at least one of a current weather, a current location (or place) and a current hour as a search condition.

In this case, information on the current weather, current location (or place), or current hour is directly inputted by the user, is directly obtained by the mobile terminal 100, or can be received from an external server (not shown in the drawing).

Figure 4D:
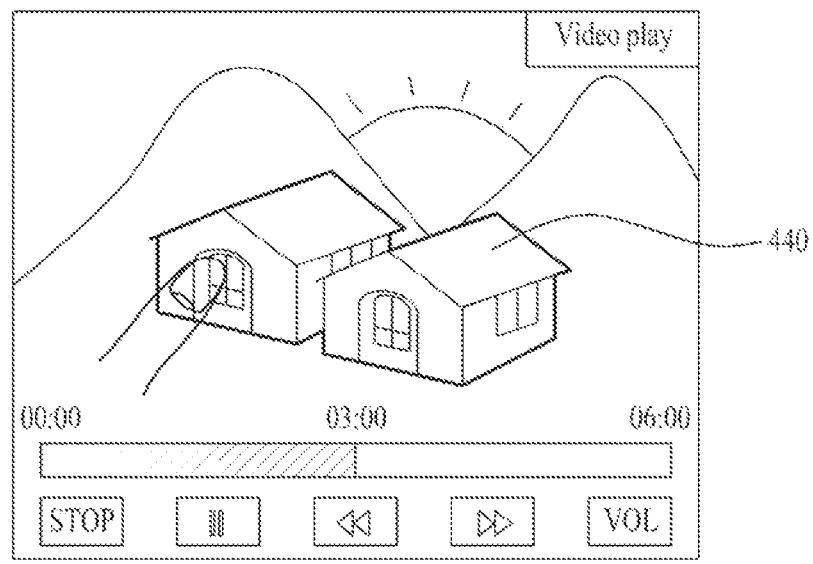
Figure 4D:
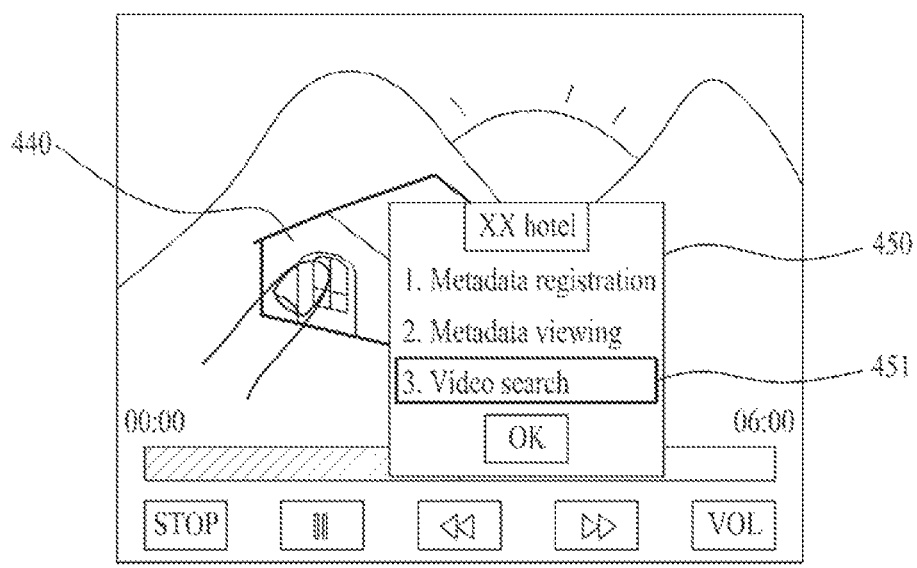

FIG. 4D shows a search condition input using a specific object. For clarity and convenience of the following description, assume that the specific object is included in a currently displayed image.

Referring to FIG. 4D, the mobile terminal 100 is able to receive an input of a selection action on a specific object 440 currently displayed on a screen from a user in the course of playing a video [FIG. 4D (a)]. In doing so, the user is able to input a selection action on each of at least one or more specific objects.

Moreover, the mobile terminal 100 is able to recognize an image region corresponding to the specific object 440. In this case, a method of recognizing an image region can include one of a grid scheme, an edge detection scheme, an object module scheme and the like.

For instance, according to the grid scheme, a displayed image is partitioned into a plurality of regions of a grid type. An object included in a region selected by a user from a plurality of the regions is selected as a specific object and the selected region is recognized as an image region of the specific object [Method 1]. Alternatively, a region including a specific object among a plurality of the regions can be recognized as an image region of a specific object [Method 2].

According to the edge detection scheme, after an edge or outline of a specific object has been detected, a line enclosing the specific object can be recognized as an image region of the specific object from the detected edge information [vector data] [Method 1] or a plane occupied by the specific object can be recognized as an image region of the specific object from the detected edge information [raster data] [Method 2].

According to the object model scheme, a model image corresponding to each of at least one object type is designated in advance and an image of an object matching the designated model image can be then recognized. For instance, if an object type is a building, one of a whole building image, an image of one side of the building, a partial building image and the like can be included in the model image.

As the mobile terminal 100 receives the input of the selection action on the specific object 440, the mobile terminal 100 is able to display a list 450 including operations executable in association with the specific object 400 [FIG. 4D (b)].

For instance, in the list 450, an operation corresponding to register the specific object 440 as a metadata of the corresponding video [metadata registration], an operation corresponding to viewing metadata set on the specific object 440 [metadata viewing], and an operation corresponding to inputting the specific object 400 as a video search condition [video search] can be included.

If the video search 451 is selected from the list 450, the mobile terminal 100 is able to receive the specific object 400 as a search condition.

Moreover, the mobile terminal 100 is able to receive an attribute of the specific object 440 as a search condition as well as the specific object 440 (i.e., the image region corresponding to the specific object 440).

For instance, the attribute of the specific object 440 can include various information (e.g., place, name, access information, object type, etc.) on the specific object 440.

Although the description with reference to FIG. 4D is limited to the video play state only, it is also applicable to a display state of at least one of a photographed image taken via the camera 121, a download image received from an external terminal, a download image received from an external server and the like.

Figure 4E:
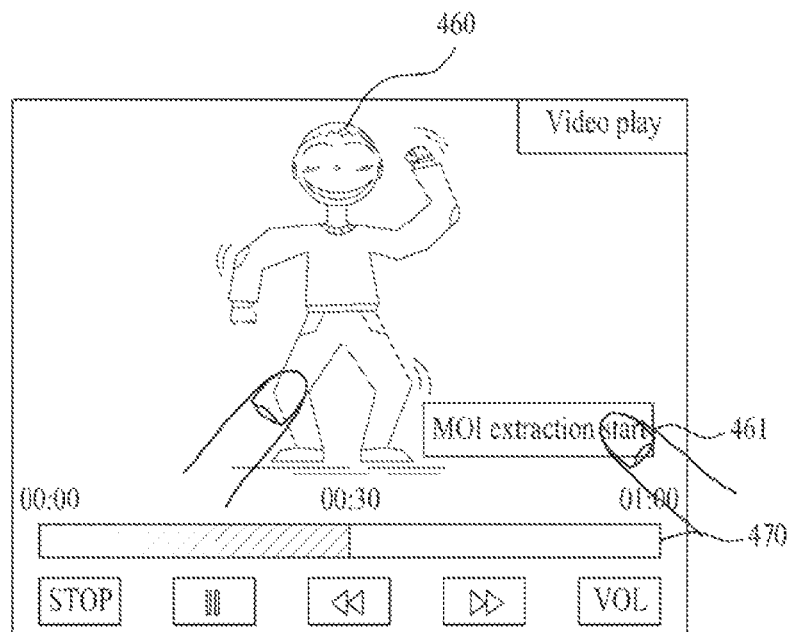
Figure 4E:
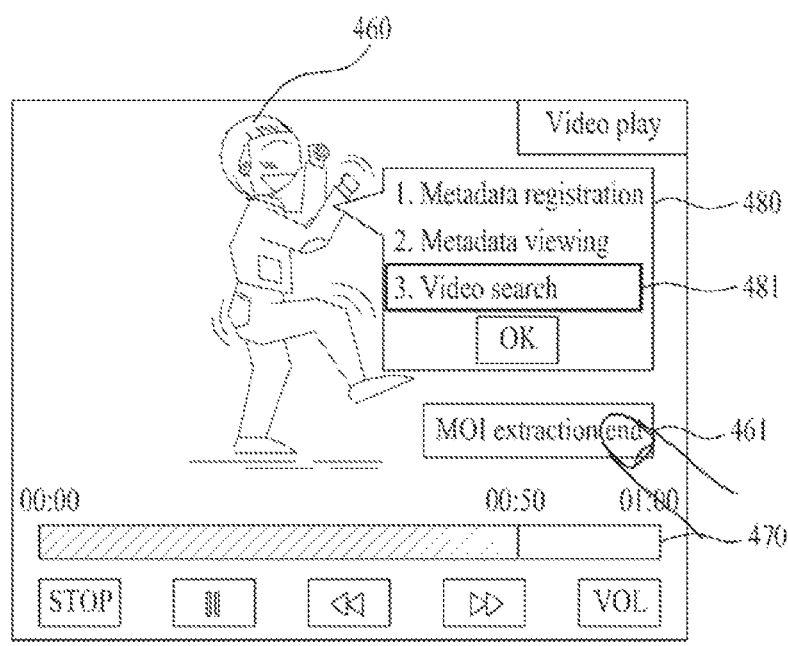

FIG. 4E shows a search condition input using a motion pattern of a specific object. In this case, the specific object can mean an object included in a displayed image in the course of playing or taking a video. Moreover, the motion pattern is a motion pattern of the specific pattern during a predetermined period of time and can be named a motion of interest (MOI).

Referring to FIG. 4E, in case of receiving an input of a touch action on a specific object 460 and an input of a touch action on an MOI extraction start command zone 461 from a user in the course of playing a video, the mobile terminal 100 obtains a motion pattern of the specific object 460 [FIG. 4E (a)].

In order to obtain the motion pattern of the specific object 460, it is able to use an image recognizing technique. In this case, the image recognizing technique includes one of a detecting technique and a tracking technique.

In particular, the detecting technique means that an image region corresponding to a specific object is detected from an image. And, the detecting technique is able to detect a plurality of image regions of a plurality of objects from a single image. Moreover, the detected image region can be identifiably displayed using such a looped curve as a rectangle, circle and the like. Meanwhile, the tracking technique is performed in a following manner. First of all, after an image region corresponding to a specific object has been detected from an image, the specific object keeps being tracked in accordance with a motion of the specific object. Moreover, the tracking technique is able to track a plurality of object in a single image. The detected image region can have a different position in the consecutive images in accordance with the motion of the specific object.

In case of receiving a touch action on an MOI extraction end command zone 461 from the user in the course of playing the video and obtaining the motion pattern of the specific object 460, the mobile terminal 100 is able to stop obtaining the motion pattern of the specific object 460 [FIG. 4E (b)]. In doing so, the video can keep being played back irrespective of whether the motion pattern stops being obtained.

Referring to FIG. 4E (b), the mobile terminal 100 is able to display a list 480 including operations executable in association with the obtained motion pattern of the specific object 460. In this case, the motion pattern of the specific object 460 is obtained during a period of time between the timing point of the touch to the MOI extraction start command zone 461 and the timing point of the touch to the MOI extraction end command zone 461. The description of the list 480 can refer to the former description of the list 450.

Therefore, if a video search 481 is selected from the list 480, the mobile terminal 100 is able to receive an input of the motion pattern of the specific object 460 corresponding to the predetermined period of time as a search condition.

Figure 4F:
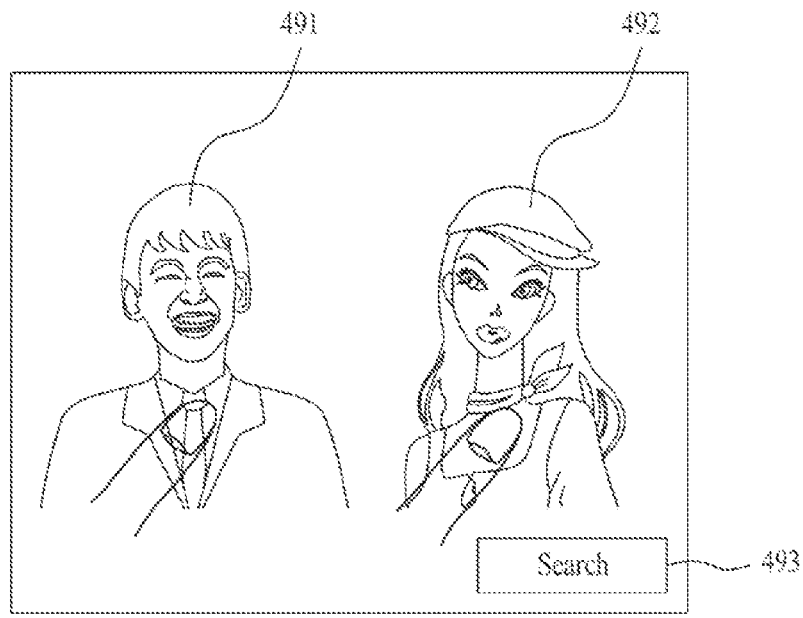
Figure 4F:
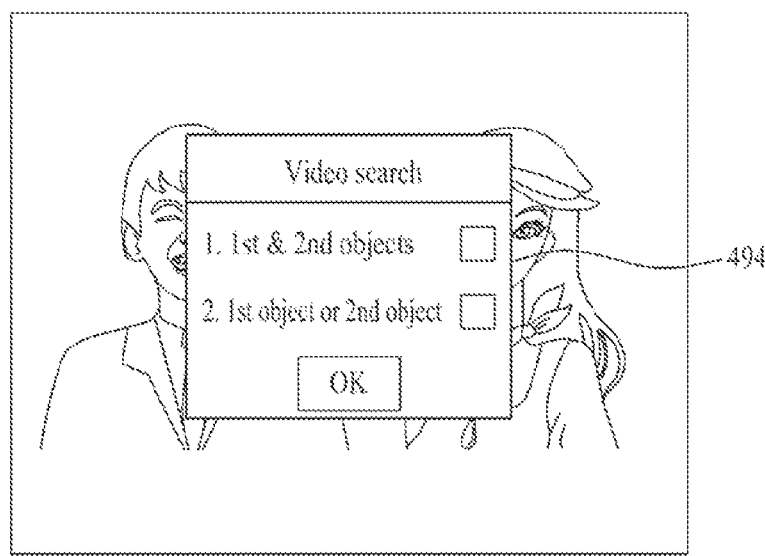

FIG. 4F shows a search condition input using a plurality of specific objects.

Referring to FIG. 4F, the mobile terminal 100 receives an input of a touch action on a first object 491 included in a currently displayed image and an input of a touch action on a second object 492 included in the currently displayed image and is also able to receive an input of a touch action on a video search command zone 493 [FIG. 4F (a)].

Subsequently, the mobile terminal 100 is able to display a window 494 for enabling a user to select whether to input both of the first and second objects 491 and 492 as a search condition (i.e., AND condition) or at least one of the first and second objects 491 and 492 as a search condition (i.e., OR condition) [FIG. 4F (b)].

Therefore, the mobile terminal 100 is able to input both of the first and second objects 491 and 492 as the search condition or the at least one of the first and second objects 491 and 492 as the search condition.

Figure 4G:
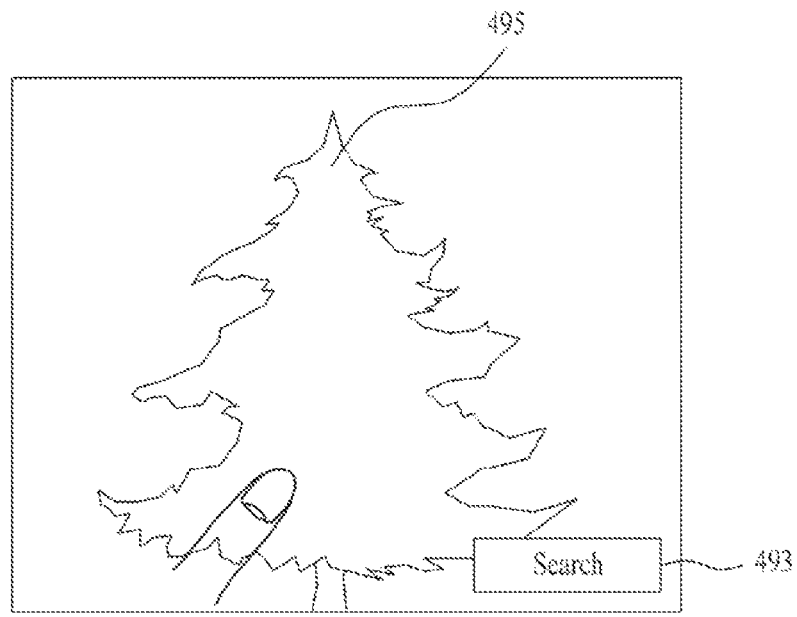
Figure 4G:
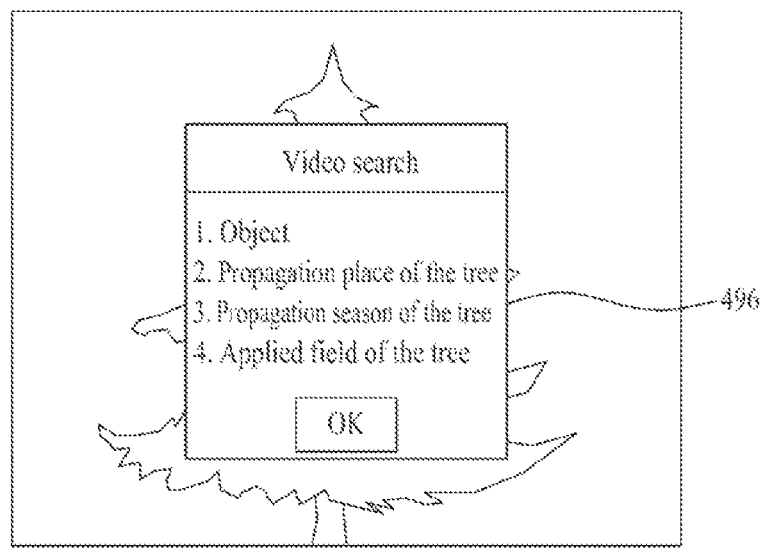

FIG. 4G shows a search condition input using a property of a specific object.

Referring to FIG. 4G, the mobile terminal 100 receives an input of a touch action on a specific object 495 included in a currently displayed image and is also able to receive an input of a touch action on a video search command zone 493 [FIG. 4G (a)].

In case that the specific object 495 is a tree, the mobile terminal 100 is able to display a search condition list 496 in consideration of such a property of the specific object 495 as the specific object 495 itself, a propagation place of the tree, a propagation season of the tree and an applied field of the tree.

For instance, if the propagation field of the tree is selected from the search condition list 496, the mobile terminal 100 is able to receive an input of a tree propagation place corresponding to the specific object 495 as a search condition.

If a specific object is a bird, the mobile terminal 100 receives an input of a bird's sound as a search condition. If a specific object is a singer, the mobile terminal 100 receives an input of a song of the corresponding singer as a search condition. If a specific object is a movie actor or actress, the mobile terminal 100 receives an input of a movie, in which the corresponding movie actor or actress appears, as a search condition.

Figure 4H:
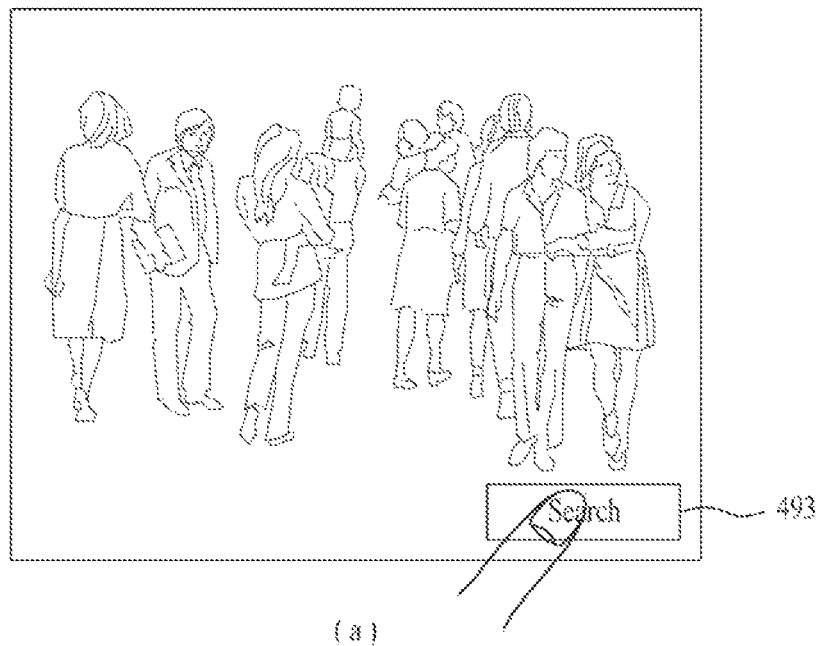
Figure 4H:
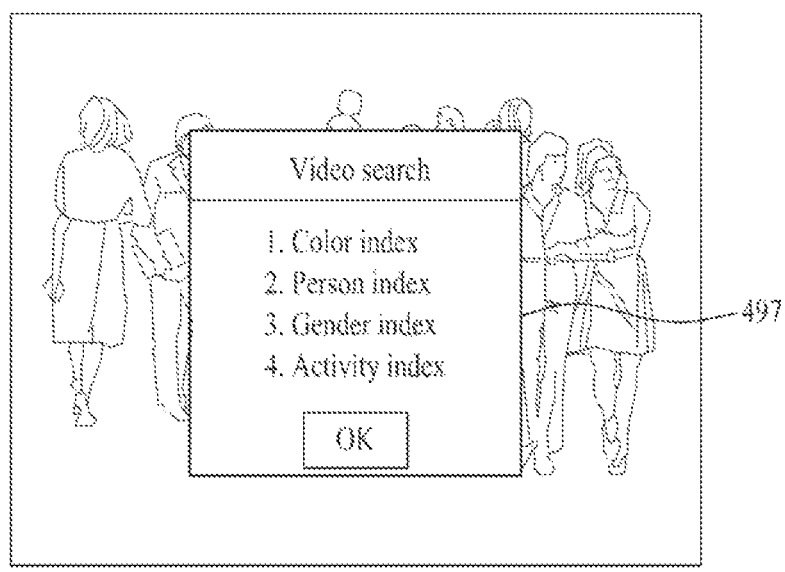

FIG. 4H shows a search condition input using an index.

Referring to FIG. 4H, in case of receiving an input of a touch action on a video search command zone 493 in the course of displaying a video [FIG. 4H (a)], the mobile terminal 100 is able to displays an index list 497 including indexes related to the currently displayed image [FIG. 4H (b)].

For instance, the indexes related to the video can include a color index indicating a video color distribution (e.g., blue 30, red 30 and green 40 with reference to total 100), a person index indicating the number of persons included in the image (e.g., index 10 indicating 1~10 persons, index 20 indicating 11~20 persons, etc.), a gender index indicating a distribution extent of males and females included in the video (e.g., male 30 and female 70 with reference to total 100), an activity index indicating a motion level of objects included in the video (e.g., an index set to a level equal to or higher than 50 in case of a high motion level, an index set to a level lower than 50 in case of a low motion level, etc.), and the like.

For instance, if the color index is selected from the index list 497, the mobile terminal 100 is able to receive an input of a color index of a currently displayed image as a search condition.

Meanwhile, when a specific object included in a currently displayed image is selected, if a position information of the specific object or a specific image matching the specific object is stored by being linked with a counterpart information (in a phonebook application), the mobile terminal 100 is able to receive an input of the corresponding counterpart information as a search condition [not shown in the drawing].

Referring now to FIG. 3, the mobile terminal 100 searches for a metadata set on at least one partial section included in the video as the metadata matching the inputted search condition [S320].

In this case, the partial section is able to include a partial section corresponding to at least one of an object, a still image and a partial video, on each of which the metadata corresponding to the inputted search condition is set. In particular, the partial section corresponding to the metadata set object, still image or partial video can mean a section constructed with at least one still image containing a corresponding object, a section constructed with a corresponding still image, or a section constructed with a corresponding partial video.

In the searching step S320, the mobile terminal 100 searches for the metadata matching the inputted search condition and is also able to obtain an identification information of the corresponding partial section having the found metadata set thereon and an identification information of the corresponding video.

Therefore, the mobile terminal 100 is able to search for the partial section, on which the metadata matching the inputted search condition is set, and the video including the corresponding partial section. In doing so, the identification information of the corresponding partial section and the identification information of the corresponding video are included in the corresponding metadata or can configure a metadata by themselves.

In particular, in case that a partial section corresponds to a specific partial video, a mark information on the specific partial video can be set to a metadata of the specific partial video. In this case, the mark information is usable as the aforesaid identification information.

For instance, if a play time of a whole video is 5 minutes and a specific partial video corresponds to a section between 2 minutes and 3 minutes from a play start timing point of the specific partial video, a mark information indicating 'between 2 minutes and 3 minutes from a play start timing point' can be set to a metadata of the specific partial video.

In the searching step S320, the mobile terminal 100 searches for the metadata matching the inputted search condition and is then able to search for at least one video including the partial section, on which the found metadata is set, under the control of the controller 180.

In case that a metadata is stored in a manner of being included in a video instead of being stored separately from the video, the mobile terminal 100 is able to directly search for the video including the metadata matching the inputted search condition. In this case, the metadata can include the identification on the corresponding partial section or can be included in the corresponding partial section.

In the following description, a metadata, which is searched per search condition, is explained in detail First of all, if a search condition is a specific movie actor name (cf. the text or voice input shown in FIG. 4A) or an object corresponding to the specific movie actor (cf. the specific object selection shown in FIG. 4D), it is able to search for a name of the specific movie actor, an appearance movie of the specific movie actor, an image of the specific movie actor, an SNS ID of the specific movie actor, a comment information on the specific movie actor, a web article relevant to the specific movie actor, a website comment relevant to the specific movie actor or the like as a metadata corresponding to the search condition.

If a search condition is a current weather/place/hour (cf. FIG. 4C), it is able to search for weather/place/hour equal or similar to the current weather/place/hour as a metadata corresponding to the search condition. If a search condition is a specific terminal motion pattern (cf. FIG. 4B), it is able to search for a pattern equal to similar to the specific terminal motion pattern as a metadata corresponding to the search condition.

If a search condition includes a specific person and a specific thing (i.e., selection of a plurality of objects), it is able to search for an image, which shows that the specific person possesses the specific thing, or an object as a metadata corresponding to the search condition. If a search condition is a tree (cf. FIG. 4G), it is able to search for a tree itself (object or name), a propagation place of the tree, a propagation season of the tree and an applied field of the tree as metadata corresponding to the search condition. If a search condition is an object corresponding to a bird, it is able to search for a bird itself (name or object) or a bird's sound as a metadata corresponding to the search condition.

Moreover, the mobile terminal 100 automatically sets a search condition to a predetermined state instead of using the search condition inputted by the user in the searching step S320 and is then able to search for the corresponding metadata.

For instance, if a person index of a currently displayed screen is 10, the mobile terminal 100 sets a search condition to a person index equal to or smaller than 10 and is then able to search for the metadata matching the person index equal to or smaller than 10. For another instance, if a current face expression of a user is gloomy (according to a face recognition program), the mobile terminal 100 automatically sets a search condition to an activity index equal to or greater than a predetermined reference or a color index equal to or greater than a predetermined reference and is then able to search for the metadata matching the activity index equal to or greater than the predetermined reference or the color index equal to or greater than the predetermined reference.

If a current temperature is equal to or lower than a predetermined reference, the mobile terminal 100 sets a search condition to a temperature over or below the current temperature and is then able to search for the metadata matching the temperature over or below the current temperature. If a position information of a currently displayed image is a specific place or a current position of a terminal is a specific place, the mobile terminal 100 automatically sets a search condition to the specific place and is then able to search for the metadata having the position information set to the specific place.

If a current temperature is equal to or higher than a predetermined reference, the mobile terminal 100 sets a search condition to sea_object, ice_object (i.e., example of a cool object) or the like and is then able to search for the metadata matching the sea_object, the ice_object or the like.

Metadata and video (i.e., search targets) are stored and managed by the mobile terminal 100 [Case (1)] [hereinafter named a first method]. Alternatively, metadata and video (i.e., search targets) are stored and managed by the metadata managing server 210 and the content managing server 220 [Case (2)] [hereinafter named a second method]. In the following description, a metadata and video searching process is explained in detail for Case (1) and Case (2) separately.

A metadata and video searching process according to a first method is described as follows.

First of all, the mobile terminal 100 enables metadata and video to be stored in the memory 160. The mobile terminal 100 is able to further include a separate storage means for storing metadata and video. The mobile terminal 100 is able to store metadata and video in individual storage regions, respectively, or is able to store metadata and video together in a manner that the metadata is included in the corresponding video. Specifically, in the latter case, a metadata field among a plurality of data fields of the corresponding video is separately provided so that the corresponding metadata can be included in the metadata field.

Moreover, metadata is stored and managed by the mobile terminal 100, while video is stored and managed by the content managing server 220 [1]. On the other hand, metadata is stored and managed by the metadata managing server 210, while video is stored and managed by the mobile terminal 100.

Figure 5A:
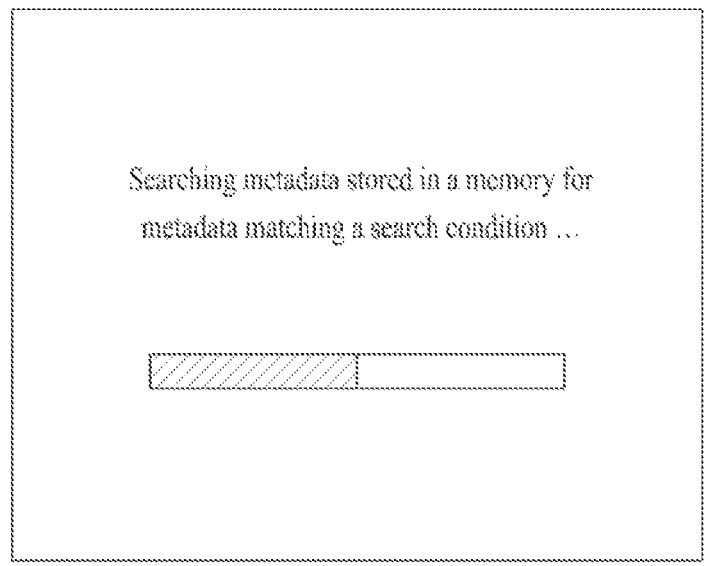
FIG. 5A and FIG. 5B are diagrams for searching for a metadata matching a search condition according to the present invention.
Figure 5A:
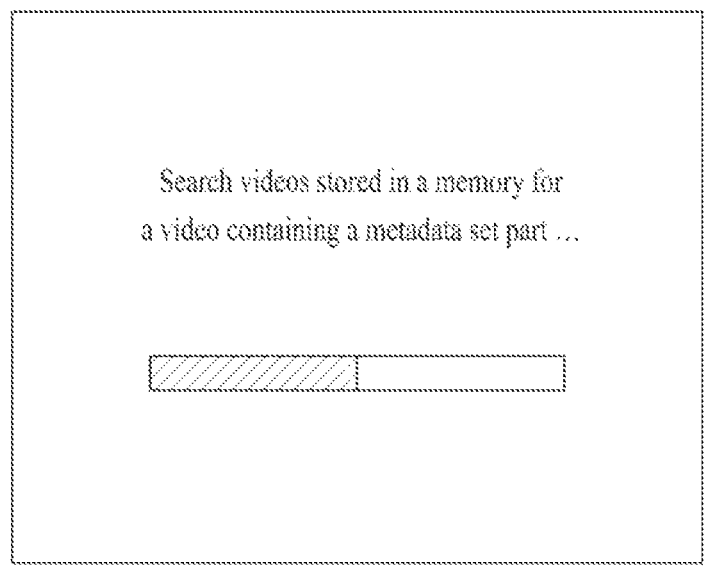

Therefore, the mobile terminal 100 searches at least one or more data stored in the memory 160 for the metadata matching the inputted search condition and is also able to search at least one or more videos for the video including the found metadata set partial section. For instance, FIG. 5A (a) shows a process for searching the memory 160 for metadata, For instance, FIG. 5A (a) shows a process for searching the memory 160 for metadata, while FIG. 5A (b) shows a process for searching for the memory 160 for a video.

In particular, the mobile terminal 100 searches the memory 160 for the metadata matching the inputted search condition. If the found metadata contains a video identification information and a partial section identification information, the mobile terminal 100 searches the memory 160 for the video corresponding to the video identification information and is able to check the partial section corresponding to the partial section identification information from the found video.

In the following description, a metadata and video searching process according to the second method is explained.

First of all, the metadata managing server 210 stores and manages metadata set in association with a video, while the content managing server 220 stores and manages a video.

Meanwhile, in case that metadata is included in a corresponding video, both of the metadata and the corresponding video can be stored and managed by an integrated server. In this case, the integrated server can include the content managing server 220.

The mobile terminal 100 is able to transmit a metadata search request signal containing the inputted search condition to the metadata managing server 210 using the wireless communication unit 110 under the control of the controller 180.

Figure 5B:
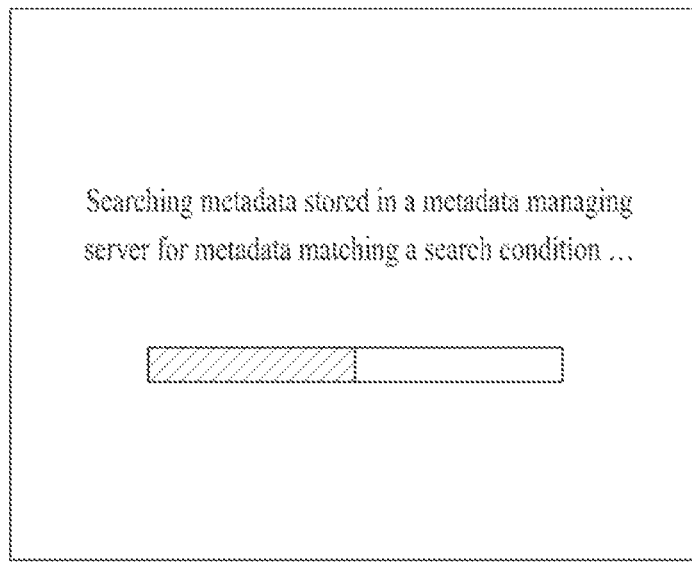
Figure 5B:

The mobile terminal 100 accesses the metadata managing server 210 in accordance with the transmission of the metadata search request signal and is then able to search at least one or more metadata stored in the accessed metadata managing server 210 for the metadata matching the inputted search condition, under the control of the controller 180. Furthermore, the mobile terminal 100 accesses the content managing server 220 and is then able to search at least one or more videos stored in the accessed content managing server 220 for the video containing the partial section on which the found metadata is set. For instance, FIG. 5B (a) shows a process for searching the metadata managing server 210 for the metadata. And, FIG. 5B (b) shows a process for searching the content managing server 220 for the video.

In particular, if the found metadata contains a video identification information and a partial section identification information, the mobile terminal 100 searches the content managing server 220 for a video corresponding to the video identification information and is able to check the partial section corresponding to the partial section identification information from the found video.

According to the above description, in the searching step S320, the mobile terminal 100 is able to search for a metadata matching a search condition only [1], or is able to search for a metadata matching a search condition and a video containing at least one partial section having the metadata set thereon.

The mobile terminal 100 outputs an identification information on each of the at least one partial section having the found metadata set thereon under the control of the controller 180 [S330]. In doing so, the outputting step S330 can be performed using the output unit 150.

In the outputting step S330, in order to output the identification information, the mobile terminal 100 is able to identifiably display at least one region corresponding to each of the at least one partial section within a whole indicator corresponding to a whole video containing the at least one or more partial sections having the found metadata set thereon. Moreover, the mobile terminal 100 is able to display at least one of time information, metadata and type information of the partial section corresponding to each of the at least one region.

In this case, the whole indicator indicates the whole found video and is able to indicate a detailed play position of the found video. Therefore, the at least one region corresponding to each of the at least one partial section can be displayed at the play position of each of the at least one partial section.

The at least one region can be displayed differently in accordance with a type or number of the metadata set on the corresponding partial section. Alternatively, the at least one region can be displayed differently in accordance with whether the corresponding partial section corresponds to an object, a still image or a partial video. A size of the at least one region can vary in proportion to the play time of the corresponding partial section.

In the outputting step S330, in order to output the identification information, the mobile terminal 100 is able to display an individual indicator corresponding to each of at least one partial section on which the metadata matching the search condition is set. Moreover, at least one of a time information of the corresponding partial section, a number/type of metadata, a metadata itself and a type information (e.g., one of object, still image and partial video) can be displayed within the individual indicator.

In this case, a length or size of the individual indicator can vary in accordance with the play time of the corresponding partial section. For instance, assuming that bar type individual indicators are provided, a length of a first individual indicator corresponding to a first partial section (e.g., play time of 10 minutes) is twice longer than that of a second individual indicator corresponding to a second partial section (e.g., play time of 5 minutes).

The at least one individual indicator can be displayed differently in accordance with a type or number of the metadata set on the corresponding partial section. Alternatively, the at least one individual indicator can be displayed differently in accordance with whether the corresponding partial section corresponds to an object, a still image or a partial video.

In the outputting step S330, the mobile terminal 100 is able to identically output a display pattern of a region (hereinafter named a specific region) corresponding to a specific partial section and a display pattern of an individual indicator (hereinafter named a specific individual indictor) corresponding to the specific partial section within the whole indicator. For instance, the specific region and the specific individual indicator can be set equal to each other in color, shape, font, thickness, brightness and the like.

In the following description, the outputting step S330 is explained in detail with reference to the accompanying drawings.

FIGS. 6A to 6D are diagrams for outputting identification information using a whole indicator and an individual indicator according to the present invention.

Figure 6A:
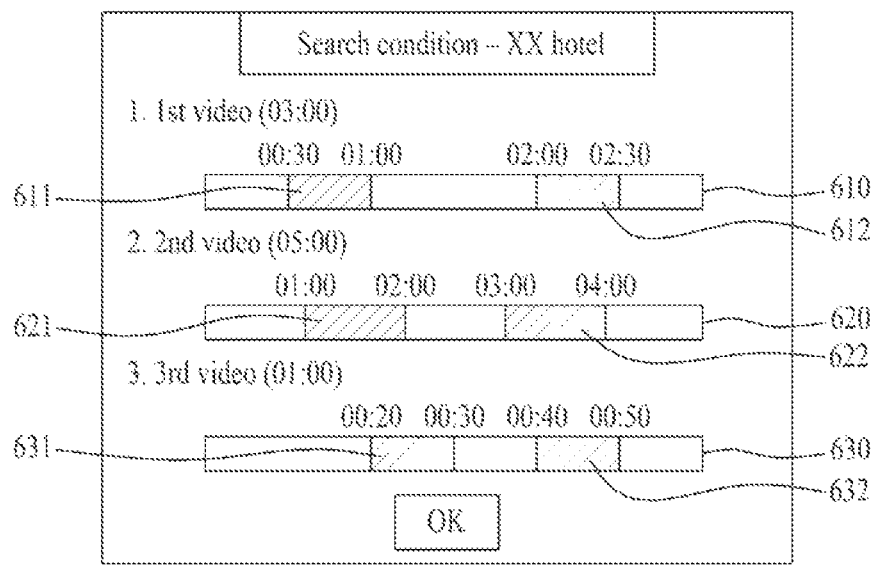
FIGS. 6A to 6D are diagrams for outputting identification information using a whole indicator and an individual indicator according to the present invention.

Referring to FIG. 6A, the mobile terminal 100 displays a video list including first to third videos. In this case, each of the first to third videos contains at least one partial section (hereinafter named a setting section) on which a metadata matching a search condition is set. The mobile terminal 100 is then able to display first to third whole indicators 610, 620 and 630 for the first to third videos included in the video list, respectively.

In particular, within the first whole indicator 610, a 1-1 region 611 corresponding to a 1-1 setting section and a 1-2 region 612 corresponding to a 1-2 setting section can be identifiably displayed. Within the second whole indicator 620, a 2-1 region 621 corresponding to a 2-1 setting section and a 2-2 region 622 corresponding to a 2-2 setting section can be identifiably displayed. Within the third whole indicator 630, a 3-1 region 631 corresponding to a 3-1 setting section and a 3-2 region 632 corresponding to a 3-2 setting section can be identifiably displayed.

Figure 6B:
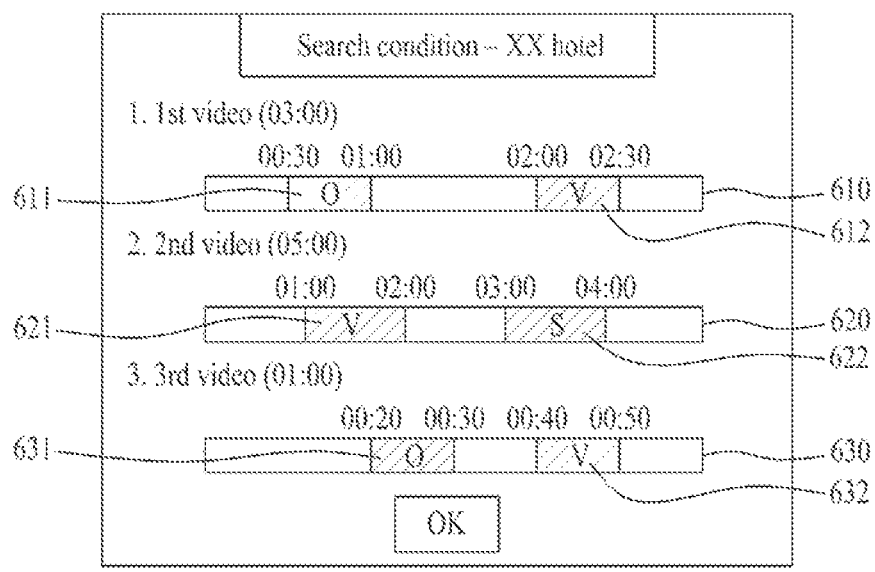

Referring to FIG. 6B, the mobile terminal 100 is able to display a type of a corresponding setting section on each of the regions included in each of the first to third whole indicators 610, 620 and 630. For instance, if a type of a setting section is an object, 'O' is displayed. If a type of a setting section is a still image, 'S' is displayed. If a type of a setting section is a partial video, 'V' is displayed.

Referring to FIG. 6A and FIG. 6B, a play time of a setting section corresponding to each region can be displayed within a whole indicator. And, each region can be arranged on a corresponding play position.

Meanwhile, a substance, number, type and the like of a metadata set on a corresponding partial section can be displayed on each of the regions included in each of the first to third whole indicators 610, 620 and 530 [not shown in the drawing].

In case that a selection action on a specific region included in the first to third whole indicators 610, 620 and 630 is inputted, it is able to display a substance, number, type and the like of a metadata set on a specific partial section corresponding to a specific region [not shown in the drawing].

Figure 6C:
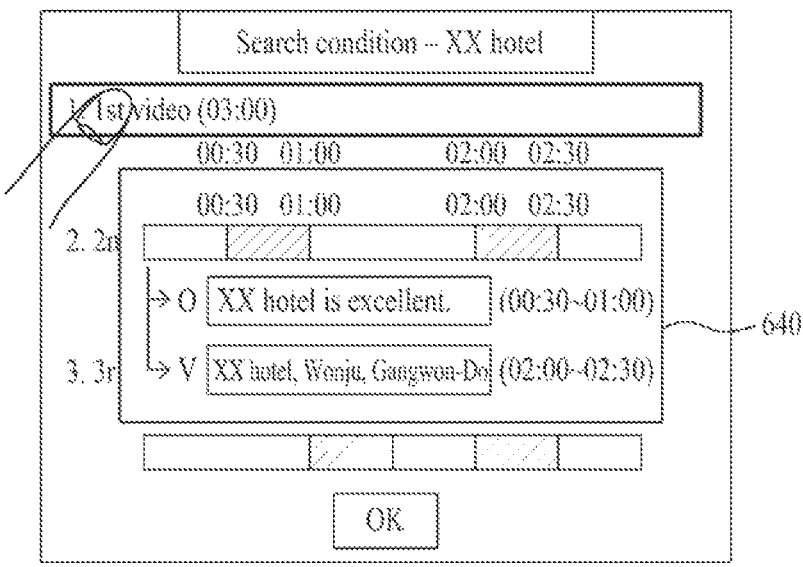

Referring to FIG. 6C, in case of receiving a selection action on a first video shown in FIG. 6A (or FIG. 6B), the mobile terminal 100 is able to display a window 640 including a 1-1 individual indicator 611-1 corresponding to the 1-1 setting section included in the first video and a 1-2 individual indicator 612-1 corresponding to the 1-2 setting section included in the first video.

Meanwhile, in case that a selection action on a specific region included in the first to third whole indicators 610 to 630 is inputted, it is able to display a window including a specific individual indicator corresponding to a specific setting section indicated by the specific region [not shown in the drawing].

Figure 6D:
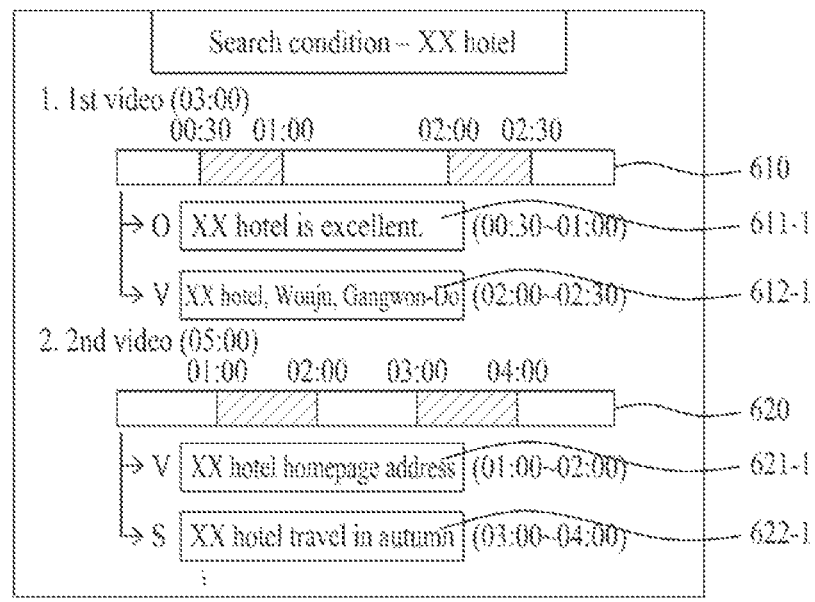

Referring to FIG. 6D, the mobile terminal 100 displays the whole indicators 610 and 620 for the videos included in the video list and is also able to display an individual indicator corresponding to a setting section included in each of the corresponding videos.

In particular, for the first video, the mobile terminal 100 displays a whole indicator 610, a 1-1 individual indicator 611-1 corresponding to a 1-1 setting section included in the first video and a 1-2 individual indicator 612-1 corresponding to a 1-2 setting section included in the first video. For the second video, the mobile terminal 100 displays a whole indicator 620, a 2-1 individual indicator 621-1 corresponding to a 2-1 setting section included in the second video and a 2-2 individual indicator 622-1 corresponding to a 2-2 setting section included in the second video.

In more particular, for an individual indicator, an information (e.g., 'O', 'S', 'V') on a type (e.g., object, still image, partial video) of a corresponding setting section is displayed, a substance of metadata set on the corresponding setting section is displayed, and a play time (e.g., between ** and ## from a corresponding video start point) of the corresponding setting section can be displayed.

Figure 7A:
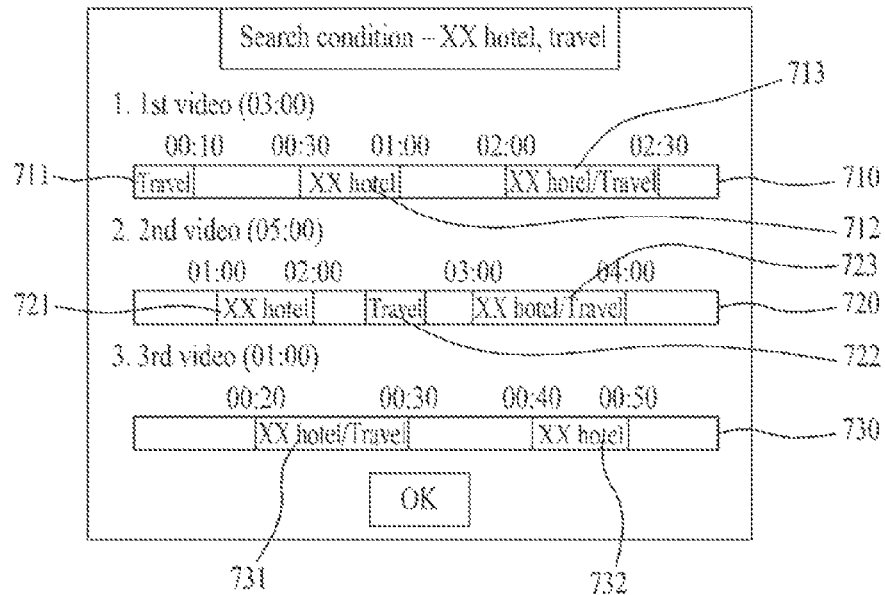
FIG. 7A and FIG. 7B are diagram for outputting identification information using a whole indicator or an individual indicator if a plurality of search conditions exist according to the present invention.
Figure 7B:
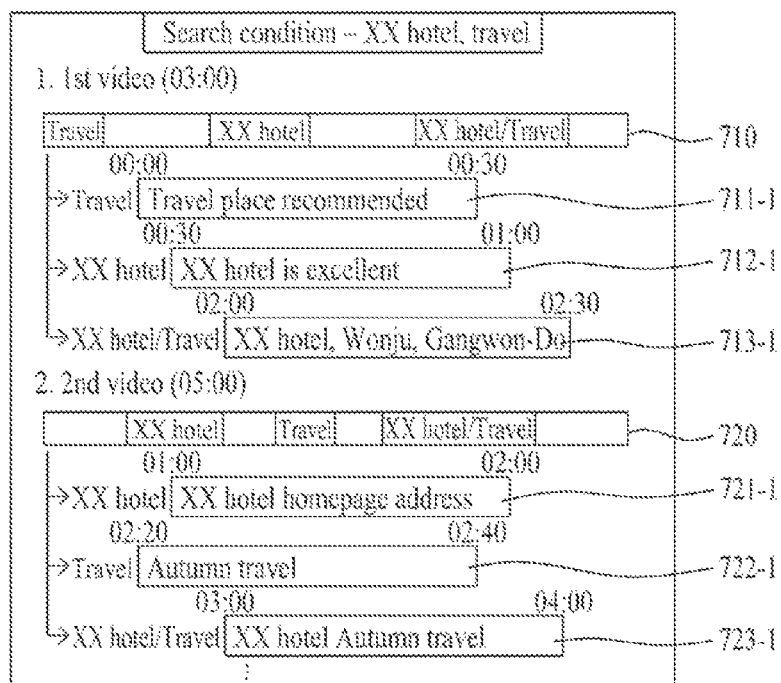

FIG. 7A and FIG. 7B are diagram for outputting identification information using a whole indicator or an individual indicator if a plurality of search conditions exist according to the present invention.

For clarity and convenience of the following description, assume that 'xx hotel' and 'travel' are inputted as search conditions. And, assume that a search is performed in pursuit of a metadata corresponding to at least one of 'xx hotel' and 'travel' [i.e., OR condition]. Of course, it is able to assume that a search is performed in pursuit of a metadata corresponding to both of 'xx hotel' and 'travel' [i.e., AND condition].

Referring to FIG. 7A, the mobile terminal 100 displays a video list constructed with first to third videos. In this case, each of the first to third videos includes a partial section on which a metadata corresponding to at least one of the search conditions 'xx hotel' and 'travel' is set. The mobile terminal 100 is then able to display first to third whole indicators 710, 720 and 730 for the first to third videos included in the video list, respectively.

In particular, in the first whole indicator 710, it can be observed that a 1-1 region 711 corresponding to a 1-1 partial section having metadata corresponding to 'travel' set thereon, a 1-2 region 712 corresponding to a 1-2 partial section having metadata corresponding to 'xx hotel' set thereon, and a 1-3 region 713 corresponding to a 1-3 partial section having metadata corresponding to both of 'xx hotel' and 'travel' set thereon are included. In the second whole indicator 720, it can be observed that a 2-1 region 721 corresponding to a 2-1 partial section having metadata corresponding to 'xx hotel' set thereon, a 2-2 region 722 corresponding to a 2-2 partial section having metadata corresponding to 'travel' set thereon, and a 2-3 region 723 corresponding to a 2-3 partial section having metadata corresponding to both 'xx hotel' and 'travel' set thereon are included. In the third whole indicator 730, it can be observed that a 3-1 region 731 corresponding to a 3-1 partial section having metadata corresponding to 'xx hotel' and 'travel' set thereon and a 3-2 region 732 corresponding to a 3-2 partial section having metadata corresponding to 'xx hotel' set thereon are included.

Referring to FIG. 7B, the mobile terminal 100 displays a 1-1 individual indicator 711-1, a 1-2 individual indicator 712-1 and a 1-3 individual indicator 713-1 respectively corresponding to the 1-1 partial section, the 1-2 partial section and the 1-3 partial section included in the first video. And, the mobile terminal 100 is also able to display a 2-1 individual indicator 721-1, a 2-2 individual indicator 722-1 and a 2-3 individual indicator 723-1 respectively corresponding to the 2-1 partial section, the 2-2 partial section and the 2-3 partial section included in the second video.

Referring now to FIG. 3, the mobile terminal 100 receives an input of a selection action of the specific identification information outputted in the outputting step S330 from a user via the user input unit 130 [S340].

In this case, the selection action on the specific identification information can include a selection action on a specific partial section corresponding to the specific identification information. For instance, the selection action means that the specific region corresponding to the specific partial section is selected from the whole indicator or can mean that a specific individual indicator corresponding to the specific partial section is selected from at least one or more individual indicators.

Moreover, the selection action commands a search operation using metadata set on a specific partial section corresponding to a specific identification information as a search condition [hereinafter named a first selection action] [1]. Alternatively, the selection action commands an output of a metadata set on a specific partial section corresponding to a specific identification information or an output of a video part corresponding to a specific partial section [hereinafter named a second selection action] [2].

In the selecting step S340, the mobile terminal 100 is able to receive a selection action on a plurality of specific identification information.

Therefore, the mobile terminal 10 is able to receive the first selection and the second selection action in a manner of discriminating them from each other.

In the following description, the inputting step S340 is explained with reference to FIG. 8A and FIG. 8B. For clarity and convenience of the following description, assume that the former video list shown in FIG. 6D is displayed.

Figure 8A:
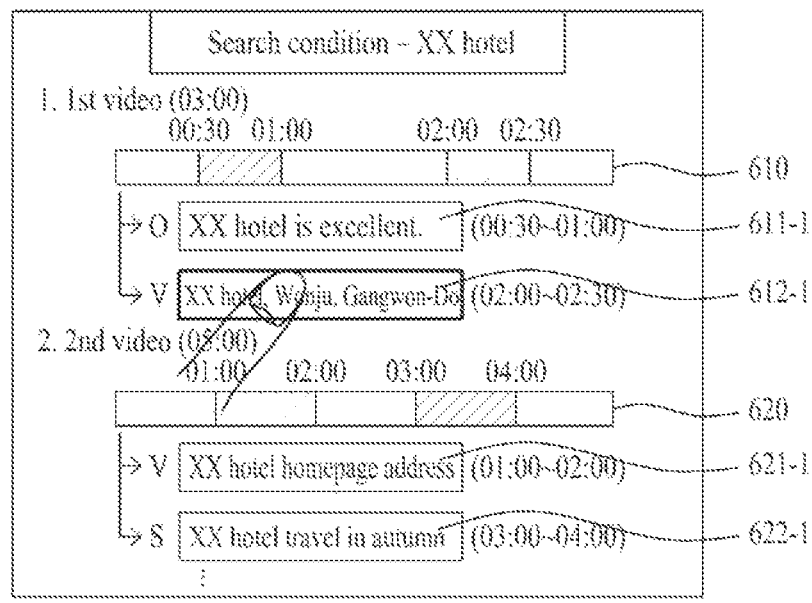
FIG. 8A and FIG. 8B are diagrams for inputting a search command action or an output command action on identification information according to the present invention.
Figure 8A:
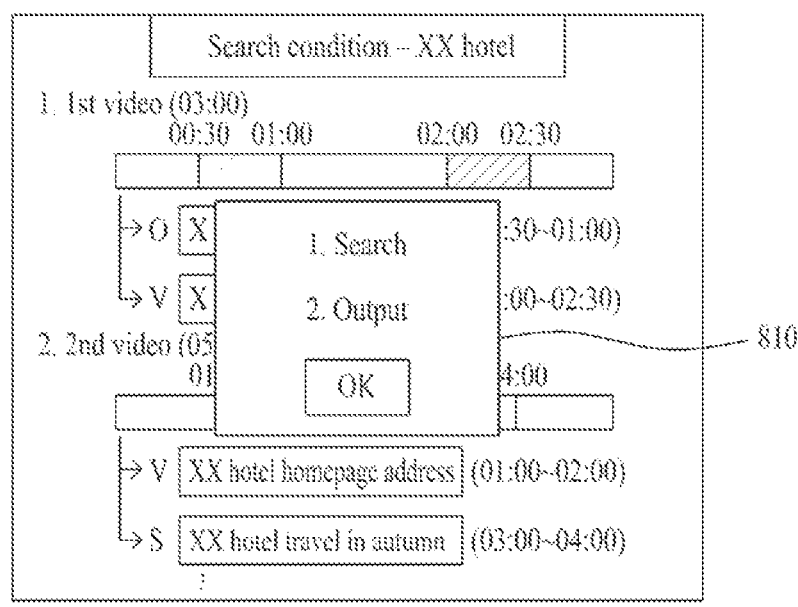
Figure 8B:
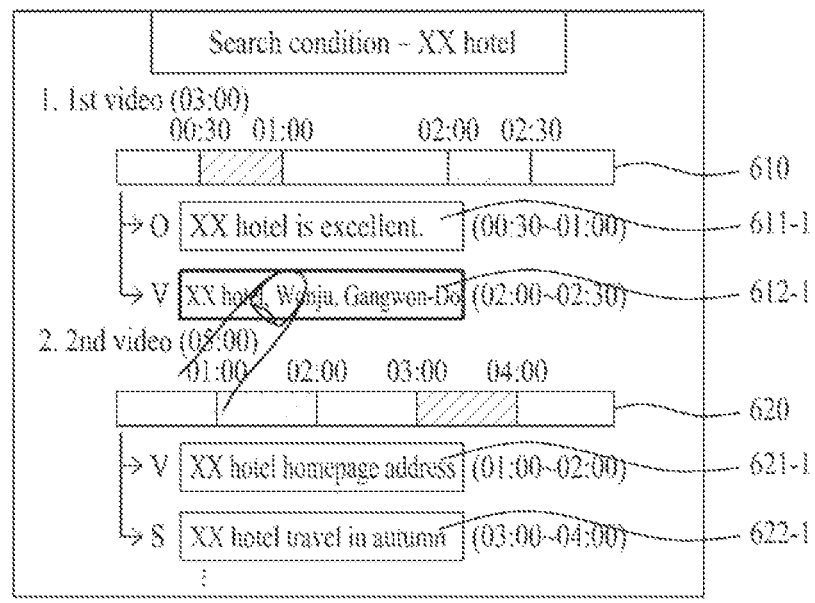
Figure 8B:
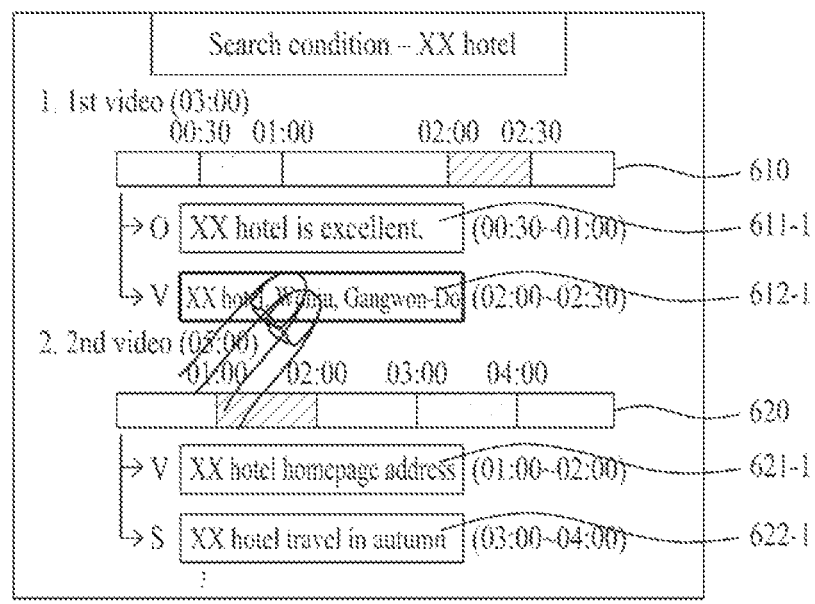

FIG. 8A and FIG. 8B are diagrams for inputting a search command action or an output command action on identification information according to the present invention.

Referring to FIG. 8A, in case of receiving an input of a user touch action on a 1-2 individual indicator 612-1 [FIG. 8A (a)], the mobile terminal 100 is able to display a window 810 for enabling a user to select whether to perform a search operation (Search) or an output operation (Output) in association with a 1-2 partial section corresponding to the 1-2 individual indicator 612-1.

Therefore, in case of attempting to perform the search operation using a metadata set on the 1-2 partial section as a search condition, the user is able to select 'Search'. In case of attempting to perform the output operation of the video part or metadata corresponding to the 1-2 partial section, the user is able to select 'Output'.

In doing so, it is able to select the 1-2 individual indicator 612-1 via a direction (or navigation) key manipulation or a numeral key manipulation.

Referring to FIG. 8B, in case of receiving an input of a single touch (i.e., example of the first selection action) to the 1-2 individual indicator 612-1, the mobile terminal 100 is able to perform the search operation using the metadata set on the 1-2 partial section as a search condition. In case of receiving an input of a multi-touch (i.e., example of the second selection action) to the 1-2 individual indicator 612-1, the mobile terminal 100 is able to perform the output operation of the video part or metadata corresponding to the 1-2 partial section.

Moreover, the mobile terminal 100 is able to receive an input of one of a touch for a first duration, a single touch, a touch & drag in a first direction and the like. Compared to the first selection action, the mobile terminal 100 is able to receive a touch for a second duration, a double touch, a touch & drag in a second direction and the like.

Referring to FIG. 3, in case of receiving the first selection action (Search) in the selecting step S340, the mobile terminal 100 obtains at least one metadata set on the specific partial section corresponding to the specific identification information selected by the first selection action under the control of the controller 180 [S351].

In this case, the at least one metadata set on the specific partial section can further include more metadata as well as the metadata matching the search condition. In the obtaining step S351, the mobile terminal 100 searches the metadata stored in the memory 160 for the metadata set on the specific partial section [1], receives the metadata set on the specific partial section from the metadata managing server 210 [2], or is able to search the metadata stored in the metadata managing server 210 for the metadata set on the specific partial section by accessing the metadata managing server 210 [3].

In particular, using the partial section identification information included in the metadata matching the search condition, the mobile terminal 100 is able to obtain the metadata including the same partial section identification as a metadata of the corresponding partial section under the control of the controller 180.

The mobile terminal 100 sets a search condition to the at least one metadata obtained in the obtaining step S351 under the control of the controller 180 [S353]. Subsequently, the mobile terminal 100 goes back to the searching step S320 and is then able to search for the metadata matching the set search condition. Further steps following the search step S320 can refer to the former description.

In the setting step S353, the mobile terminal 100 sets a search condition to all of the obtained at least one or more metadata [1], sets a search condition to a specific one of the obtained at least one or more metadata [2], or is able to further set an additional search condition in addition to a search condition corresponding to the obtained at least one or more metadata.

This is described with reference to FIGS. 9A to 9C as follows. For clarity and convenience of the following description, assume that 'Search; is selected for the 1-2 individual indicator 612-1 corresponding to the 1-2 partial section of the first video shown in FIG. 8A.

Figure 9A:
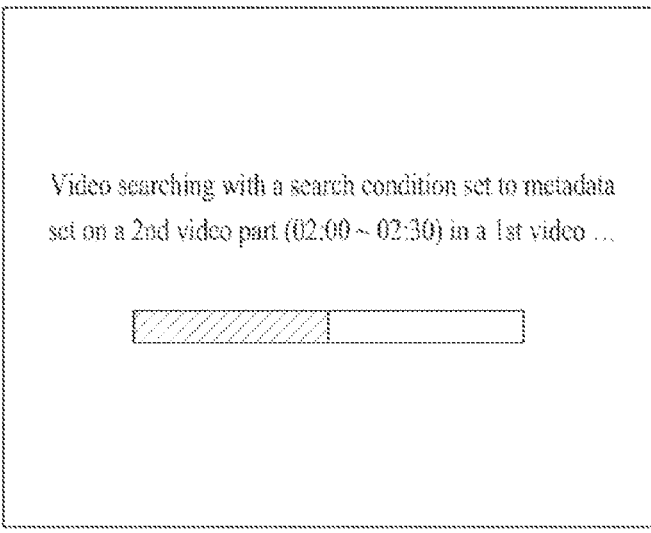
FIGS. 9A to 9C are diagrams for setting a search condition to a metadata set on a specific partial section according to the present invention.
Figure 9B:
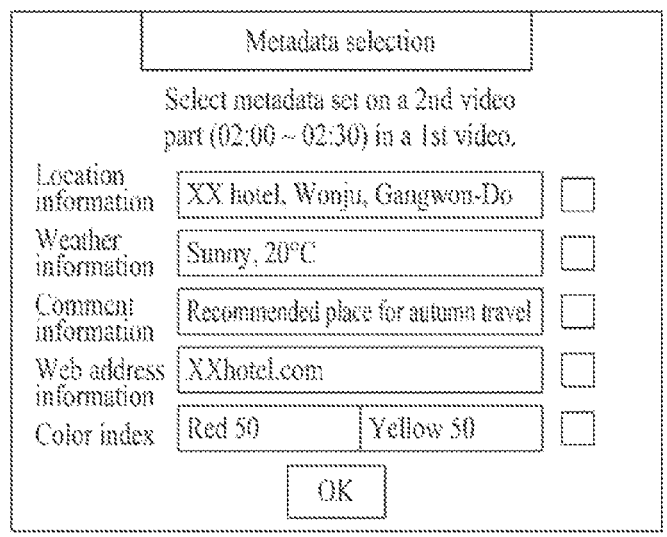
Figure 9C:
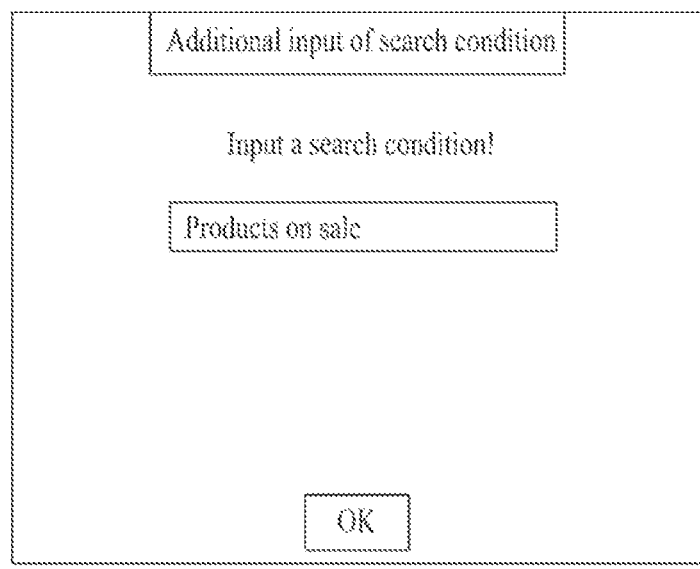

FIGS. 9A to 9C are diagrams for setting a search condition to a metadata set on a specific partial section according to the present invention.

Referring to FIG. 9A, the mobile terminal 100 is able to search the memory 160 or the metadata managing server 210 for at least one metadata set on the 1-2 partial section and is then able to display a search progress level on the screen.

Referring to FIG. 9B, the mobile terminal 100 is able to display the at least one metadata set on the 1-2 partial section on the screen. Therefore, a user is able to separately select a metadata, which is to be set as a search condition, from the at least one or more metadata set on the 1-2 partial section.

Referring to FIG. 9C, the mobile terminal 100 is able to further receive an input of an additional search condition in addition to the search condition corresponding to the at least one or more metadata set on the 1-2 partial section.

Referring now to FIG. 3, in the outputting step S330, the mobile terminal 100 is able to identifiably output an identification information_level 1 (described later) and an identification information_level 2 (described later) under the control of the controller 180.

In this case, the identification information_level 1 means an identification information on a partial section including a metadata matching the search condition inputted in the inputting step S310. And, the identification information_level 2 is able to mean an identification information on a partial section including a metadata found using the metadata obtained in the obtaining step S351 as a search condition.

In other words, if the identification information_level 1 is the search result from one search process, an identification information_level N can be regarded as the search result from N search processes using the search results according to previous search processes (i.e., $1^{st}$ to $(N-1)^{th}$ search processes) sequentially.

This is described in detail with reference to FIGS. 10A to 10D as follows.

For clarity and convenience of the following description, assume that there exist identification information_level 1, identification information_level 2, identification information_level 3, and identification information_level 4. And, assume that an individual indicator is displayed as an identification information [cf. FIG. 6D].

FIGS. 10A to 10D are diagrams for identifiably displaying identification information on a video found by a first search process and identification information on a video found by a second search process according to the present invention.

Figure 10A:
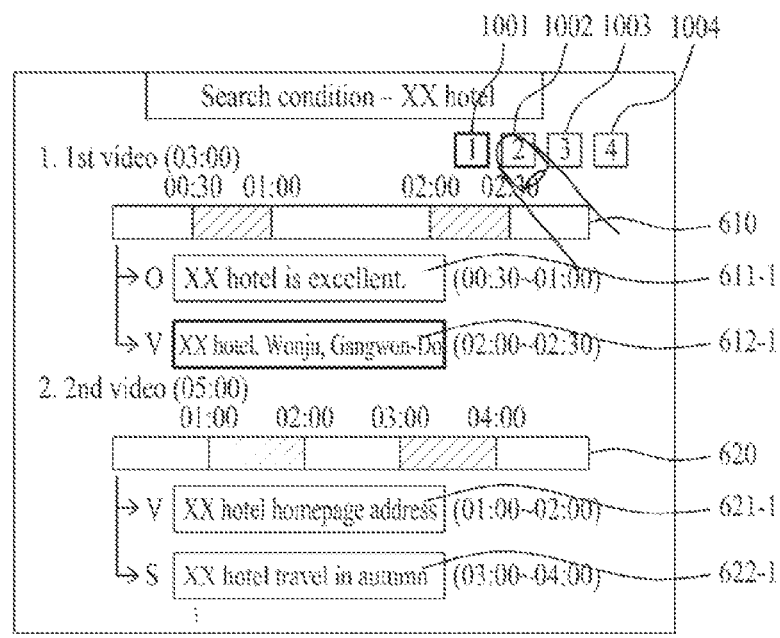
FIGS. 10A to 10D are diagrams for identifiably displaying identification information on a video found by a first search process and identification information on a video found by a second search process according to the present invention.
Figure 10A:
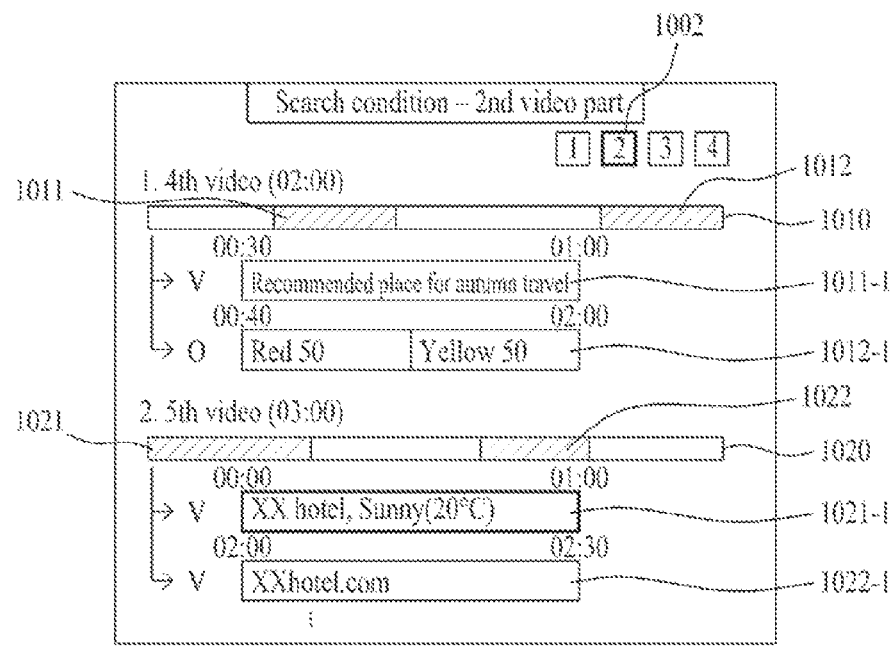

Referring to FIG. 10A, the mobile terminal 100 displays $1^{st}$ to $4^{th}$ icons 1001 to 1004 respectively corresponding to identification information_level 1 to identification information_level 4 and is also able to identifiably display the icon corresponding to a currently displayed identification information.

For instance, referring to FIG. 10A (a), the $1^{st}$ icon 1001 corresponding to the identification information_level 1 is identifiably displayed. Referring to FIG. 10A (b), the $2^{nd}$ icon 1002 corresponding to the identification information_level 2 can be identifiably displayed.

Moreover, referring to FIG. 10A (a), a 1-2 individual indicator 612-1 corresponding to a 1-2 partial section used as the search condition of the identification information_level 2 is identifiably displayed. Referring to FIG. 10A (b), an individual indicator 1021-1 used as the search condition of the identification information_level 3 can be identifiably displayed.

Figure 10B:
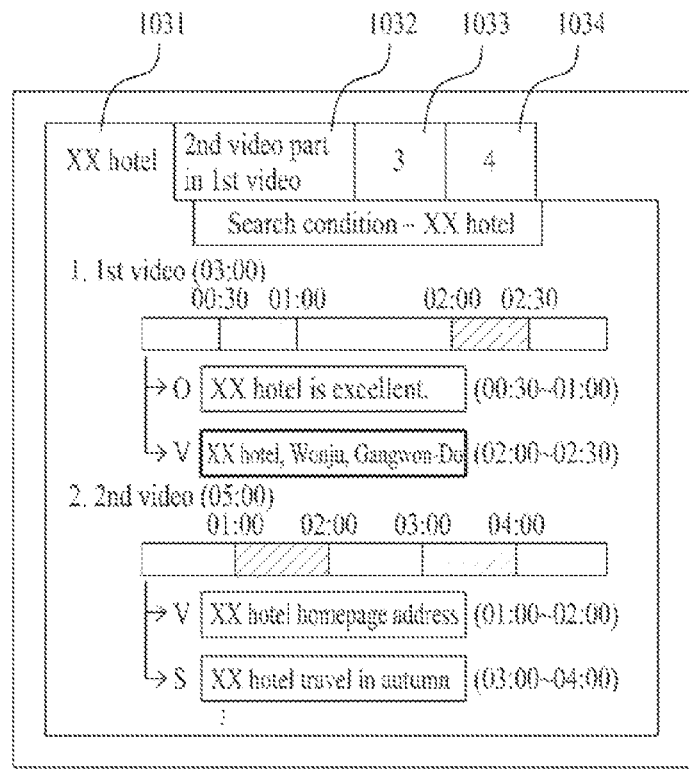
Figure 10B:
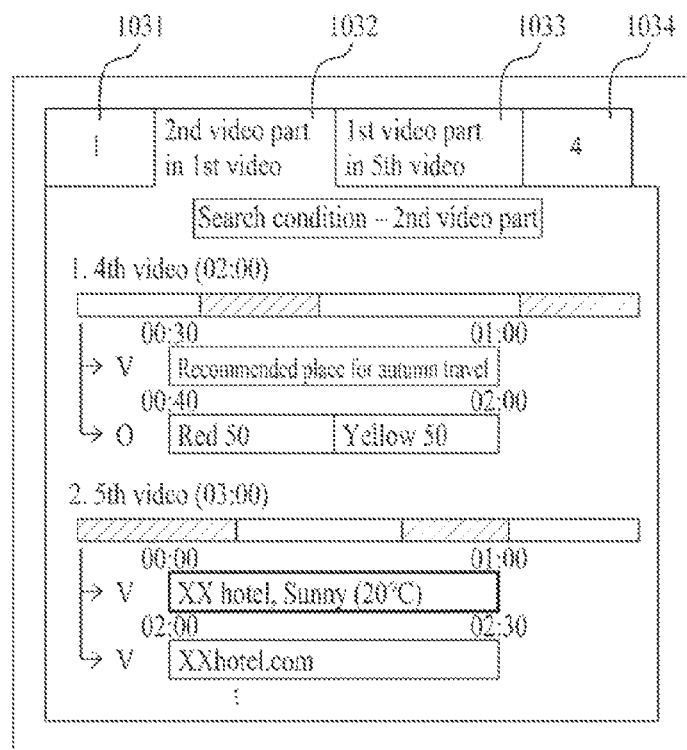

Referring to FIG. 10B, the mobile terminal 100 displays $1^{st}$ to $4^{th}$ tags 1031 to 1034 respectively corresponding to the identification information_level 1 to the identification information_level 4 on the screen and is also able to display the identification information corresponding to a currently activated one of the $1^{st}$ to $4^{th}$ tags 1031 to 1034.

For instance, FIG. 10B (a) shows that the $1^{st}$ tag 1031 corresponding to the identification information_level 1 is activated. FIG. 10B (b) shows that the $2^{nd}$ tag 1032 corresponding to the identification information_level 2 is activated. Moreover, an information on a corresponding search condition or an information on a partial section utilized as the corresponding search condition can be displayed within the currently activated tag or the tag situated previous or next to the currently activated tag.

Figure 10C:
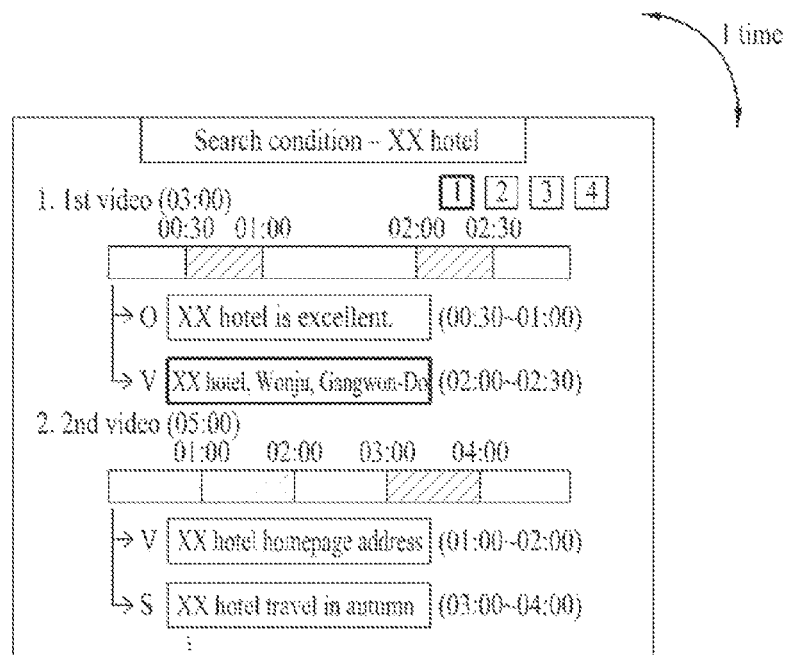
Figure 10C:
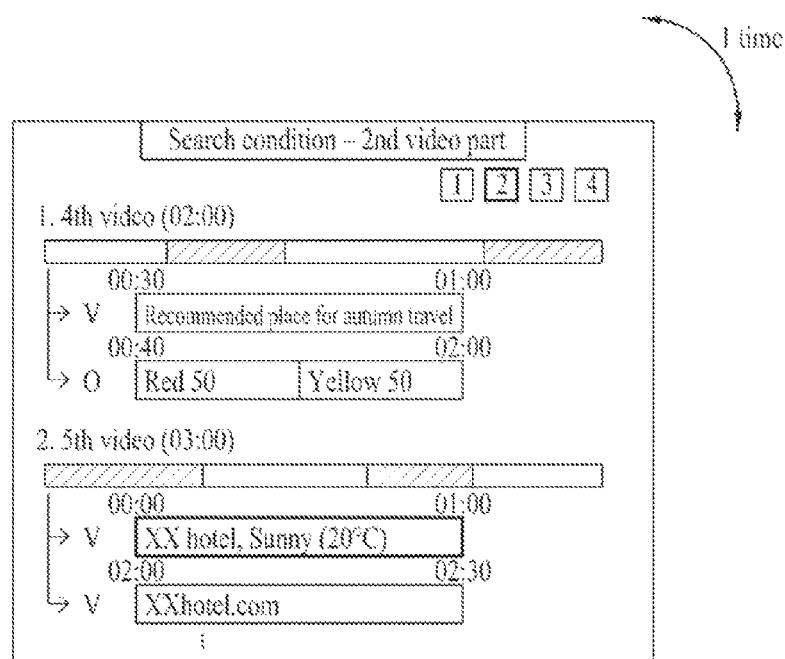

Referring to FIG. 10C, in case of attempting a shift between identification information differing from each other in level, a user touches an icon corresponding to an identification information to shift [FIG. 10C (a)] [1] or is able to shake the terminal as many times as a numerical corresponding to a level of an identification information to shift [FIG. 10C (b)] [2].

The user is able to input a touch & drag action in a direction corresponding to an order of the identification information to shift. If the identification information_level 1 is currently displayed, the user is able to input a touch & drag action in a right direction to move to the identification information_level 2 or is able to input a touch & drag action in a left direction to move to the identification information_level 4.

Figure 10D:
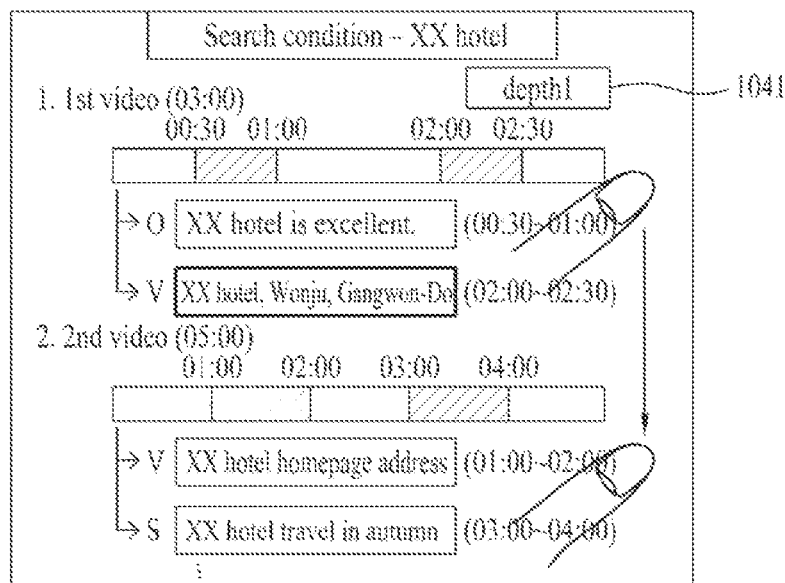
Figure 10D:
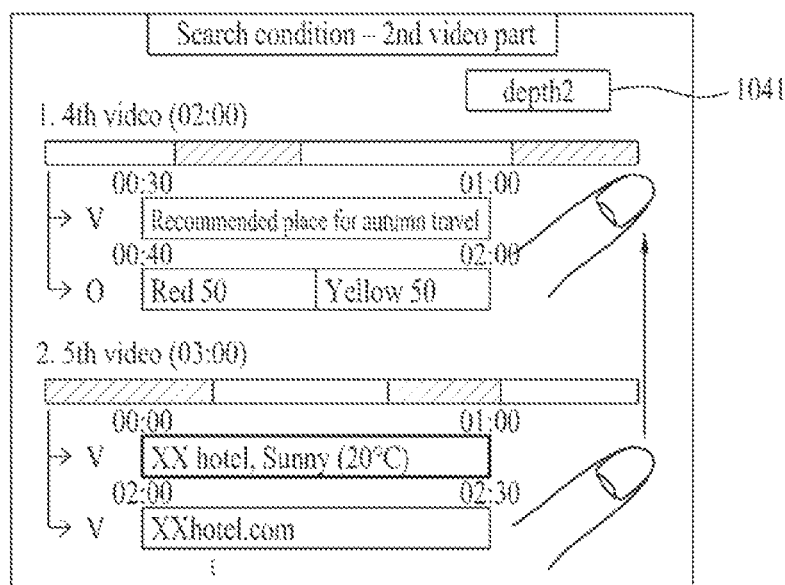

Referring to FIG. 10D, if a touch & drag action or a flicking action is inputted in a vertical or horizontal direction, the mobile terminal 100 is able to perform a page turning or a page scroll to correspond to a touch distance or a touch speed. And, identification information differing from each other in level can be sequentially displayed to correspond to the page turning or the page scroll.

In doing so, an indicator 1041/1042 indicating a level of an identification information included in a currently displayed page can be displayed. For instance, 'depth 1' indicates 'level 1'. And, 'depth 2' can indicate 'level 2'.

Referring now to FIG. 3, in case of receiving the second selection action (Output) in the selecting step S340, the mobile terminal 100 outputs at least one of the metadata, which is set on the specific partial section corresponding to the specific identification information selected by the second selection action, and the video part corresponding to the specific partial section under the control of the controller 180 [S361].

Moreover, the mobile terminal 100 searches the memory 160, the metadata managing server 210 (in case of metadata) and the content managing server 220 for the partial section corresponding to the metadata (i.e., this metadata matches the search condition) set on the specific partial section, the metadata set on the corresponding partial section and the video containing the corresponding partial section, respectively, and is then able to output found metadata, the found partial section or the partial section contained in the found video. Of course, if the corresponding metadata, the corresponding partial section or the video containing the corresponding partial section is already found in the searching step S320, this search can be omitted.

In particular, the mobile terminal 100 is able to search for the corresponding partial section or the corresponding video using the partial section identification information or the video identification information included in the metadata matching the search condition. Using the partial section identification information included in the metadata matching the search condition, the mobile terminal 100 is able to search for the metadata containing the same partial section identification information as the metadata of the corresponding partial section.

In the outputting step S361, if the specific partial section or the video containing the specific partial section is a non-real-time content, the mobile terminal 100 is able to selectively store and output (or play) the specific partial section only under the control of the controller 180. In the outputting step S361, if the specific partial section or the video containing the specific partial section is a real-time content, the mobile terminal 100 preferentially buffers the specific partial section only and is then able to output the buffered specific partial section under the control of the controller 180. This is described in detail with reference to FIG. 11A and FIG. 11B as follows.

For clarity and convenience of the following description, assume that 'Output' is selected for the 1-2 individual indicator 612-1 corresponding to the 1-2 partial section of the first video shown in FIG. 8A.

Figure 11A:
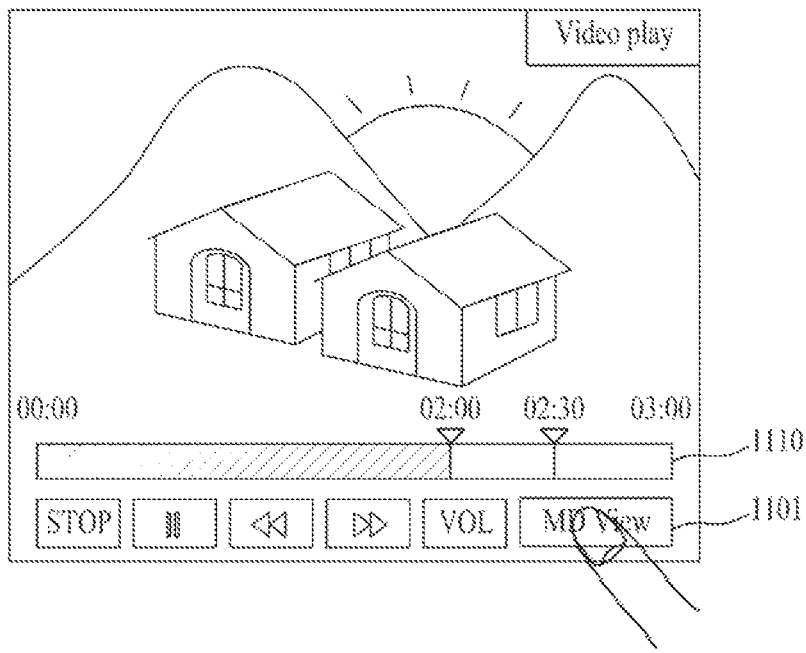
FIG. 11A and FIG. 11B are diagrams for outputting a video part or metadata corresponding to a specific partial section according to the present invention.
Figure 11B:
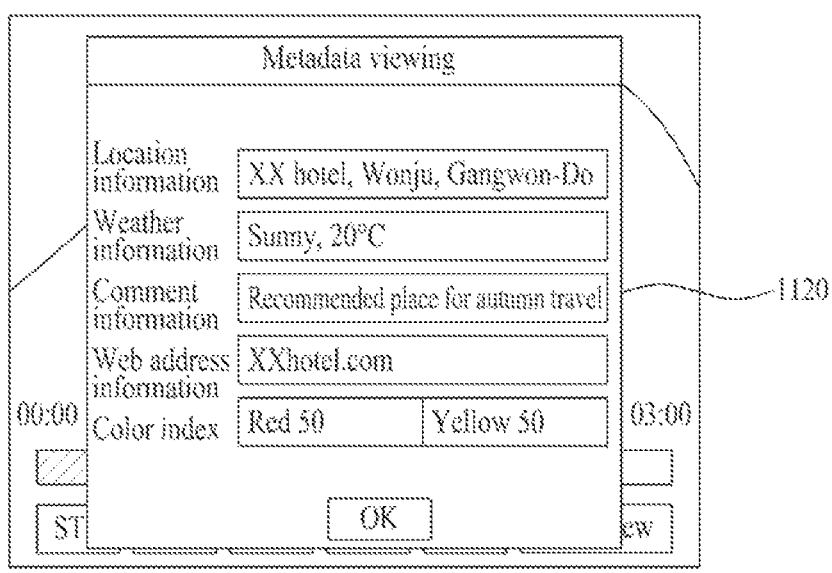

FIG. 11A and FIG. 11B are diagrams for outputting a video part or metadata corresponding to a specific partial section according to the present invention.

Referring to FIG. 11A, the mobile terminal 100 is able to output a video part corresponding to the 1-2 partial section and is also able to identifiably display a play section (02:00~02:30) corresponding to the 1-2 partial section on a video play progress indication bar 1110.

Referring to FIG. 11B, the mobile terminal 100 is able to display a window 120 including the metadata set on the 1-2 partial section. In particular, if a metadata view zone 1101 is selected in FIG. 11A, the screen shown in FIG. 11B can be displayed.

Of course, the mobile terminal 100 outputs the video part corresponding to the 1-2 partial section and is simultaneously able to display the corresponding metadata on the indication bar 1110 in a manner of linking the corresponding metadata with a part corresponding to the 1-2 partial section or a specific object (if the corresponding metadata is set on the specific object).

Moreover, in case that the video containing the 1-2 partial section is found, the mobile terminal 100 is able to display not only the 1-2 partial section but also the whole video including the 1-2 partial section.

In the following description, a method of editing a video using metadata in a mobile terminal according to the present invention is explained in detail with reference to the accompanying drawings. For clarity and convenience of the following description, an application target content is limited to a video.

Figure 12:
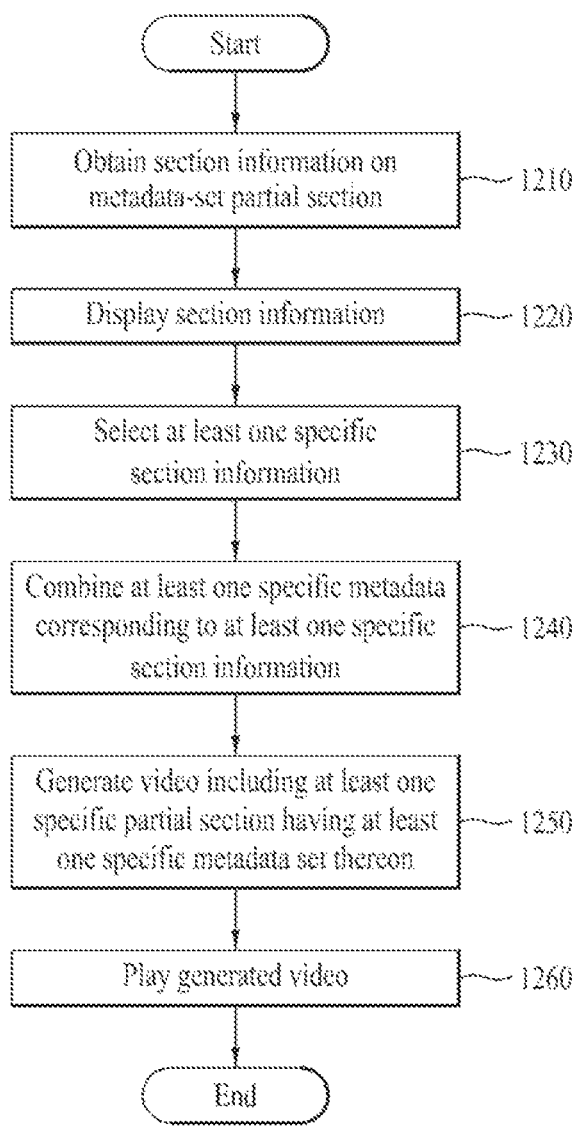
FIG. 12 is a flowchart for a method of editing a video using metadata in a mobile terminal according to one embodiment of the present invention.

FIG. 12 is a flowchart for a method of editing a video using metadata in a mobile terminal according to one embodiment of the present invention.

Referring to FIG. 12, the mobile terminal 100 obtains at least one section information on each of at least one partial section having metadata set thereon for each of at least one video under the control of the controller 180 [S1210].

In this case, assume that the video contains at least one or more partial sections. And, assume that a corresponding metadata and a corresponding section information are set on each of the at least one or more partial sections.

And, the partial section is able to include a section corresponding to at least one of a metadata set object, a metadata set still image and a metadata set partial video. For instance, the partial section can include a section corresponding to a partial video constructed with a plurality of consecutive still images including a metadata set object, a section corresponding to at least one metadata set still image, or a section corresponding to a metadata set partial video.

The section information is able to include a mark information on the partial section within the corresponding video as a metadata set on the partial section. If a play section information or a frame information of a corresponding partial section is included in a partial section identification information, the section information can be obtained from the partial section identification information included in the metadata set on the partial section.

The obtaining step S1210 can be performed in case that a section obtaining command signal is generated by one of a user manipulation on a key corresponding to a section information obtaining command, a user touch to a key zone (e.g., the key zone provided to a touchscreen), a terminal motion (e.g., a motion in a predetermined direction, a motion at a predetermined angle, a predetermined count of shakings, etc.), a voice input and the like.

In the obtaining step S1210, the mobile terminal 100 obtains the section information from the metadata stored in the memory 160 [1], obtains the section information from the metadata received from the metadata managing server 210 or the accessed/found metadata [2], obtains the section information from the metadata received from the content managing server 220 or the accessed/found metadata [3], or is able to obtain the section information from the metadata directly received from the counterpart terminal 230 [4].

The metadata set on the partial section indicated by the obtained section information can be set up by at least one of the mobile terminal 100, the counterpart terminal 230, a content provider and a metadata provider.

In particular, the content provider is able to set a metadata on a partial section included in a video created by the content provider. And, the metadata provider is able to set a metadata on a partial section included in a video created by the content provider.

Moreover, the mobile terminal 100 is able to set a metadata on a partial section included in at least one of a video created by the mobile terminal 100, a video created by the content provider, and a video created by the counterpart terminal.

In the following description, a process for setting metadata by the mobile terminal 100 is explained in detail with reference to FIGS. 13A to 14C.

Figure 13A:
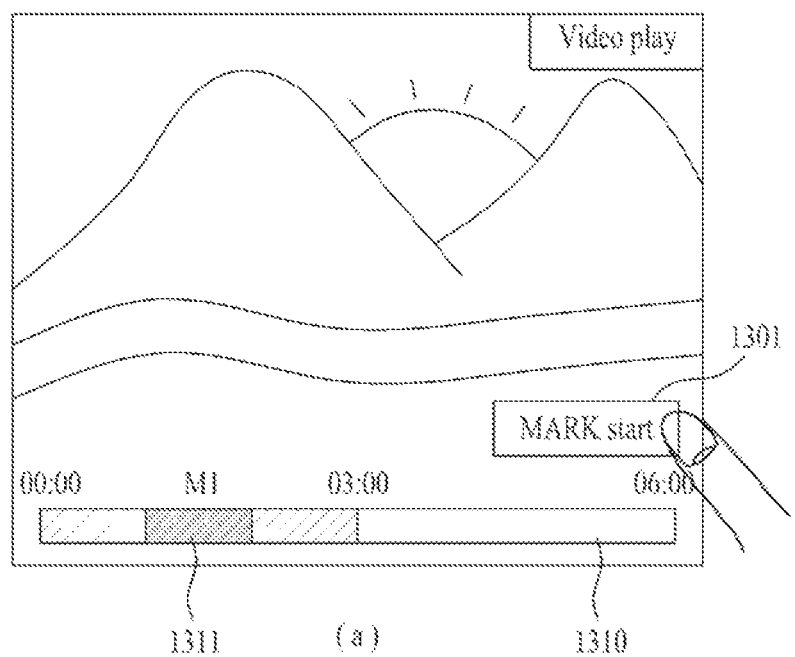
FIGS. 13A to 13C are diagrams of screen configurations for setting a mark information on a partial video of a whole video to metadata according to the present invention.
Figure 13A:
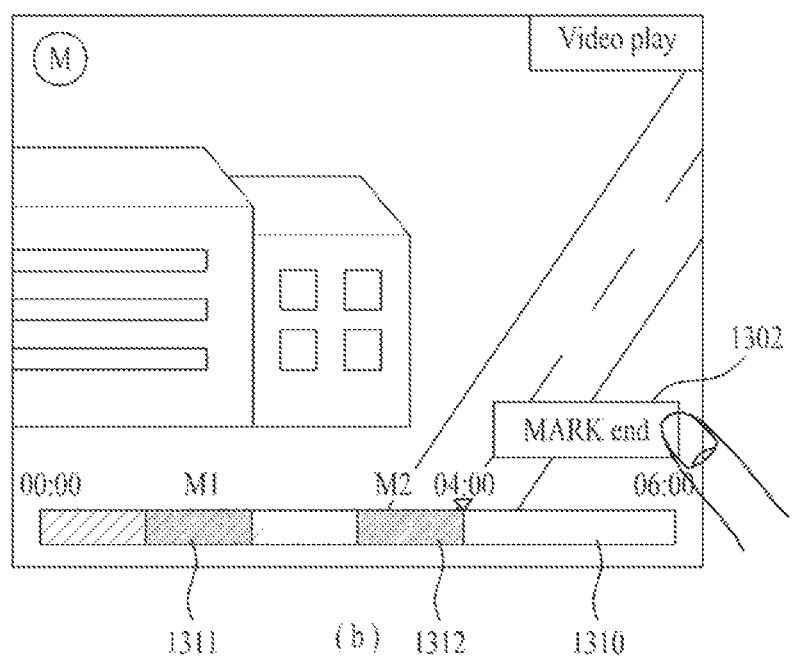
Figure 13B:
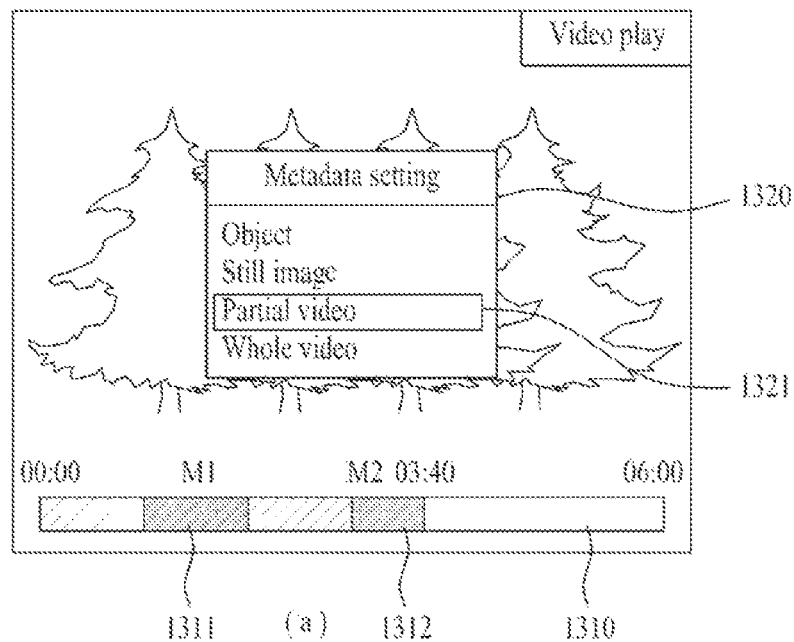
Figure 13B:
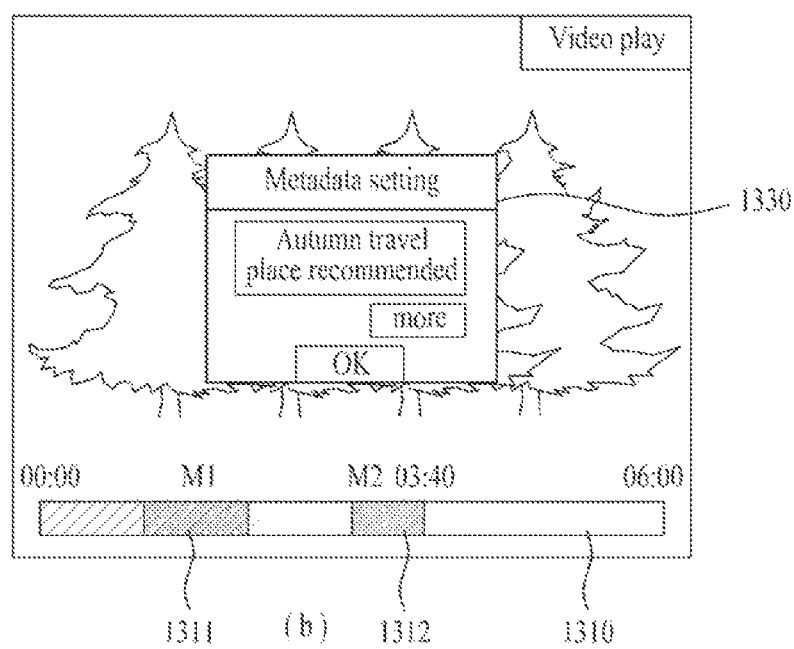
Figure 13C:
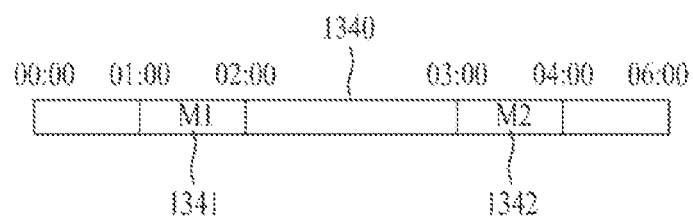

FIGS. 13A to 13C are diagrams of screen configurations for setting a mark information on a partial video of a whole video to metadata according to the present invention.

For clarity and convenience of the following description, although the mark information is set on the partial video in the drawing, it can be set on a specific object, a specific still image and the like as well.

Referring to FIG. 13A, in case of receiving an input of a touch action on a mark start zone 1031 from a user in the course of playing a video, the mobile terminal 100 is able set a mark start time to a play time (03:00) corresponding to a touch input timing point of the mark start zone 1301 [FIG. 13A (a)].

Thereafter, in case of receiving an input of a touch action on a mark end zone 1032 from the user, the mobile terminal 100 is able set a mark end time to a play time (04:00) corresponding to a touch input timing point of the mark end zone 1302 [FIG. 13A (b)].

In this case, the mobile terminal 100 is able to display indicator (M) indicating that a currently played part is being marked on a prescribed region of the screen displayed during a period from the mark start time to the mark end time. Moreover, a region (M1) 1311 corresponding to the marked part and a region (M2) 1312 corresponding to the marked part can be identifiably displayed on the indicator 1310 indicating a video play progress level.

Referring to FIG. 13B, the mobile terminal 100 is able to set a metadata at a random timing point in the course of playing a video. In particular, in case of setting a metadata at a random timing point in a period between the mark start time and the mark end time, the mobile terminal 100 displays a screen 1320 for selecting a metadata setting target. If a partial video is selected as the metadata setting target, the mobile terminal 100 is able to display a screen 1330 for setting a metadata on a currently marked video part.

Of course, the metadata shown in FIG. 13B can be set on a currently outputted still image, a specific object included in a still image or a whole video as well as the currently marked video part.

FIG. 13C shows a first mark information (M1) 1341 of a first partial section of a whole video 1340 and a second mark information (M2) 1342 of a second partial section of the whole video 1340 if the first and second partial sections of the whole video are marked. For instance, a play time (M1_01: 00~02:00) of the first partial section and a play time (M2_ 03:00~04:00) of the second partial section can be included in the first mark information and the second mark information, respectively.

Figure 14A:
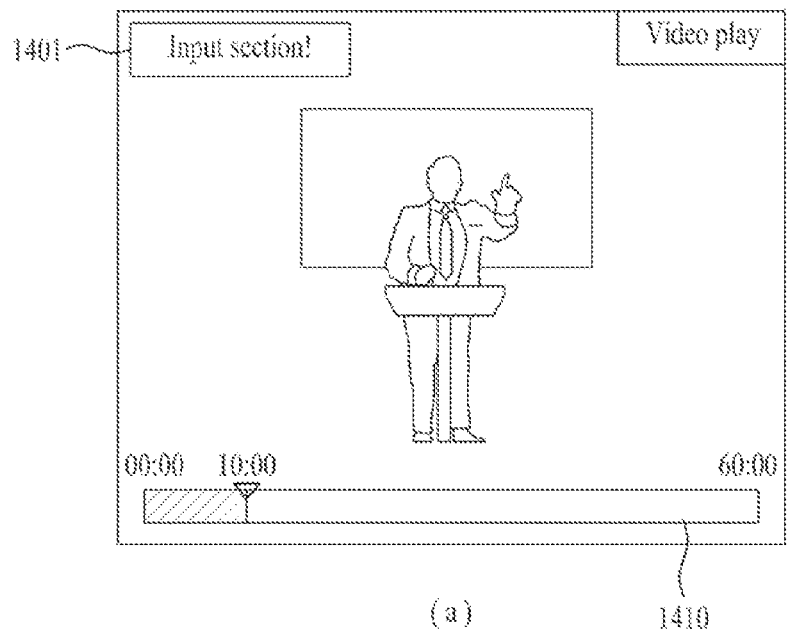
FIGS. 14A to 14C are diagrams of screen configurations for setting a match or mismatch of an input request section of a video to metadata according to the present invention.
Figure 14A:
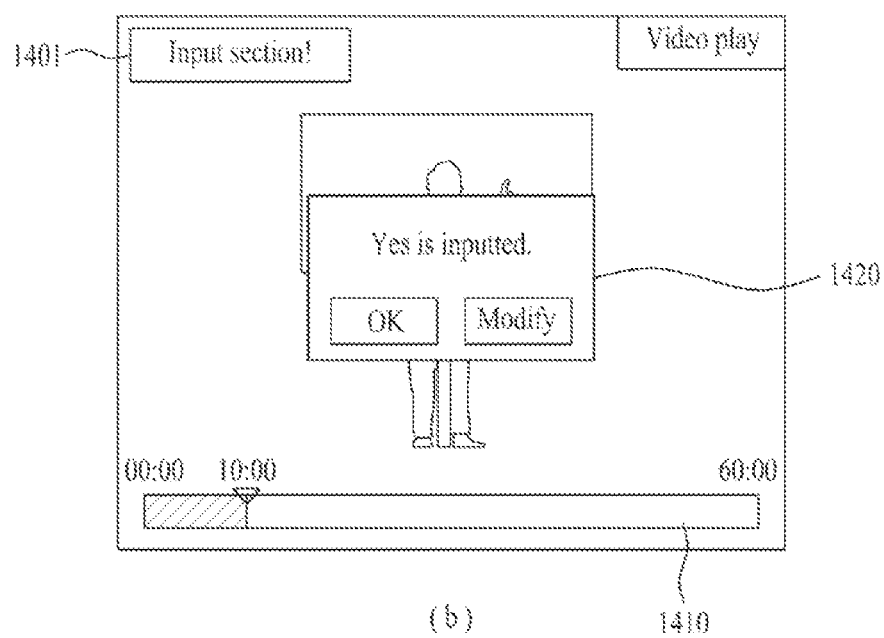
Figure 14B:
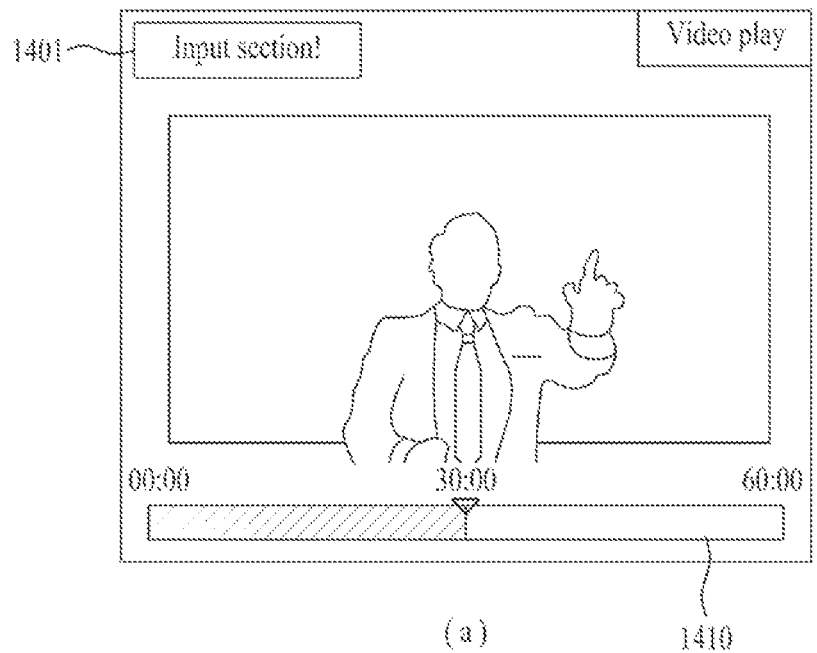
Figure 14B:
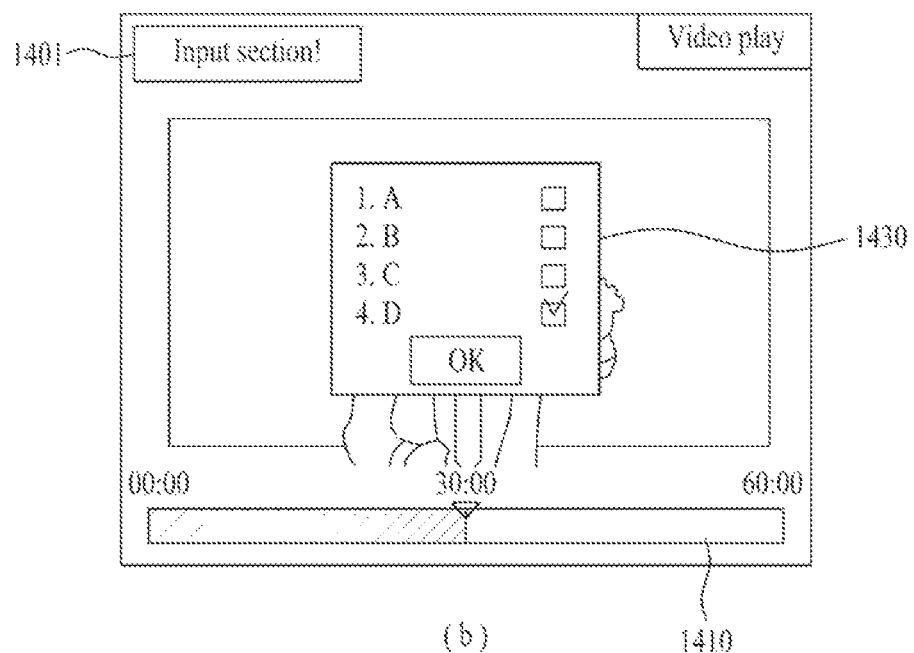
Figure 14C:
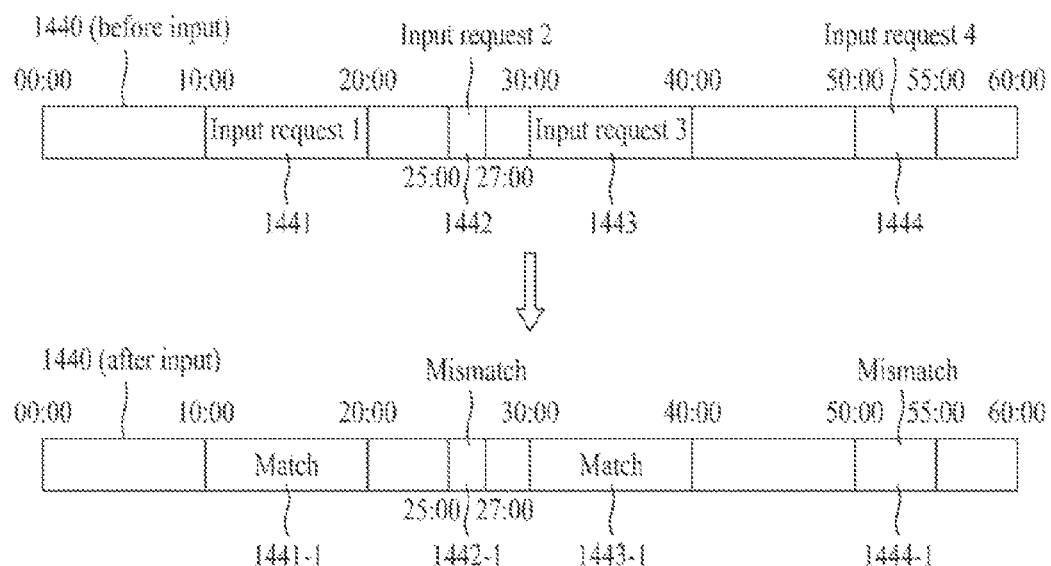

FIGS. 14A to 14C are diagrams of screen configurations for setting a match or mismatch of an input request section of a video to metadata according to the present invention.

Referring to FIGS. 14A to 14C, the mobile terminal 100 is able to play a video including at least one input request section under the control of the controller 180. In this case, an information on an input request section can be set to a metadata for a corresponding video or input request section. For instance, the information on the input request section can include a play time information of the input request section, a reference value designated to the input request section and the like.

The mobile terminal 100 is able to receive a prescribed input from an outside via the user input unit 130 while the input request section is played back. Subsequently, the mobile terminal 100 determines whether the received input matches a previously designated reference value and is then able to set a match or a mismatch as a metadata from the input request section played at the input received timing point in accordance with a result of the determination, under the control of the controller 180.

For instance, a part for requesting a prescribed answer from a user is outputted from the input request section. If the answer inputted by the user matches a previously designated correct answer (i.e., example of a reference value), 'match' can be set as the metadata for the input request section. Otherwise, 'mismatch' can be set as the metadata for the input request section.

Referring to FIG. 14A and FIG. 14B, when an input request section is played, the mobile terminal 100 displays an input request screen 1420/1430 to receive an input of an answer to a question included in the input request screen 1420/1430 from a user.

In doing so, if a currently outputted part is the input request section, the mobile terminal 100 is able to output an information 1401 indicating that it is the input request section and is also able to identifiably display a region corresponding to the input request section on a video play indicator 1410.

Moreover, it is able to output the input request section indication information using at least one of a voice, an icon, an image, an alarm sound, an alarm vibration, an alarm lamp and the like as well as a text.

Referring to FIG. 14C, $1^{st}$ to $4^{th}$ input request sections 1441 to 1444 are included in a whole video 1440. 'match' 1441-1, 'mismatch' 1442-1, 'match' 1443-1 and 'mismatch' 1444-1 can be set as metadata for the $1^{st}$ to $4^{th}$ input request sections 1441 to 1444 in accordance whether the answers inputted to the $1^{st}$ to $4^{th}$ input request sections 1441 to 1444 match the reference values, respectively.

Referring now to FIG. 12, the mobile terminal 100 displays the at least one section information obtained in the obtaining step S1210 using the display unit 151 under the control of the controller 180 [S1220].

In the displaying step S1220, the mobile terminal 100 is able to display the metadata set on each of the at least one partial section as each of the at least one section information.

In the displaying step S1220, the mobile terminal 100 displays a metadata set section indicator for each of the at least one video and is also able to identifiably display at least one region corresponding to the metadata set at least one partial section as the section information within the metadata set section indicator.

In this case, the metadata set second indicator can mean a means for displaying a set section of a metadata set on a whole video, an object included in a video, a still image or a partial video. And, the metadata set section indicator can just display a section on which a metadata is set. Moreover, the metadata set section indicator is able to identifiably display a metadata set section in all video sections.

In the following description, a section information display using a metadata set indicator is explained with reference to FIGS. 15A to 15F.

For clarity and convenience of the following description, assume that a metadata set section indicator shown in FIGS. 15A to 15*f* displays a metadata set section in all video sections.

Figure 15A:
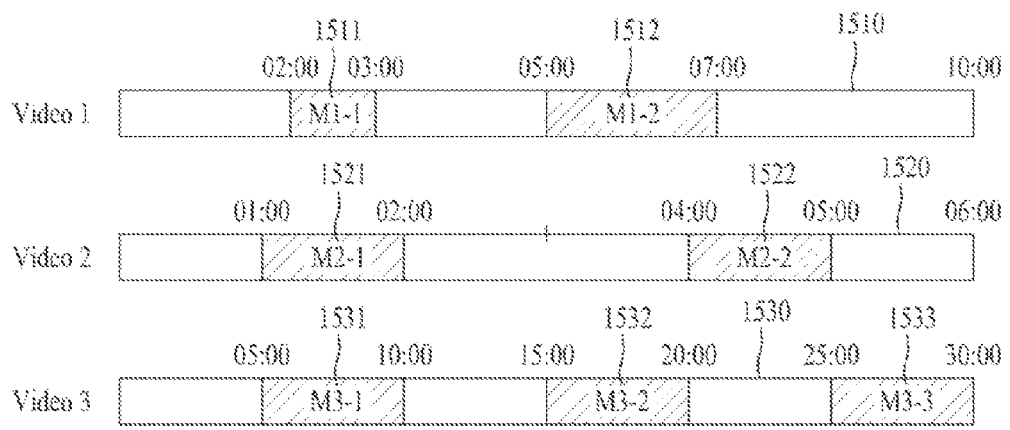

Referring to FIG. 15A, $1^{st}$ to $3^{rd}$ metadata set section indicators 1510, 1520 and 1530 correspond to $1^{st}$ to $3^{rd}$ videos, respectively. Within the $1^{st}$ metadata set section indicator 1510, regions 1511 and 1512 respectively corresponding to mark information set partial sections can be identifiably displayed. Within the $2^{nd}$ metadata set section indicator 1520, regions 1521 and 1522 respectively corresponding to mark information set partial sections can be identifiably displayed. Within the $3^{rd}$ metadata set section indicator 1530, regions 1531 and 1532 respectively corresponding to mark information set partial sections can be identifiably displayed.

Figure 15B:
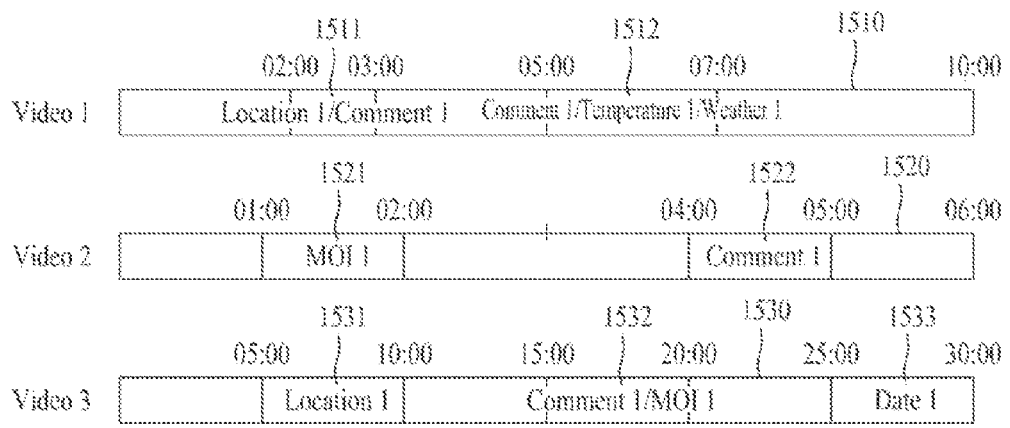

Referring to FIG. 15B, information such as the number, type and per-type number of metadata set on a corresponding partial section can be displayed within each of the regions 1511/1512, 1521/1522 and 1531/1532 respectively included in the $1^{st}$ to $3^{rd}$ metadata set section indicators 1510, 1520 and 1530. Moreover, a display pattern per region can vary in accordance with the number or type of the metadata. For instance, the number 1 is represented as white, the number 2 is represented as yellow, and the number 3 is represented as blue. For another instance, a position is represented as yellow, a comment is represented as blue, and a temperature is represented as red.

Figure 15C:
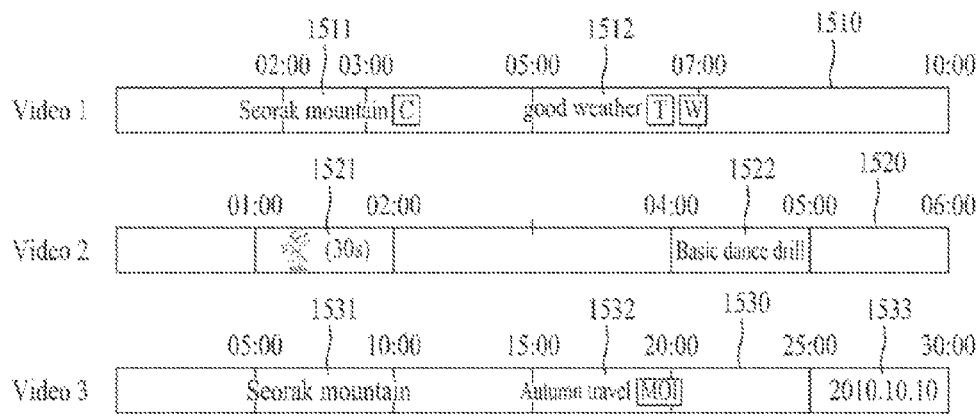

Referring to FIG. 15C, a metadata itself set on the corresponding partial section can be displayed within each of the regions 1511/1512, 1521/1522 and 1531/1532 respectively included in the $1^{st}$ to $3^{rd}$ metadata set section indicators 1510, 1520 and 1530. Moreover, if a plurality of metadata are set on the corresponding partial section, a representative metadata can be displayed while type information on the rest of the metadata is displayed.

Figure 15D:
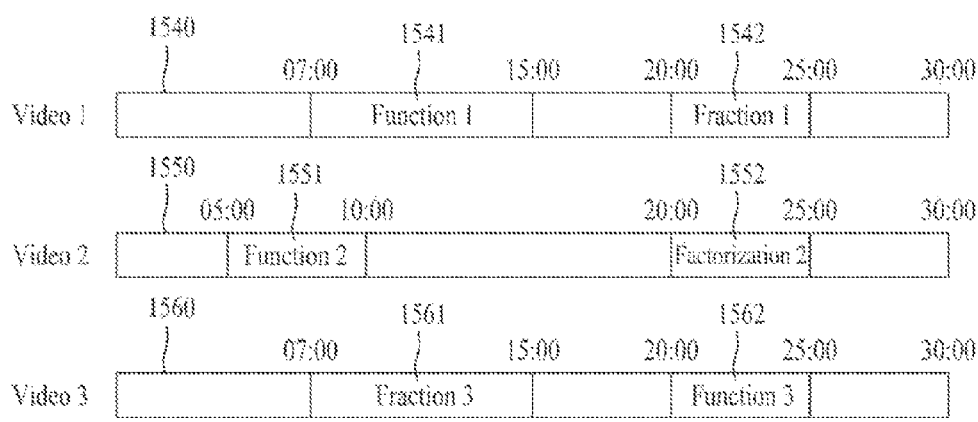

Referring to FIG. 15D, regions 1541 and 1542 respectively corresponding to partial sections, on which titles (e.g., chapter titles, etc.) are set, are identifiably displayed as metadata within a $4^{th}$ metadata set section indicator 1540. Regions 1551 and 1552 respectively corresponding to partial sections, on which titles (e.g., chapter titles, etc.) are set, are identifiably displayed as metadata within a $5^{th}$ metadata set section indicator 1550. Regions 1551 and 1552 respectively corresponding to partial sections, on which titles (e.g., chapter titles, etc.) are set, are identifiably displayed as metadata within a $4^{th}$ metadata set section indicator 1550. And, the title set on the corresponding partial section can be displayed within each of the regions. Moreover, the region having the same title set thereon can be displayed in the same pattern. For another instance, the regions having the titles set to Function 1, Function 2 and Function 3, respectively, can be represented as blue. For instance, the regions having the titles set to Fraction 1 and Fraction 2, respectively, can be represented as red. For another instance, the region having the title set to Factorization 2 can be represented as green.

Referring to FIG. 15E, regions 1571-1 to 1571-4 respectively corresponding to information type (e.g., question, correct answer, etc.) set partial sections are identifiably displayed as metadata within a 7-1 metadata set section indicator 1571. Regions 1572-1 to 1572-4 respectively corresponding to information type (e.g., question, correct answer, etc.) set partial sections are identifiably displayed as metadata within a 7-2 metadata set section indicator 1572. Regions 1573-1 to 1573-4 respectively corresponding to information type (e.g., question, correct answer, etc.) set partial sections are identifiably displayed as metadata within a 7-3 metadata set section indicator 1573. And, the information type set on the corresponding partial section can be displayed within each of the regions. Moreover, the region having the same information type set thereon can be displayed in the same pattern. For instance, the regions having the information type set to 'question' are represented as blue. For another instance, the regions having the information type set to 'correct answer' can be represented as green.

Referring to FIG. 15F, regions 1581-1 and 1581-2 respectively corresponding to 'match' or 'mismatch' set partial sections (or input request sections) are identifiably displayed as metadata within an 8-1 metadata set section indicator 1581. Regions 1582-1 to 1582-3 respectively corresponding to 'match' or 'mismatch' set partial sections (or input request sections) are identifiably displayed as metadata within an 8-2 metadata set section indicator 1582. Regions 1583-1 and 1583-2 respectively corresponding to 'match' or 'mismatch' set partial sections (or input request sections) are identifiably displayed as metadata within an 8-3 metadata set section indicator 1583. And, 'match' or 'mismatch' can be displayed within each of the regions. In particular, the 'match' region and the 'mismatch' region can be displayed in different patterns, respectively. For instance, all the 'match' regions can be represented as blue. For another instance, all the 'mismatch' regions can be represented as green.

Referring now to FIG. 12, the mobile terminal 100 receives a selection of at least one specific section information from the obtained at least one or more section information via the user input unit 130 using the displayed section information [S1230].

In the selecting step S1230, if the region corresponding to the metadata set partial section is identifiably displayed within the metadata set section indicator, the mobile terminal 100 is able to receive a selection of the region corresponding to the specific section information.

The mobile terminal 100 combines the at least one specific metadata corresponding to the at least one specific section information selected in the selecting step S1230 under the control of the controller 180 [S1240].

In the combining step S1240, the mobile terminal 100 is able to determine a combining order of the specific metadata to correspond to the selecting order of the specific section information. For instance, if the $1^{st}$ region, the $2^{nd}$ region and the $3^{rd}$ region are sequentially selected, the combining order of the specific metadata can follow the order of the $1^{st}$, $3^{rd}$ and $2^{nd}$ specific metadata corresponding to the $1^{st}$, $3^{rd}$ and $2^{nd}$ regions, respectively.

In the combining step S1240, the mobile terminal 100 is able to modify, add or delete (particularly, it means a partial deletion in case of a plurality of metadata) the specific metadata corresponding to the specific section information.

In the combining step S1240, in case that there are a plurality of the combined specific metadata, the mobile terminal 100 further sets a divergence related metadata at a random point in a plurality of the specific metadata under the control of the controller 180. If $1^{st}$ and second specific metadata are situated after the random point, the mobile terminal 100 enables a $1^{st}$ specific partial section corresponding to the $1^{st}$ specific metadata and a $2^{nd}$ specific partial section corresponding to the $2^{nd}$ metadata to diverge from each other.

For instance, the divergence related metadata can include a divergence timing point information for enabling the divergence in accordance with at least one of an automatic divergence, a divergence in case of a specific external action input and a divergence in case of a specific state detection and a divergence configuration information indicating a divergence configuration of the specific metadata situated after the random timing point.

The divergence related metadata is set up by the mobile terminal 100 or can be set up by a content provider or a metadata provider. In the latter case, an information for instructing the divergence of the specific metadata from or after the specific metadata. In this case, the divergence instruction information is included in the specific metadata itself or can be included in the divergence related metadata of the specific metadata.

The controller 180 controls the combination information on the at least one specific metadata to be stored in the memory 160. The controller 180 controls the combination information on the at least one specific metadata to be transmitted and stored in the metadata managing server 210. The controller 180 controls a video (described later) to be transmitted and stored in the content managing server 220 in a manner of creating the corresponding video using the combined metadata. For instance, the combination information includes an identification information indicating the combined metadata and a combining order information. And, the corresponding combination information can be set on each of the at least one specific metadata. Alternatively, the metadata corresponding to the combination information is separately generated and stored.

In the following description, the selecting step S1230 and the combining step S1240 are explained in detail with reference to the accompanying drawings.

Figure 16A:
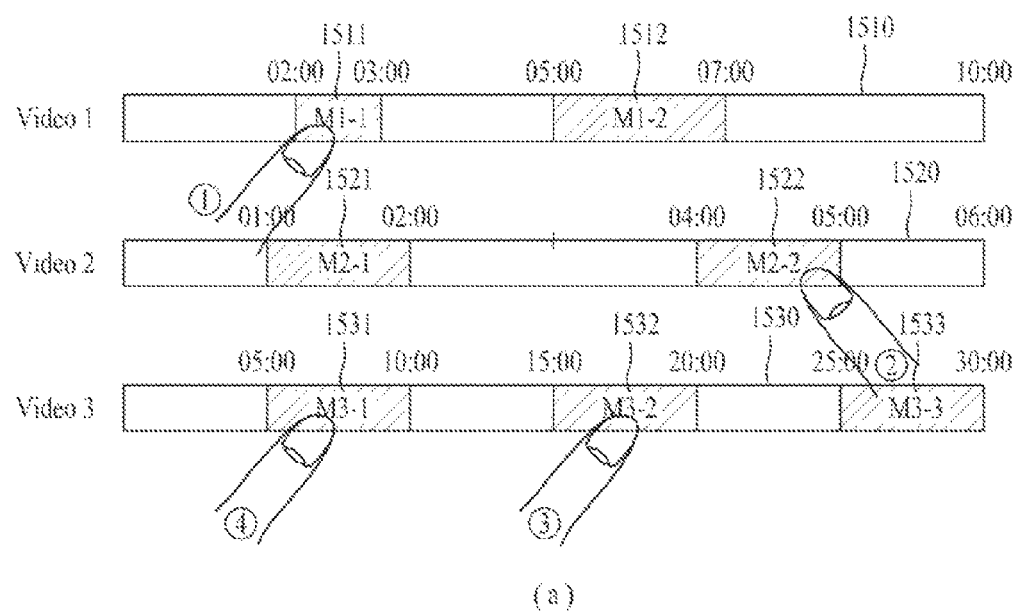
FIGS. 16A to 16C are diagrams of screen configurations for generating a combined metadata by a direct user selection according to the present invention.
Figure 16A:
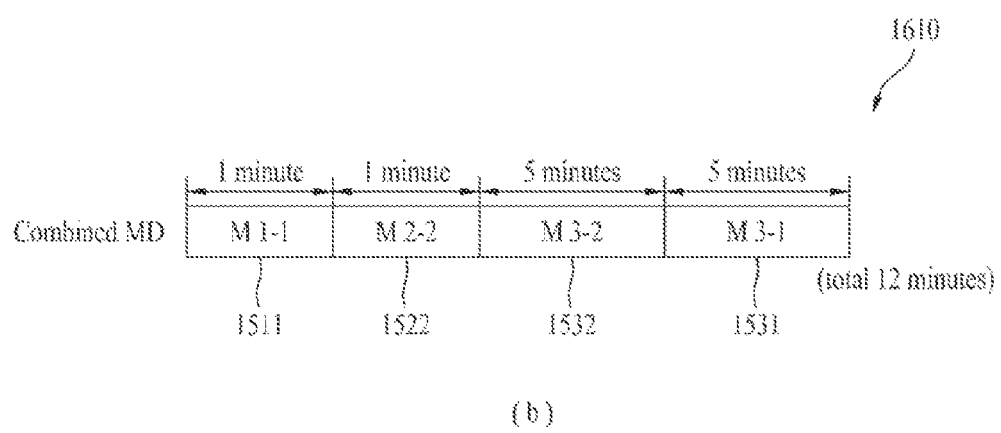
Figure 16B:
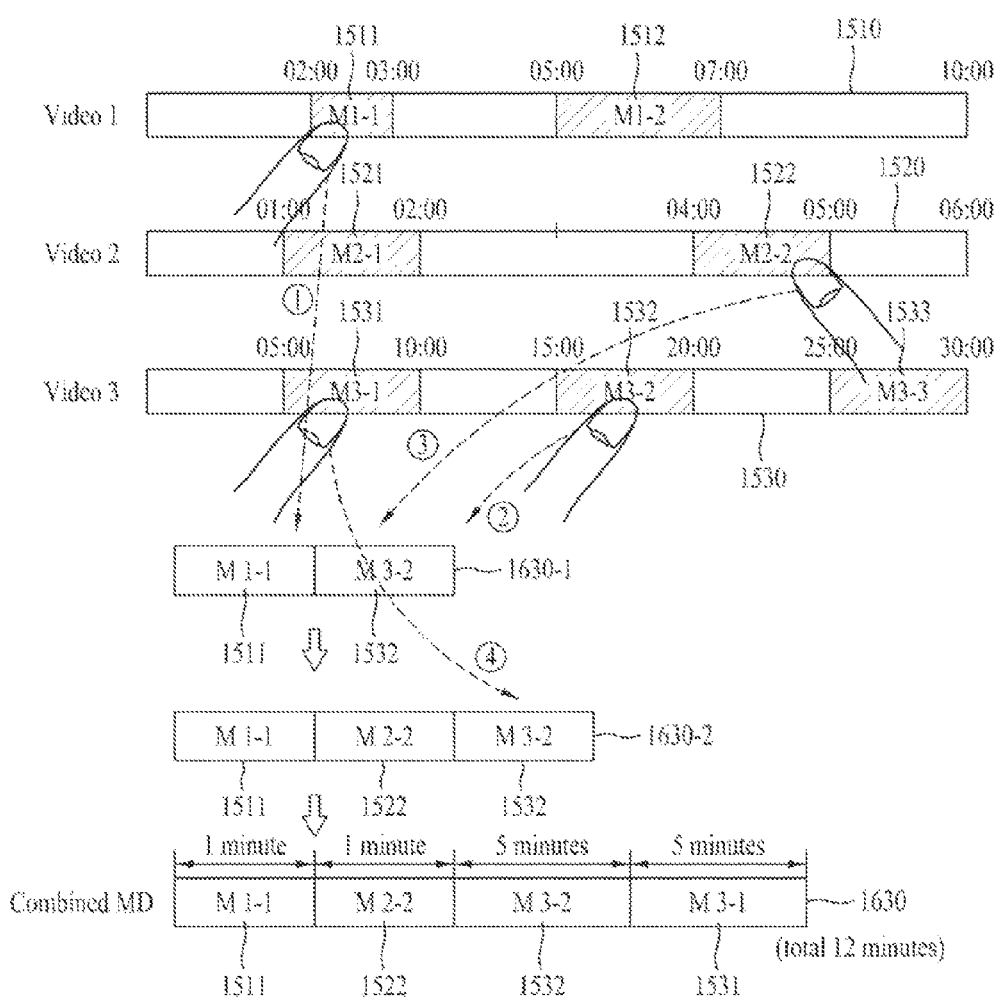
Figure 16C:
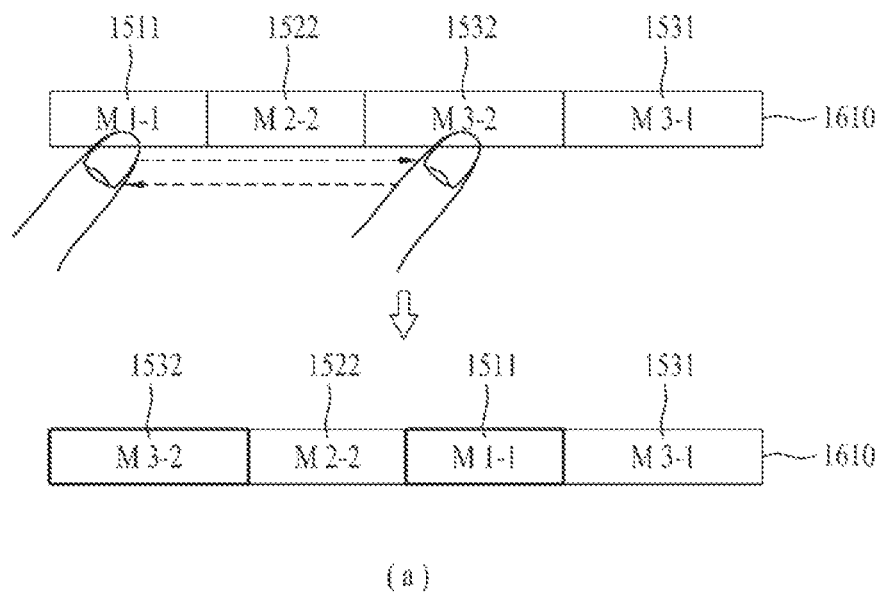
Figure 16C:
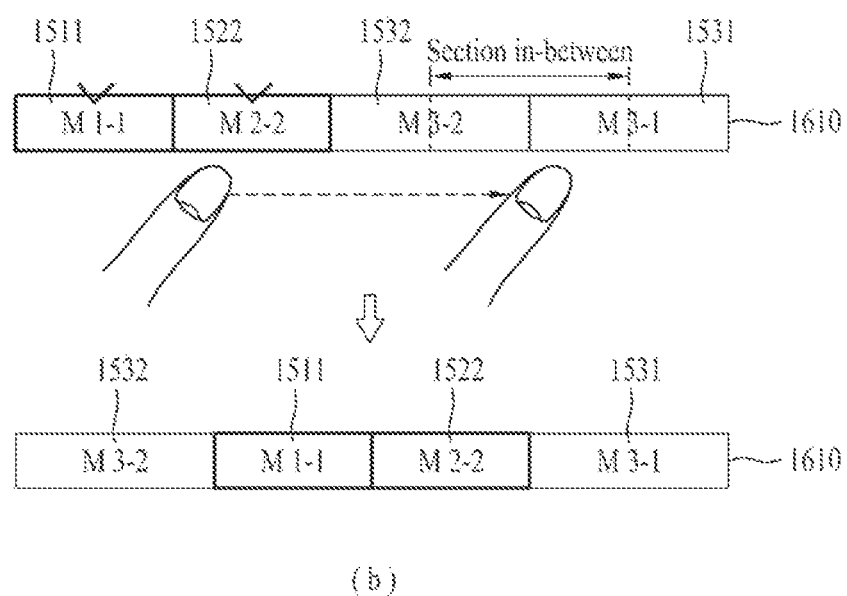

FIGS. 16A to 16C are diagrams of screen configurations for generating a combined metadata by a direct user selection according to the present invention.

Referring to FIG. 16A, a user is able to sequentially input a selection action on a 1-1 region 1511 of a $1^{st}$ metadata set section indicator 1510 [1], a selection action on a 2-2 region 1522 of a $2^{nd}$ metadata set section indicator 1520 [2], a selection action on a 3-2 region 1532 of a $3^{rd}$ metadata set section indicator 1530 [3], and a selection action on a 3-1 region 1531 [4] [FIG. 16A (a)].

Therefore, the mobile terminal 100 is able to generate a combined metadata 1610 in a manner of combining a 1-1 metadata corresponding to the 1-1 region 1511, a 2-2 metadata corresponding to the 2-2 region 1522, a 3-2 metadata corresponding to the 3-2 region 1532 and a 3-1 metadata corresponding to the 3-1 region 1531 sequentially [FIG. 16A (b)].

Referring to FIG. 16B, in case of receiving an input of a touch & drag action a from the 1-1 region 1511 of the $1^{st}$ metadata set section indicator 1510 to a random point of the screen and an in input of a touch & drag action 2 from the 3-2 region 1532 of the third metadata set section indicator 1530 to the touched & dragged 1-1 region 1511, the mobile terminal 100 is able to sequentially arrange the 1-1 region 1511 and the 3-2 region 1532 [1630-1].

In case of receiving an input of a touch & drag action 3 from the 2-2 region 1522 of the $2^{nd}$ metadata set section indicator

1520 to a point between the sequentially arranged 1-1 and 3-2 regions 1511 and 1532, the mobile terminal 100 is able to arrange the 2-2 region 1522 between the 1-1 region 1511 and the 3-2 region 1532 [1630-2].

In case of receiving an input of a touch & drag action 4 from the 3-1 region 1531 of the $3^{rd}$ metadata set section indicator 1530 to the 3-2 region 1532 among the sequentially arranged 1-1, 2-2 and 3-2 regions 1511, 1522 and 1532, the mobile terminal 100 is able to sequentially arrange the 1-1, 2-2, 3-2 and 3-1 regions 1511, 1522, 1532 and 1531 [1630].

Therefore, the mobile terminal is able to generate the combined metadata 1630 in a manner of sequentially combining the 1-1 metadata corresponding to the 1-1 region 1511, the 2-2 metadata corresponding to the 2-2 region 1522, the 3-2 metadata corresponding to the 3-2 region 1532 and the 3-1 metadata corresponding to the 3-1 region 1531.

Referring to FIG. 16C, it is able to modify a combined sequence of a plurality of specific metadata using an inter-region position shift.

Referring to FIG. 16C (a), in case of receiving an input of a touch & drag action between the 1-1 region 1511 and the 3-2 region 1532, positions of the 1-1 and 3-2 regions 1511 and 1532 can be switched to each other. Hence, a combined sequence of the 1-1 and 3-2 metadata can be switched to each other.

Referring to FIG. 16C (b), a plurality of regions 1511 and 1522, of which positions will be shifted, are selected and then grouped together to form one group. In case of receiving an input of a touch & drag action between the group and a specific region, a position of the group and a position of the specific region can be switched to each other [cf. FIG. 16C (a)]. In case of receiving an input of a touch & drag action from the group to a section between the regions 1532 and 1531 neighboring to each other, the regions 1511 and 1522 included in the group can be situated between the neighboring regions 1532 and 1531. Therefore, the combined sequence of the metadata can follow the sequence of '3-2 metadata→1-1 metadata→2-2 metadata→3-1 metadata'.

Figure 17A:
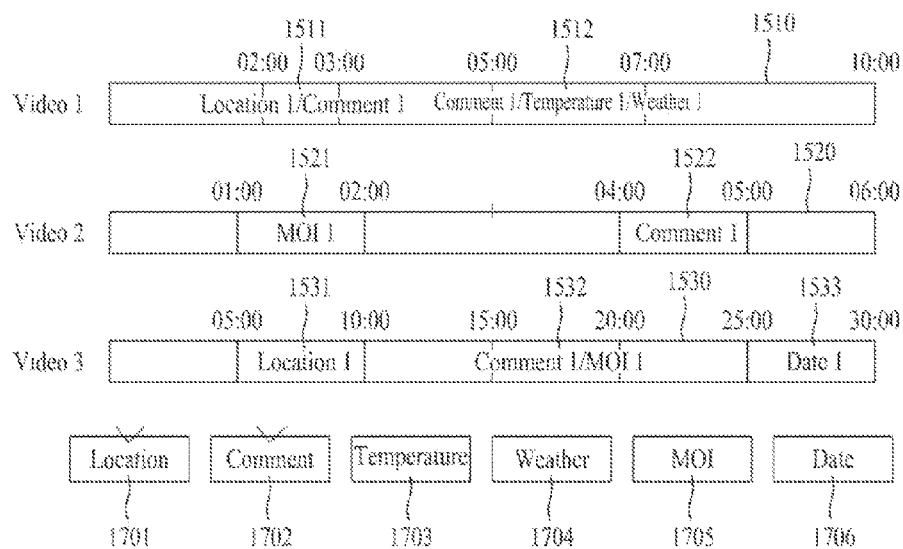
FIG. 17A and FIG. 17B are diagrams of screen configurations for generating a combined metadata in accordance with a metadata type according to the present invention.
Figure 17B:
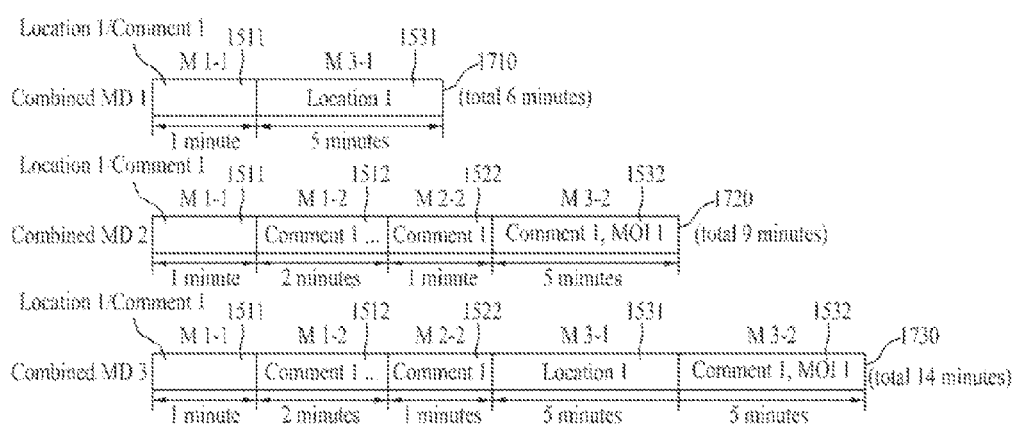

FIG. 17A and FIG. 17B are diagrams of screen configurations for generating a combined metadata in accordance with a metadata type according to the present invention. For clarity and convenience of the following description, assume that the metadata set section indicator shown in FIG. 15B is being displayed.

Referring to FIG. 17A, the mobile terminal 100 displays a plurality of type indicators 1701 to 1706 on a prescribed region of the screen and is then able to receive a selection of the type indicator 'Location' 1701 and a selection of the type indicator 'Comment' 1702 from a user. In this case, the type indicators 1701 to 1706 are able to indicate types of metadata set on specific partial sections, respectively.

Referring to FIG. 17B, the mobile terminal 100 is able to combine the metadata set on the partial sections, on which the metadata corresponding to the metadata type 'Location' indicated by the selected type indicator and the metadata corresponding to the metadata type 'Comment' indicated by the selected type indicator are respectively set, together.

In FIG. 17B, the first combined metadata 1710 indicated the combination of the metadata of which metadata type is the location, the second combined metadata 1720 indicated the combination of the metadata of which metadata type is the comment, and the third combined metadata 1710 indicated the combination of the metadata of which metadata types are the location and the comment.

Figure 18A:
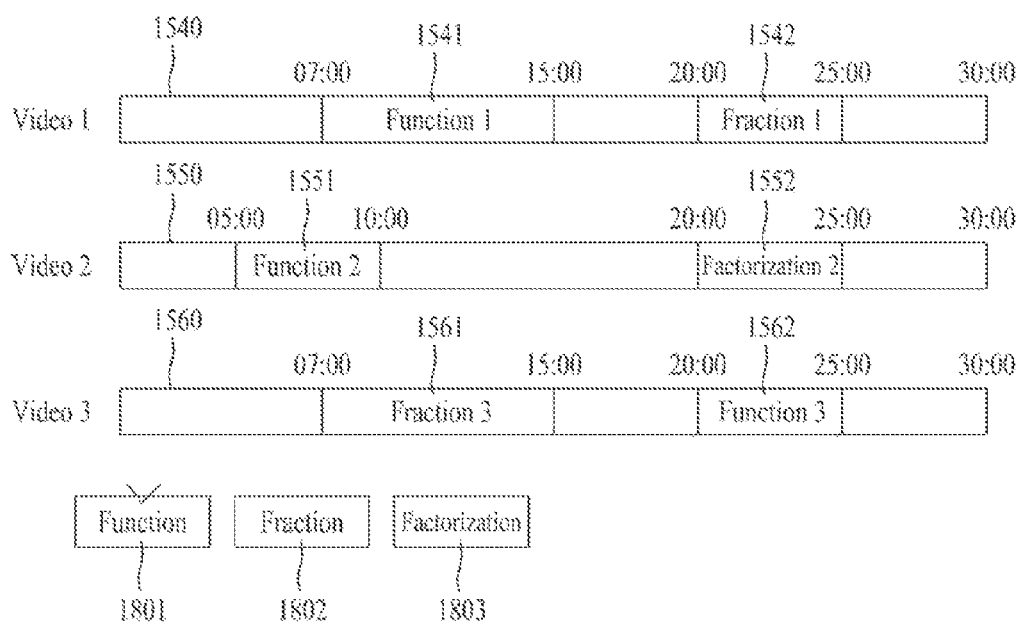
FIG. 18A and FIG. 18B are diagrams of screen configurations for generating a combined metadata in accordance with a section title according to the present invention.
Figure 18B:
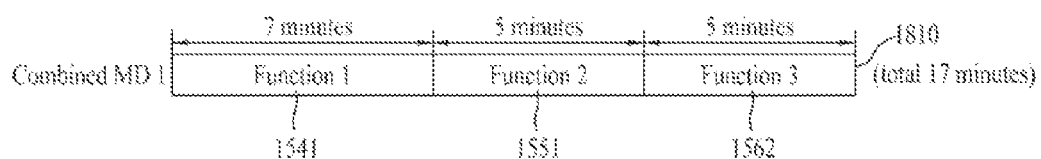

FIG. 18A and FIG. 18B are diagrams of screen configurations for generating a combined metadata in accordance with a section title according to the present invention. For clarity and convenience of the following description, assume that the metadata set section indicator shown in FIG. 15D is being displayed.

Referring to FIG. 18A, the mobile terminal 100 displays a plurality of title indicators 1801 and 1803 and is then able to receive a selection of the title indicator 'Function' 1801 from a user. In this case, the title indicators 1801 to 1803 are able to indicate the titles set as metadata on specific partial sections, respectively.

Referring to FIG. 18B, the mobile terminal 100 is able to combine the metadata set on the partial sections, on which the title 'Function' corresponding to the selected title indicator 1801 is set as metadata, together. In FIG. 18B, the combined metadata 1810 indicates the combination of a plurality of the metadata corresponding to the partial sections on which 'Function' is set as the metadata. In this case, the combination sequence can include one of a search sequence, a sequence designated by a user, a sequence designated by a content provider, and a sequence designated by a metadata provider.

Figure 19A:
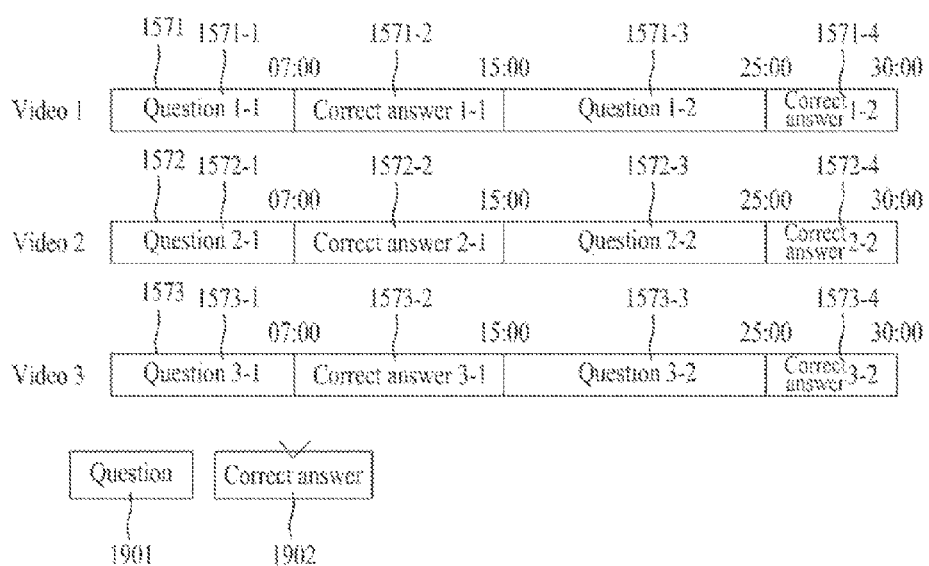
FIG. 19A and FIG. 19B are diagrams of screen configurations for generating a combined metadata in accordance with a section information type according to the present invention.
Figure 19B:
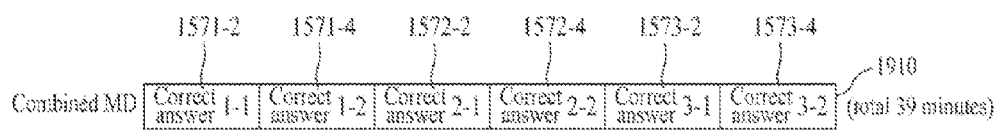

FIG. 19A and FIG. 19B are diagrams of screen configurations for generating a combined metadata in accordance with a section information type according to the present invention. For clarity and convenience of the following description, assume that the metadata set section indicator shown in FIG. 15E is being displayed.

Referring to FIG. 19A, the mobile terminal 100 displays a question indicator 1901 and a correct answer indicator 1902 on a prescribed region of the screen and is then able to receive a selection of the correct answer indicator 1902.

Referring to FIG. 19B, if the mobile terminal 100 receives the selection of the correct answer indicator 1902, the mobile terminal 100 is able to combine a plurality of the metadata set on the partial sections of which information type is 'correct answer'. In FIG. 19B, the combined metadata 1910 indicates the combination of a plurality of the metadata corresponding to the partial sections on each of which the information type 'correct answer' is set as the metadata.

Figure 20A:
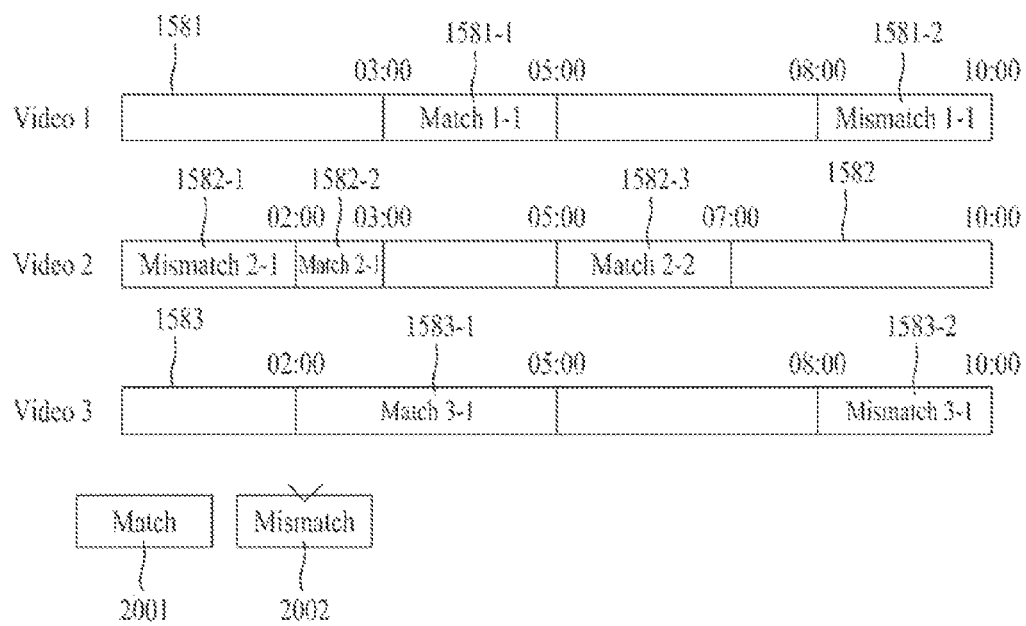
FIG. 20A and FIG. 20B are diagrams of screen configurations for generating a combined metadata in accordance with a match/mismatch for an input request section according to the present invention.
Figure 20B:

FIG. 20A and FIG. 20B are diagrams of screen configurations for generating a combined metadata in accordance with a match/mismatch for an input request section according to the present invention. For clarity and convenience of the following description, assume that the metadata set section indicator shown in FIG. 15F is being displayed.

Referring to FIG. 20A, the mobile terminal 100 displays a match indicator 2001 and a mismatch indicator 2002 on a prescribed region of the screen and is then able to receive a selection of the mismatch indicator 2002 from a user.

Referring to FIG. 20B, if the mobile terminal 100 receives the mismatch indicator 2002, the mobile terminal 100 is able to combine a plurality of the metadata set to 'mismatch' on an input request section together. In FIG. 20B, the combined metadata 2010 indicates the combination of a plurality of the metadata corresponding to the partial sections on each of which 'mismatch' is set as the metadata.

FIGS. 21A to 21D are diagrams of screen configurations for setting a divergence related metadata added to a combined metadata according to the present invention. For clarity and convenience of the following description, assume that $1^{st}$ to $6^{th}$ metadata 2111 to 2116 are sequentially contained in a combined metadata 2110.

Figure 21A:
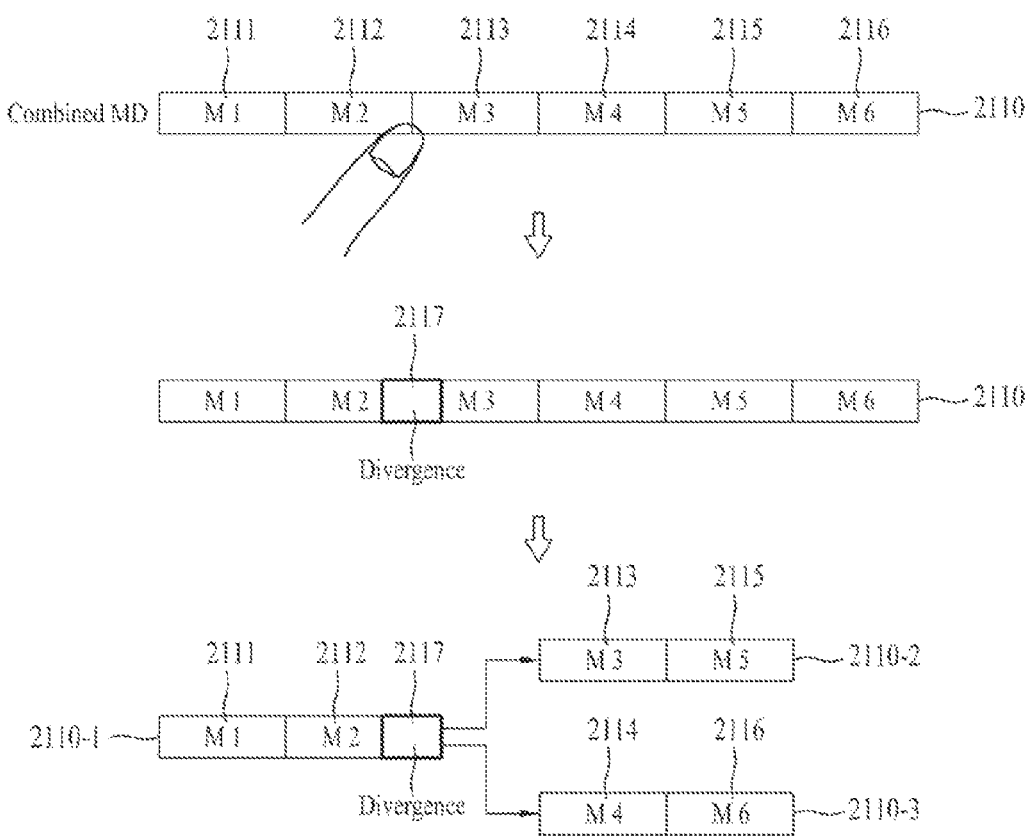

Referring to FIG. 21A, the mobile terminal 100 is able to receive a setting request signal for setting a divergence related metadata on a point next to the second metadata 2112. For instance, the setting request signal can be inputted in case of receiving one of a touch action on the second metadata 2112 in the middle of displaying a structure of the combined metadata 2110, a touch action between the second metadata 2112 and the third metadata 2113, and a touch action on the third metadata 2113.

Therefore, the mobile terminal 100 is able to set and arrange the divergence related metadata 2117 between the second metadata 2112 and the third metadata 2113 in the combined metadata 1210.

According to the setting of the divergence related metadata 2117, the mobile terminal 100 enables the $3^{rd}$ to $6^{th}$ metadata 2114 to 2116 situated next to the second metadata 2112 to diverge into the $3^{rd}$ and $5^{th}$ metadata (hereinafter named a $1^{st}$ target) 2110-2 and the $4^{th}$ and $6^{th}$ metadata (hereinafter named a second target) 2110-3 in accordance with a prescribed divergence reference. Therefore, video parts after the divergence timing point in the video created with reference to the combined metadata can diverge in accordance with the divergence of the metadata.

Figure 21B:
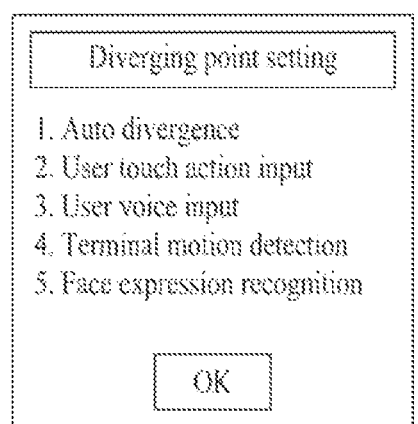
Figure 21B:
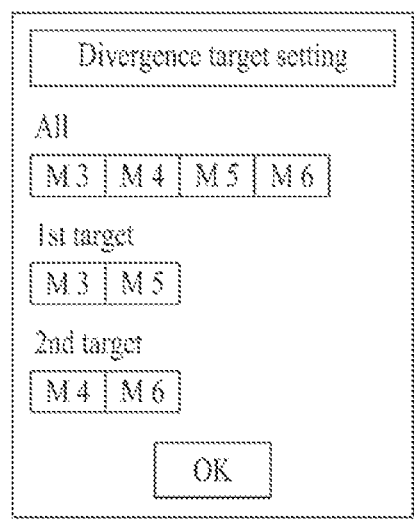

Referring to FIG. 21B, the mobile terminal 100 sets a divergence timing point in accordance with a user selection [FIG. 21B (a)]. And, the mobile terminal 100 is able to set a divergence target in accordance with a user selection [FIG. 21B (b)].

Referring to FIG. 21B (a), a user is able to select a plurality of divergence targets (e.g., $1^{st}$ targets M3 and M5, $2^{nd}$ targets M4 and M6) including at least one of a plurality of metadata M3 to M6 situated next to a divergence related metadata.

Referring to FIG. 21C, in case that a plurality of divergence targets are set, the mobile terminal 100 is able to determine an output sequence of a plurality of the divergence targets in accordance with a user selection. For instance, the mobile terminal 100 is able to set a partial section corresponding to a $1^{st}$ target to be preferentially outputted (i.e., $1^{st}$ target preferential output). For another instance, the mobile terminal 100 is able to set a partial section corresponding to a $2^{nd}$ target to be preferentially outputted (i.e., $2^{nd}$ target preferential output). For further instance, the mobile terminal 100 is able to set a partial section corresponding to a $1^{st}$ target and a partial section corresponding to a $2^{nd}$ target to be simultaneously outputted (i.e., simultaneous output).

Figure 21D:
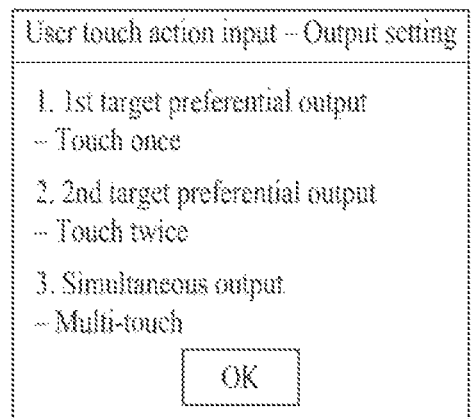
Figure 21D:
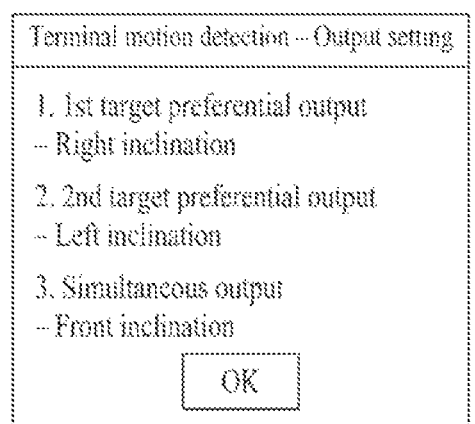

Referring to FIG. 21D, in case that a user touch action is set as a divergence timing point, the mobile terminal 100 is able to set a preferential output target to be selected in accordance with a touch pattern [FIG. 21D (a)]. In case that a terminal motion detection is set as a divergence timing point, the mobile terminal 100 is able to set a preferential output target to be selected in accordance with a motion pattern [FIG. 21D (b)]. In doing so, the touch pattern or the motion pattern can be set variously in accordance with a user selection.

Referring to FIG. 21D (a), the mobile terminal 100 is able to set the first target to be selected as the preferential output target in case of a touch inputted once. The mobile terminal 100 is able to set the second target to be selected as the preferential output target in case of a touch inputted twice. And, the mobile terminal 100 is able to set both of the first and second targets to be simultaneously outputted in case of a multi-touch input.

Referring to FIG. 21D (b), the mobile terminal 100 is able to set the first target to be selected as the preferential output target in case of a right inclination detection. The mobile terminal 100 is able to set the second target to be selected as the preferential output target in case of a left inclination detection. And, the mobile terminal 100 is able to set both of the first and second targets to be simultaneously outputted in case of a front inclination detection.

The above-described setting process in FIGS. 21B to 21D can be performed at a divergence timing point in the course of a video play, before a predetermined time from a divergence timing point, a user selected timing point in the course of a video play, or at a random timing point having nothing to do with a video play.

Referring now to FIG. 12, in case that the at least one or more specific metadata corresponding to the at least one specific section information are combined in the combining step S1240, the mobile terminal 100 generates a video including at least one specific partial section having at least one specific metadata set thereon under the control of the controller 180 [S1250].

Subsequently, the mobile terminal 100 is able to play the generated video under the control of the controller 180 [S1260]. In particular, the played video can be outputted via the output unit 150.

In the generating step S1250, the arrangement sequence of the at least one or more specific partial sections can follow the combination sequence of the at least one or more specific metadata. For instance, in case that $1^{st}$ to $3^{rd}$ specific metadata are set on $1^{st}$ to $3^{rd}$ specific partial sections, respectively, if the combination sequence of the specific metadata is '$3^{rd}$ specific metadata→$1^{st}$ specific metadata→$2^{nd}$ specific metadata', the arrangement sequence of the specific partial sections can follow the sequence of '$3^{rd}$ specific partial section→$1^{st}$ specific partial section→$2^{nd}$ specific partial section'.

In the generating step S1250, in case that at least one or more specific metadata are combined, the mobile terminal 100 searches for the at least one or more specific partial sections respectively corresponding to the at least one specific metadata and is then able to generate a new video including the found at least one or more specific partial sections. In doing so, the found at least one specific partial sections can be arranged in the combination sequence of the specific metadata.

In this case, the specific partial section corresponding to the specific metadata is found from the memory 160, received or found from the content managing server 220, or can be received from the counterpart terminal 230.

The controller 180 controls the generated video to be stored in the memory 160. The controller 180 controls the generated video to be transmitted and stored in the content managing server 220. In doing so, the whole generated video can be stored or the specific partial section contained in the generated video can be stored individually. Moreover, an identification information indicating that the video is generated by the metadata combination can be included in each of the specific partial sections.

The controller 180 is able to set a metadata for the generated video. For instance, the controller 180 is able to set a video play time information, an information (e.g., a play time per section, a frame information per section, etc.) on a specific partial section contained in a video, a video generated time information, a video title information, a video generation terminal information and the like. Of course, various kinds of metadata can be further set.

The video generation or creation according to the combined metadata from the mobile terminal 100 in the generating step S1250 is described in detail as follows.

For instance, in case that the combined metadata results from the combination of a plurality of specific metadata of a specific metadata type, the generated video can be constructed with partial sections, on each of which the metadata corresponding to the specific metadata type is set, only. For another instance, in case that the combined metadata results from the combination of a plurality of specific metadata corresponding to a specific title, the generated video can be constructed with partial sections, on each of which the specific title is set as the metadata, only.

For another instance, in case that the combined metadata results from the combination of a plurality of specific metadata corresponding to a specific information type (e.g., question, correct answer, wrong answer, solution of question, etc.), the generated video can be constructed with partial sections, on each of which the specific information type is set as metadata, only. For further instance, in case that the combined metadata results from the combination of a plurality of specific metadata on each of which 'match (or mismatch)' is set for a request input section, the generated video can be constructed with partial sections, on each of which 'match (or mismatch)' is set as metadata, only.

In the following description, the playing step S1260 is explained in detail with reference to the accompanying drawings.

FIGS. 22A to 22E are diagrams of screen configurations for performing a metadata output or a video search in the course of playing a video generated using a combined metadata according to the present invention.

Figure 22A:
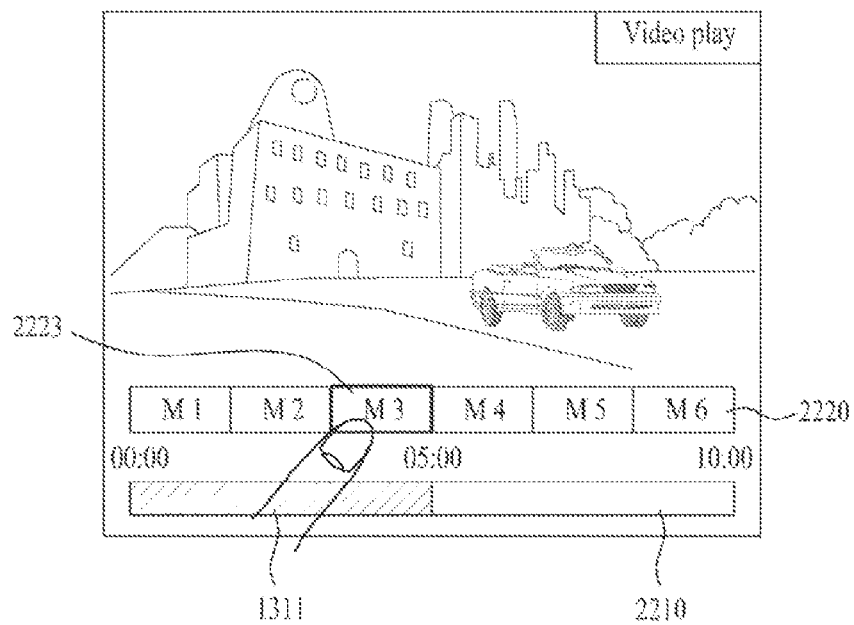
FIGS. 22A to 22E are diagrams of screen configurations for performing a metadata output or a video search in the course of playing a video generated using a combined metadata according to the present invention.

Referring to FIG. 22A, the mobile terminal 100 is able to play a video generated using combined metadata. And, the mobile terminal 100 is able to output a video signal and an audio signal according to the video play using the display unit 151 and the audio output module 152, respectively.

In particular, the mobile terminal 100 is able to display an indicator (not shown in the drawing), which indicates that the currently outputted video is the video generated from the metadata combination, on a prescribed region of the screen.

The mobile terminal 100 is able to display a video play progress indicator 2210 and a metadata indicator 2220 corresponding to the currently outputted video separately. In doing so, a plurality of regions respectively corresponding to a plurality of specific metadata constructing the combined metadata can be identifiably displayed on the metadata indicator 2220. Occasionally, a function of the metadata indicator can be accomplished using the video play progress indicator 2210 as well.

The mobile terminal 100 is able to identifiably display a region 2223 corresponding to a currently played video part among a plurality of the regions included in the metadata indicator 2220.

Figure 22B:
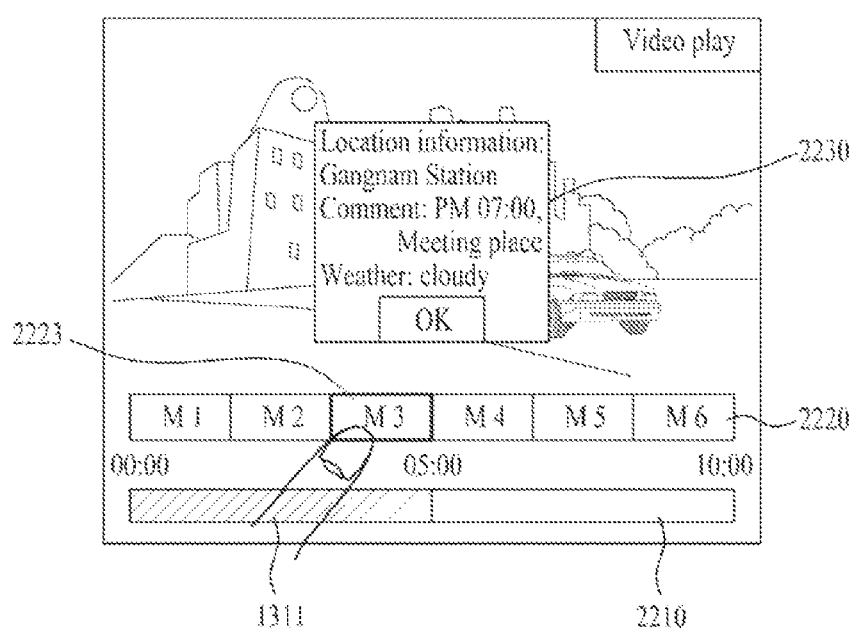

Referring to FIG. 22B, if a specific region 2223 is selected from the metadata indicator 2220, the mobile terminal 100 is able to output the metadata 2230 set on a specific partial section corresponding to the specific region 2223.

Figure 22C:
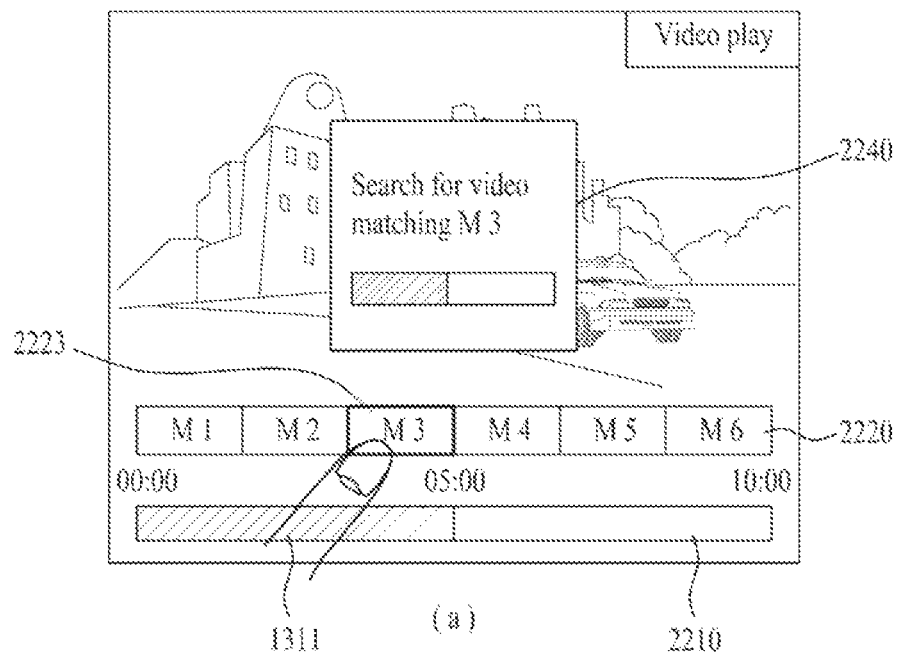
Figure 22C:
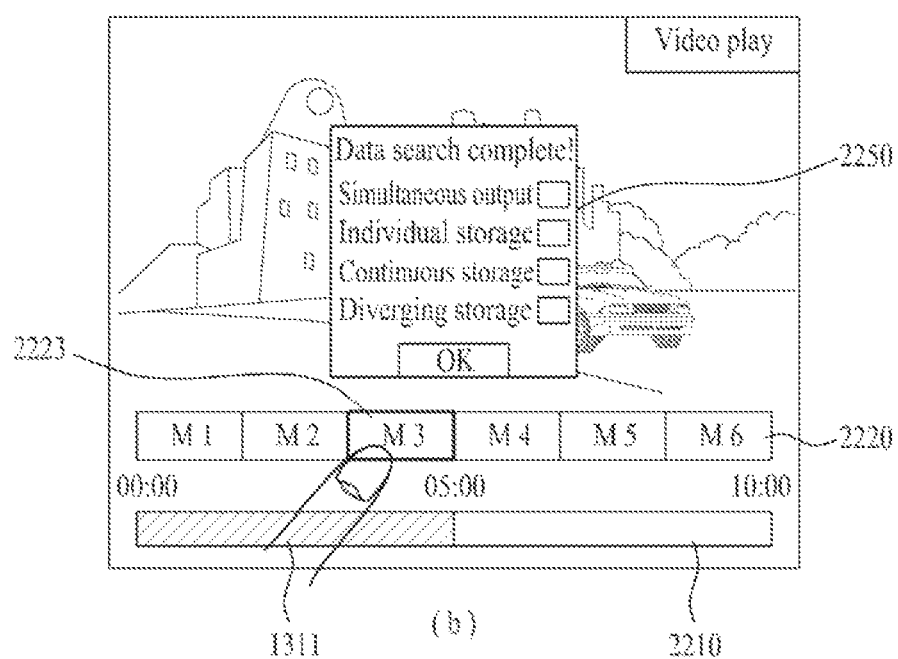

Referring to FIG. 22C, if a specific region 2223 is selected from the metadata indicator 2220 shown in FIG. 22A, the mobile terminal 100 is able to display a search progress rate 2240 while searching the video with a search condition set to the metadata set on the specific partial section corresponding to the specific region 2223 [FIG. 22C (a)]. If the video search is completed, the mobile terminal 100 outputs a control operation list 2250 for the searched video and then enables a user to select a specific control operation from the control operation list 2250 [FIG. 22C (b)]. Of course, the video is just one example and no limitation is put on a type of a search target content.

Figure 22D:
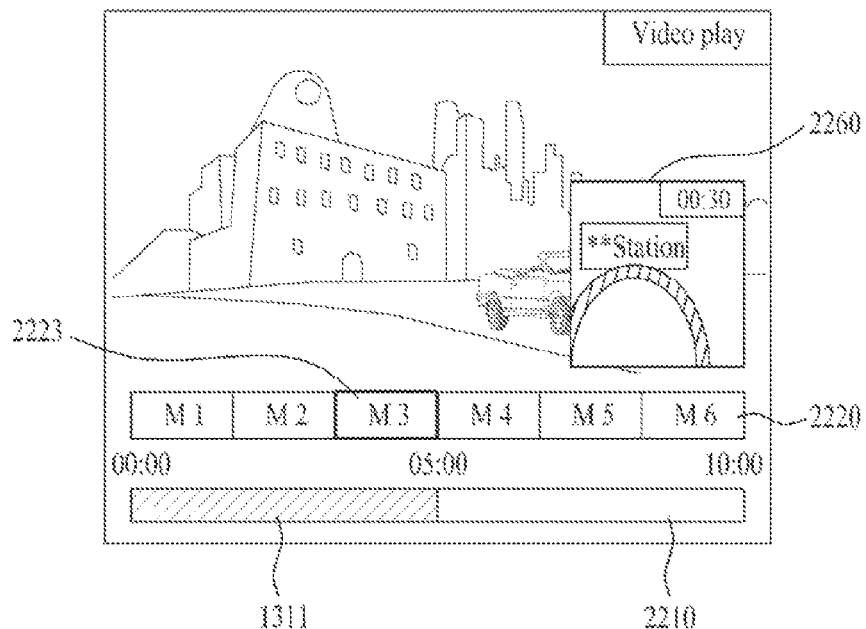

Referring to FIG. 22D, if 'simultaneous output' is selected as the specific control operation in FIG. 22C (b), the mobile terminal 100 is able to display the searched video on a prescribed region 2260 of the screen while maintaining the video play.

Figure 22E:
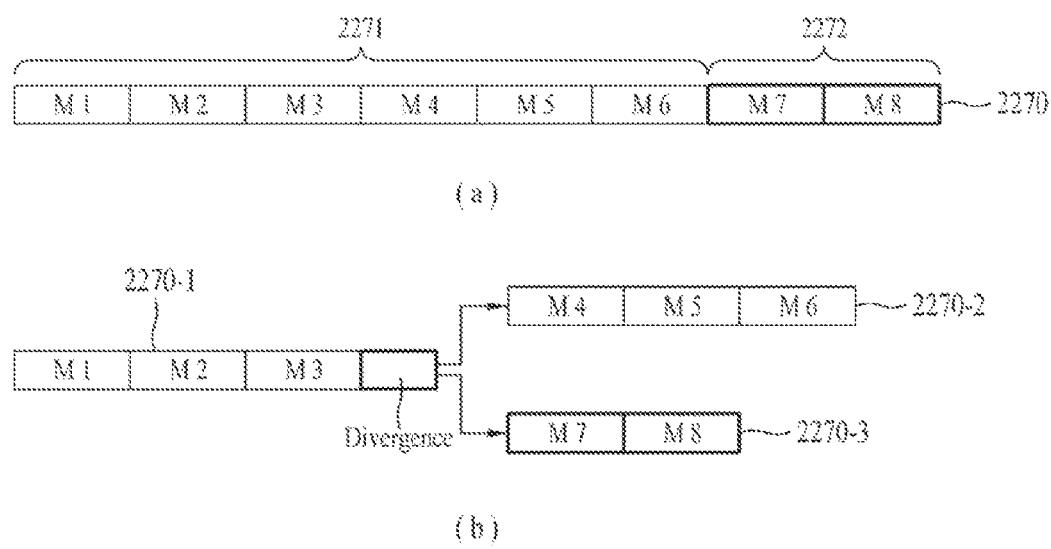

Referring to FIG. 22E (a), if 'continuous storage' is selected as the specific operation in FIG. 22C (b), the mobile terminal 100 is able to combine a metadata 2272 corresponding to the searched video in continuation with a metadata 2271 of a currently outputted video. Therefore, the currently outputted video and the searched video can be stored in a manner of being combined together.

Referring to FIG. 22E (b), if 'divergence storage' is selected as the specific control operation in FIG. 22C (b), the mobile terminal 100 additionally sets a divergence related metadata next to a metadata M3 corresponding to a specific region 2223 in order for the video parts corresponding to a first target and a second target to diverge from a point next to the metadata M in a manner of setting a plurality of metadata (M4 to M6) 2270-2 following the metadata M3 to the first target and setting a plurality of metadata (M7, M8) 2270-3 of the searched video to the second target.

FIGS. 23A to 23D are diagrams of screen configurations for displaying an output process after a diverging point if a divergence related metadata is included in a combined metadata according to the present invention. For clarity and convenience of the following description, assume that a video generated using combined metadata (divergence related metadata included) is being played.

Figure 23A:
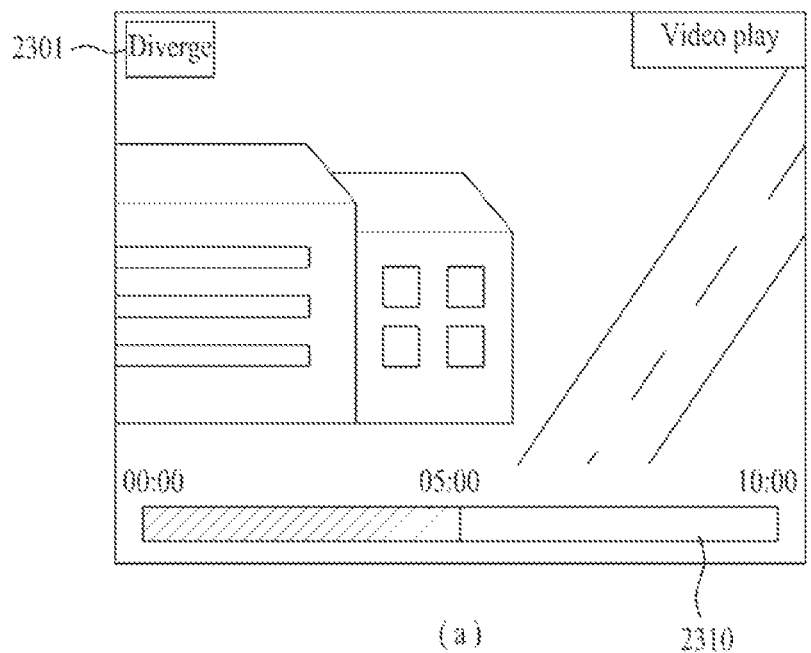
FIGS. 23A to 23D are diagrams of screen configurations for displaying an output process after a diverging point if a divergence related metadata is included in a combined metadata according to the present invention.
Figure 23A:
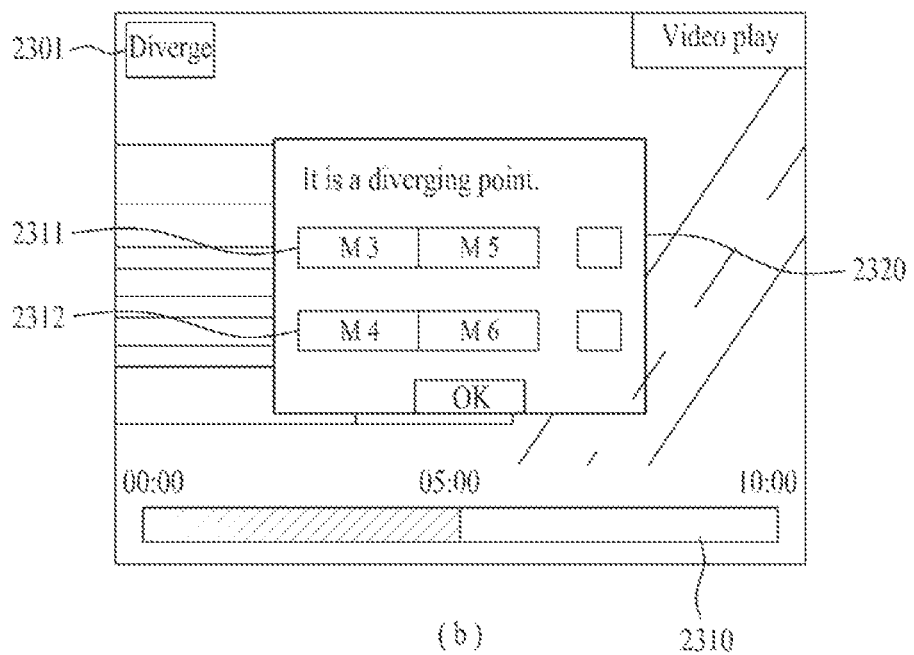

Referring to FIG. 23A, if a diverging point is reached in the course of a video play, the mobile terminal 100 displays a divergence indicator 2301 on a prescribed region of the screen [FIG. 23A (a)]. Alternatively, the mobile terminal 100 is able to display a window 2320 for enabling a user to select a target to output from a plurality of targets while announcing the diverging point [FIG. 23A (b)].

Of course, if 'auto divergence' is set [cf. FIG. 21B], the screen configuration shown in FIG. 23A can be omitted. If a preferential output target is designated in advance [cf. FIG. 21O], the screen configuration shown in FIG. 23A (b) can be omitted.

Figure 23B:
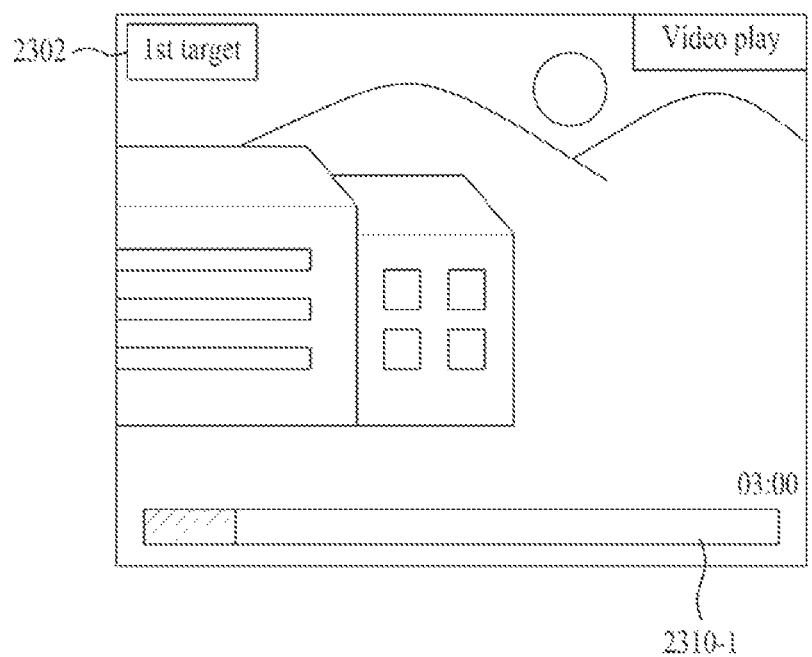

Referring to FIG. 23B, if a preferential output of a first target 2311 is selected in FIG. 23A (b), the mobile terminal 100 is able to play a video part corresponding to the first target. In doing so, a video play progress rate indicator 2310-1 is able to display the video part corresponding to the first target as a whole video. And, the mobile terminal 100 is able to display an indicator 2302, which indicates that the video part corresponding to the first target is being played, on a prescribed region of the screen.

Referring to FIG. 23O, if a simultaneous output of the first and second targets 2311 and 2312 is selected in FIG. 23A (b), the mobile terminal 100 displays an output screen of the video part corresponding to the first target on a first screen region and is also able to display an output screen of the video part corresponding to the second target on a second screen region.

In doing so, a video play progress rate indicator 2310-1 displayed on the first screen region displays the video part corresponding to the first target as a whole video. And, a video play progress rate indicator 2310-2 displayed on the second screen region displays the video part corresponding to the second target as a whole video. Moreover, an indicator 2302, which indicates that the video part corresponding to the first target is being played, and an indicator 2303, which indicates that the video part corresponding to the second target is being played, can be displayed on the first screen region and the second region, respectively.

Figure 23C:
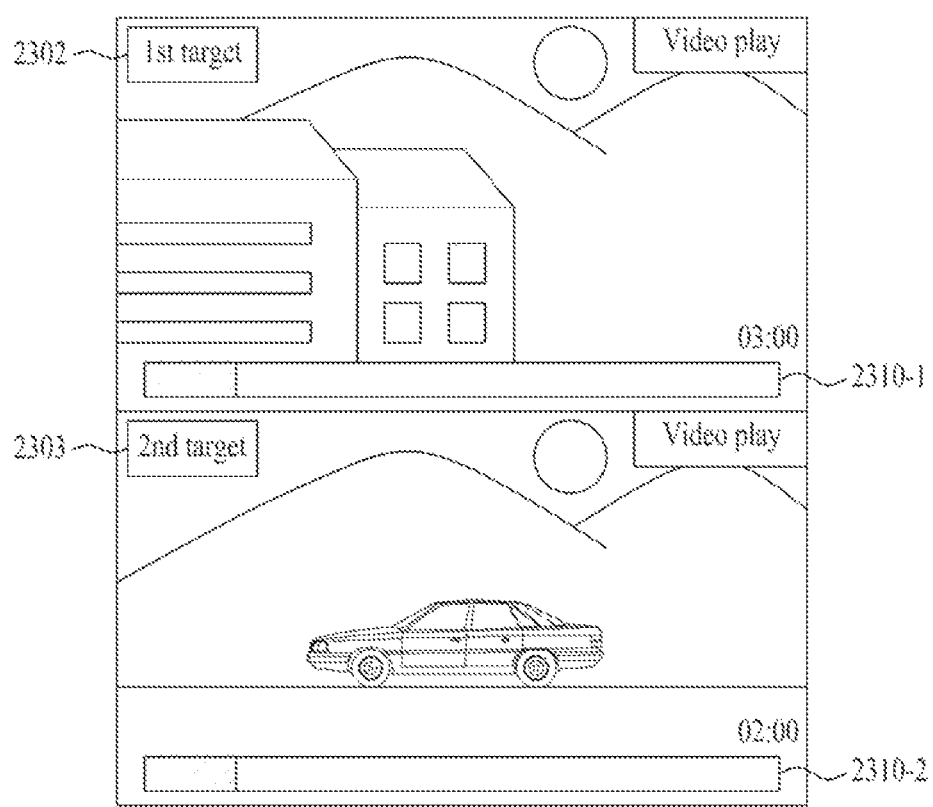
Figure 23D:
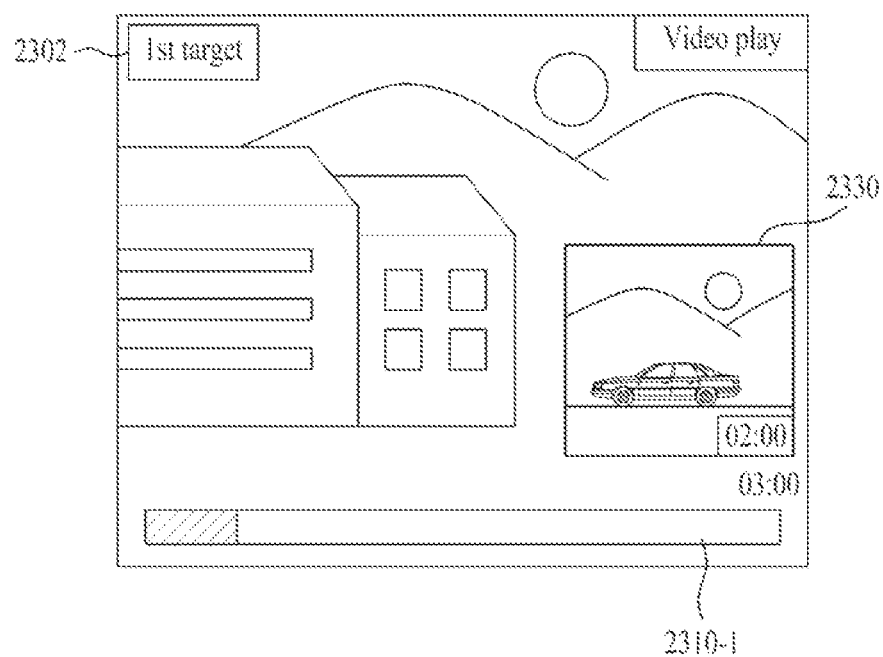

Referring to FIG. 23D, if the simultaneous output of the first and second targets 2311 and 2312 or the preferential output of the first target 2311 is selected in FIG. 23A (b), the mobile terminal 100 is able to display an output screen of the video part corresponding to the second target on a subscreen 2330 while displaying an output screen of the video part corresponding to the first target on a main screen.

In particular, in FIG. 23C or FIG. 23D, the mobile terminal 100 is able to output an audio signal corresponding to the video part of either the first target or the second target in accordance with a user selection, a priority designated as default or which target is displayed on the main screen.

According to the present invention, in case of taking a first video and a second video using the camera 121, if a predetermined time interval exists between the first video and the second video, the mobile terminal 100 searches for a metadata set on a random video with a random search condition and then connects the found metadata between a first metadata corresponding to the first video and a second metadata corresponding to the second video. Thus, the mobile terminal 100 is able to sequentially combine the first metadata, the found metadata and the second metadata.

In this case, the video search point can include one of a random point between a photographing start point of the second video and a photographing end point, a photographing end point of the video, a user search request point and the like.

The search condition can include the metadata contained in the first or second video, and more particularly, a metadata contained in common. For instance, if a photographing place, a photographing time and a specific object included in a video are set as metadata, they can be set as the search conditions. Of course, a search condition can be directly inputted by a user irrespective of a presence or non-presence of a relation with the first or second video.

Therefore, the mobile terminal 100 is able to generate or create a new video containing the first video having the first metadata set thereon, the searched video having the search metadata set thereon and the second video having the second metadata set thereon in sequence. This is described with reference to FIGS. 24A to 24C as follows.

Figure 24A:
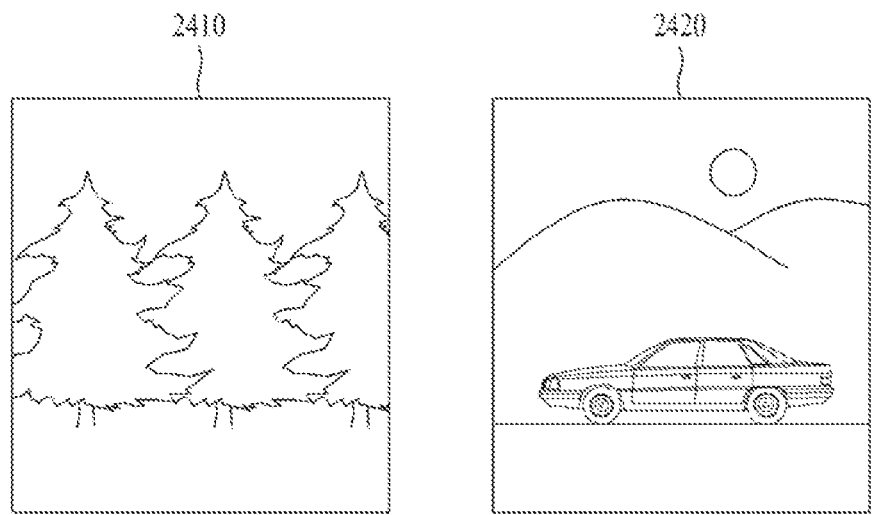
FIGS. 24A to 24C are diagrams of screen configurations for adding a different video between a first video taking and a second video taking according to the present invention.
Figure 24B:
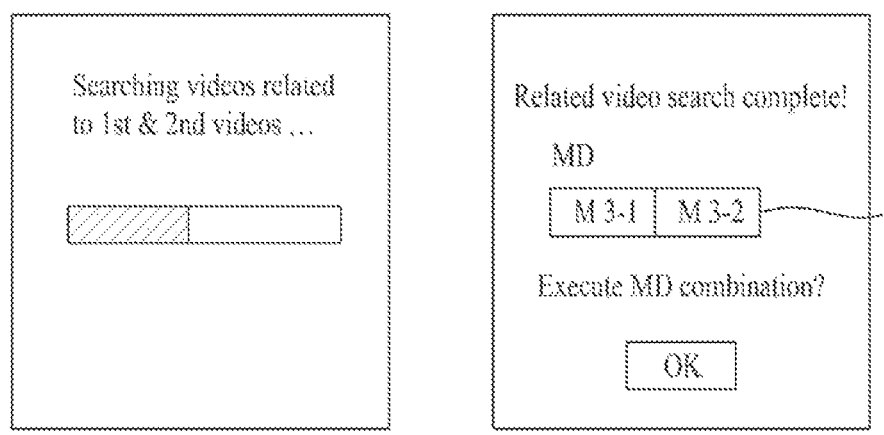
Figure 24C:
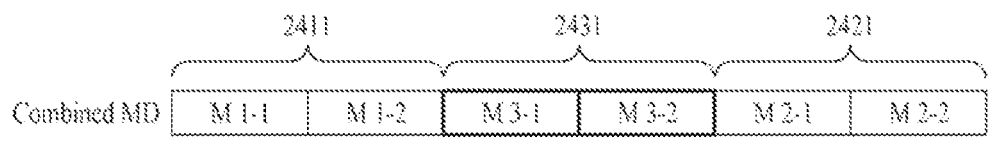

FIGS. 24A to 24C are diagrams of screen configurations for adding a different video between a first video taking and a second video taking according to the present invention.

Referring to FIG. 24A, the mobile terminal 100 is able to take a first video 2410 and a second video 2420, between which a predetermined time interval exists. In particular, a photographed time of the first video 2410 is AM 09:00~AM 09:05 and the first video 2410 has a first metadata 2411. A photographed time of the second video 2420 is AM 09:10~AM 09:20 and the second video 2420 has a second metadata 2421. Hence, the predetermined time interval in-between is 5 minutes.

Referring to FIG. 24B, the mobile terminal 100 searches a metadata of a video, which is to be added between the first video and the second video, or the video itself [FIG. 24B (a)]. If the search process is completed, the mobile terminal 100 enables a user to select whether to add the found metadata 2431 between the metadata of the first video and the metadata of the second video [FIG. 24B (b)].

Referring to FIG. 24C, if 'add' is selected in FIG. 24B (b), the mobile terminal 100 is able to generate the combined metadata generated from combining the metadata 2411 of the first video, the found metadata 2431 and the metadata 2421 of the second video in sequence.

To correspond to the generated combined metadata, the mobile terminal 100 is able to generate a new video containing the first video, the video corresponding to the found metadata 2431 and the second video in sequence.

According to the present invention, the mobile terminal 100 is able to edit a metadata previously set on a specific content in accordance with a user selection. In this case, the 'edit' can mean one of 'delete', 'modify', 'add' and the like. This is described with reference to FIG. 25A and FIG. 25B as follows.

Figure 25A:
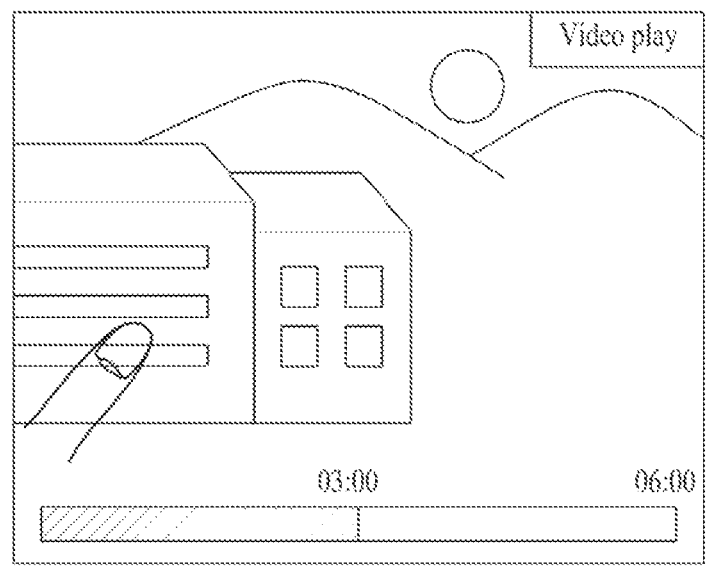
FIG. 25A and FIG. 25B are diagrams of screen configurations for editing a preset metadata according to the present invention.
Figure 25A:
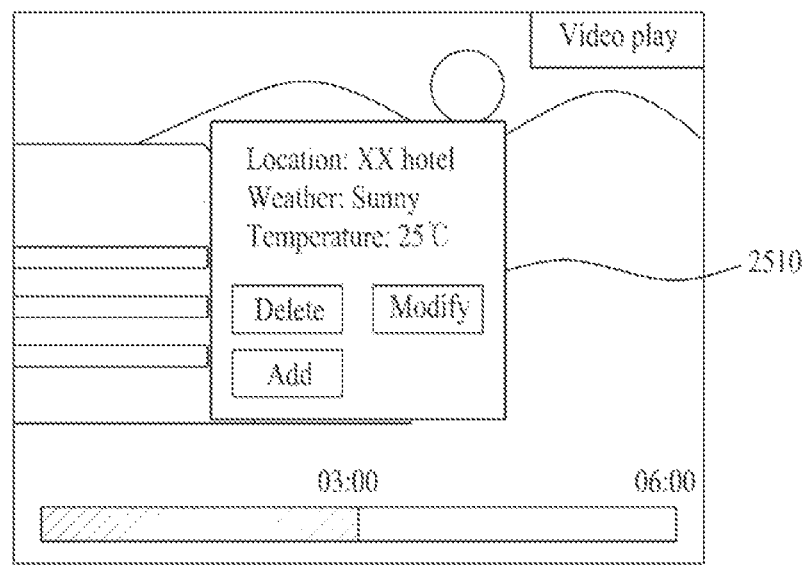
Figure 25B:
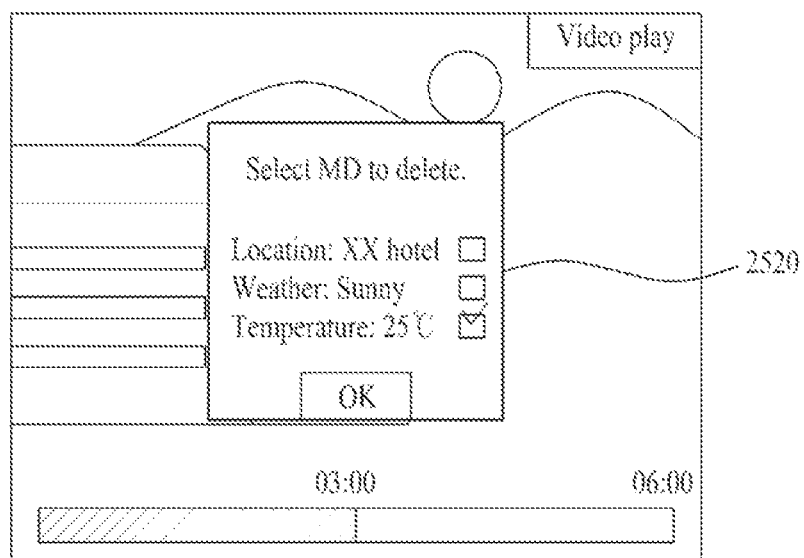
Figure 25B:
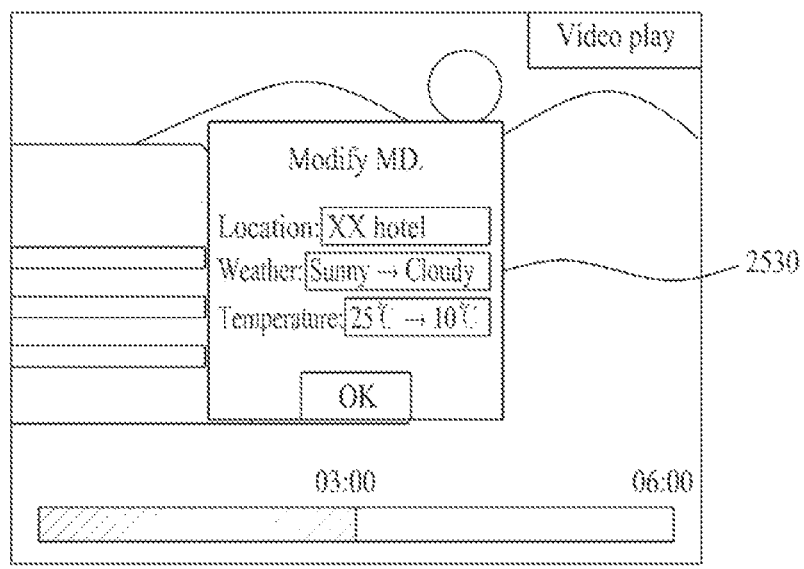

FIG. 25A and FIG. 25B are diagrams of screen configurations for editing a preset metadata according to the present invention.

Referring to FIG. 25A, in case of receiving an input of a selection action on a random point of the screen in the course of playing a video [FIG. 25A (a)], the mobile terminal 100 is able to display a window 2510 including at least one metadata set on a currently played part (e.g., object, still image, partial video, etc.) or a currently played whole video and editing operations executable on the metadata [FIG. 25A (b)].

Referring to FIG. 25B (a), if 'delete' is selected as the editing operation in FIG. 25A (b), the mobile terminal 100 is able to display a window 2520 for receiving an input of a delete command for the at least one metadata shown in FIG. 25A (b). Therefore, a user is able to select a metadata to delete.

Referring to FIG. 25B (b), if 'modify' is selected as the editing operation in FIG. 25A (b), the mobile terminal 100 is able to display a window 2530 for receiving an input of a modify command for the at least one metadata shown in FIG. 25A (b). Therefore, a user is able to input an information to modify for a prescribed metadata.

If 'add' is selected as the editing operation in FIG. 25A (b) [not shown in the drawing], the mobile terminal 100 is able to receive an input of an additional information on a prescribed one of the at least one or more metadata shown in FIG. 25A (b).

Of course, the mobile terminal 100 arbitrarily brings the metadata stored in the memory 160 and is then able to edit the corresponding metadata at any time. The mobile terminal 100 accesses the metadata managing server 210 or the content managing server 220, brings the metadata stored in the accessed server, and is then able to edit the corresponding metadata, at any time.

According to the present invention, the mobile terminal is able to edit metadata and a corresponding video part using preset metadata in accordance with a user selection. In this case, the preset metadata can include the aforesaid combined metadata. This is described with reference to FIGS. 26A to 26C as follows.

Figure 26A:
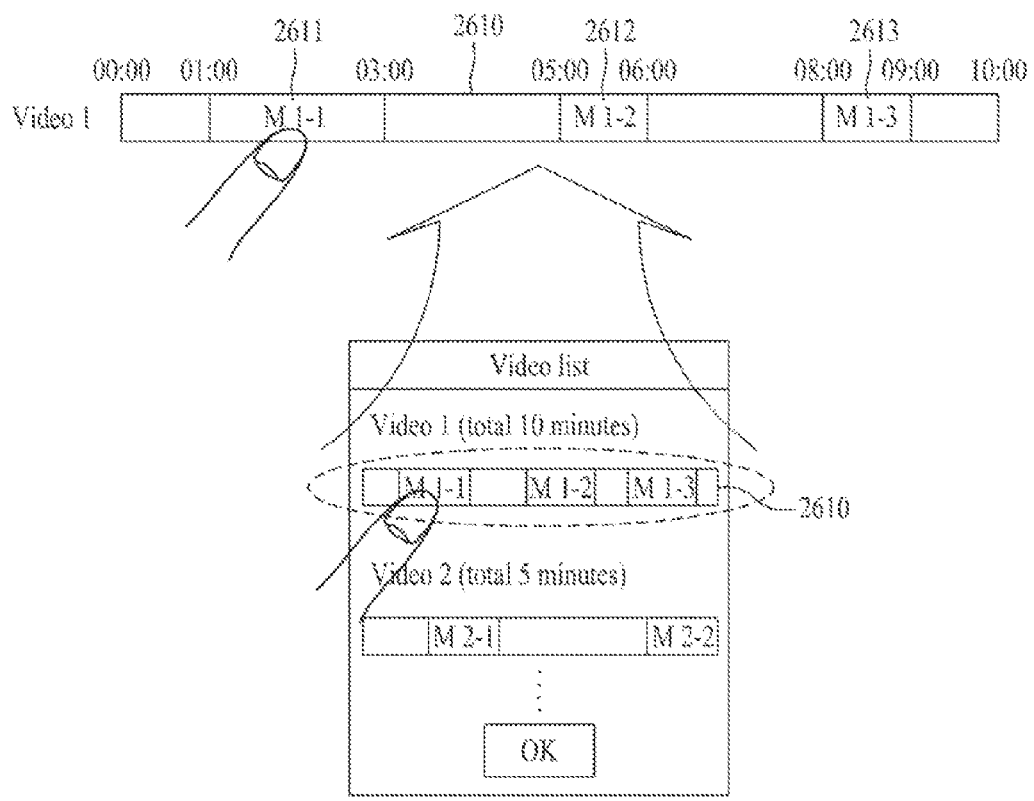
FIGS. 26A to 26C are diagrams of screen configurations for editing a metadata and a corresponding video part using a preset metadata according to the present invention.
Figure 26B:
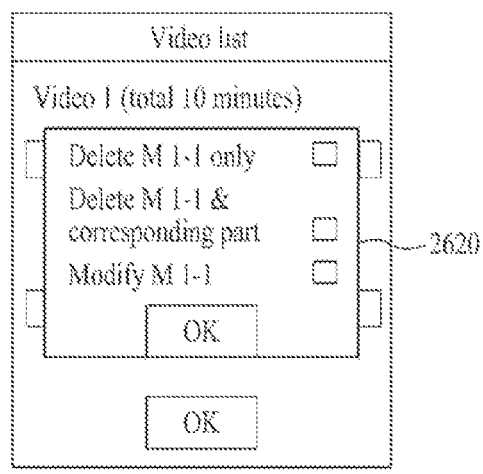
Figure 26C:
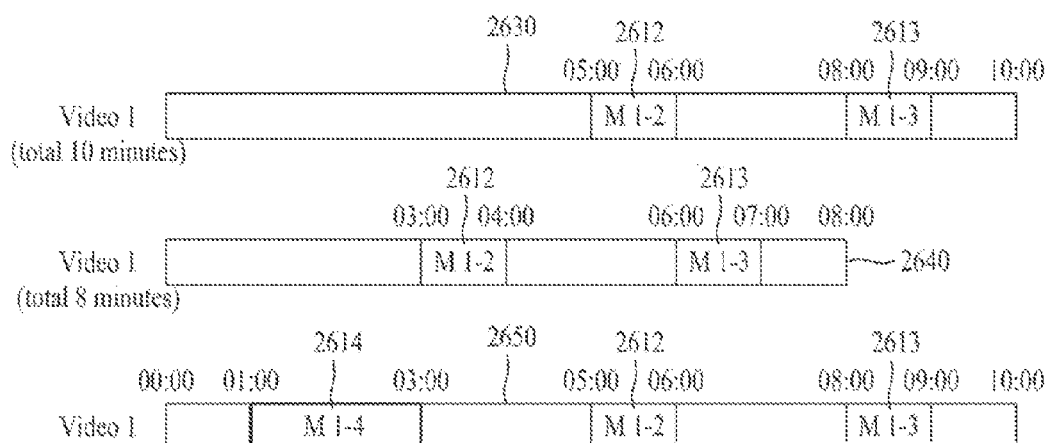

FIGS. 26A to 26C are diagrams of screen configurations for editing a metadata and a corresponding video part using a preset metadata according to the present invention.

Referring to FIG. 26A, if at least one partial section having metadata set thereon is contained in a random video, the mobile terminal 100 is able to receive an input of a selection action on a specific one of the at least one or more partial sections or an input of a selection action on a specific metadata set on the specific partial section.

For instance, as the selection action on the specific partial section or the selection action on the specific metadata, the mobile terminal 100 is able to receive an input of a selection action on a specific region 2611 included in a metadata set section indicator 2610.

In this case, the selection can include an editing command for the specific partial section or the specific metadata.

Referring to FIG. 26B, in case of receiving the input of the selection action on the specific region 2611 shown in FIG. 26A, the mobile terminal 100 is able to display a window 2620 for enabling a user to select one of 'delete metadata corresponding to the specific region 2611 (hereinafter named 'Delete M1-1 only')', 'delete partial section and metadata corresponding to the specific region 2611 all (hereinafter named 'Delete M1-1 & corresponding part')', and 'modify metadata corresponding to the specific region 2611 (add included) (hereinafter named 'Modify M1-1')'.

Referring to FIG. 26C, a metadata set section indicator 2630 indicates that the metadata corresponding to the specific region 2611 is deleted due to the selection of the 'delete M1-1' in FIG. 26B [deletion of identifiably display of the region 2611]. A metadata set section indicator 2640 displays that the partial section and metadata corresponding to the specific region 2611 are deleted due to the selection of the 'delete M1-1 & corresponding part' in FIG. 26B [delete the region 2611 itself]. And, a metadata set section indicator 2650 is able to display the metadata M1-4 modified for the specific region (modified from 2611 to 2614) due to the selection of the 'modify M1-1' in FIG. 26B.

According to the present invention, the above-mentioned combined metadata and the video generated using the combined metadata can be shared with a plurality of terminals. In particular, the combined metadata and the generated video can be shared by the terminal-to-terminal sharing or the sharing via the metadata managing server 210 or the content managing server 220.

The metadata mentioned in the description of the present invention is able to include a record modified and edited by an original video. For instance, as metadata for a video generated using the combined metadata, it is able to set a web address information, an identification information and the like of an original video originally containing each of at least one partial section contained in the generated video. Moreover, as metadata of the original video, it is able to set web address information, identification information and the like of videos generated using a partial section contained in the original video.

According to the present invention, it is able to set a preferential indication as metadata for a content. A plurality of preference-marked metadata or contents having preference-marked metadata set thereon can be extracted only in the future. For instance, it is usable in generating a preferred metadata list or a preferred content list.

According to the present invention, a metadata group is shared among a plurality of terminals. And, search conditions respectively set by a plurality of the terminals can be included in the metadata group. Therefore, a plurality of the metadata matching the search conditions included in the metadata group and videos having the matched metadata set thereon can be searched. And, it is able to generate a new video by combining the found videos. The metadata search and the video generation can refer to the former descriptions.

According to the present invention, in case of generating a video using combined metadata, it is able to set an address information (e.g., URL, URI, etc.) of each of at least one or more partial sections contained in the generated video as a metadata of the generated video. Therefore, the present invention selects a specific partial section from the generated video and then provides the selected specific partial section to a user. In particular, in case that the generated video is shared among a plurality of terminals, the address information on each of the at least one partial section included in the generated video can be shared.

According to one embodiment of the present invention, the above-described video searching and editing methods using the metadata in the mobile terminal can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

Accordingly, the present invention provides the following effects and/or advantages.

First of all, the present invention can receive inputs of various search conditions, thereby searching for a video on which various metadata matching the various search conditions.

Secondly, the present invention is able to search for a metadata matching a search condition, thereby providing a user with a partial section matching the search condition or information on a video containing the partial section without searching for or playing the video in direct.

Thirdly, the present invention outputs an identification information on a partial section on which metadata matching a search condition is set, thereby providing a user with a whole video matching the search condition and an information on a partial section on which metadata matching the search condition is substantially set.

Fourthly, the present invention generates a new video containing at least one partial section in a manner of combining at least one metadata set on at least one partial section, thereby generating a video constructed with a specific part only in a simple manner without searching or playing an editing target video in direct.

Fifthly, the present invention generates a video constructed with user-desired parts, thereby generating videos of various types in accordance with user's necessity. For instance, the present invention is able to generate a specific chapter video, a wrong answer partial video, a problem solution partial video and the like.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
 a controller configured for searching for metadata set on each of at least one partial section of each of at least one video, and obtaining identification information and section information on each of the at least one partial section having the searched metadata set thereon;
 a display unit configured for displaying, under the control of the controller, the obtained identification information and section information, wherein the obtained section information comprises at least one obtained section information; and
 a user input unit configured for receiving a selection of at least one specific section information of the at least one obtained section information and receiving a prescribed input during playing of at least one input request section of one of the at least one video, the prescribed input corresponding to a selection of either a match or a mismatch based on whether the prescribed input matches a previously designated reference value,
 wherein the at least one partial section corresponds to an object in a corresponding video of the at least one video having the metadata set thereon, a still image in the corresponding video having the metadata set thereon, or a portion of the corresponding video having the metadata set thereon, wherein the controller is further for sequentially combining metadata of each of at least one specific metadata corresponding to each of the selected at least one specific section information and setting a metadata for each of the at least one input request section as the match or the mismatch based on whether the prescribed input matches the previously designated reference value, wherein the display unit is further configured for displaying a match indicator or a mismatch indicator on a prescribed region of a screen of the display unit, wherein the controller is further configured for generating, in response to a selection of either the match indicator or the mismatch indicator, a video comprising more than one specific partial section of the at least one partial section having the at least one specific metadata set thereon as the match or the mismatch, wherein the controller is further configured for, if the prescribed input corresponds to a selection of the match, selecting a section information of the corresponding input request section as specific section information, and, if the prescribed input corresponds to a selection of the mismatch, selecting a section information of the corresponding input request section as specific section information.

2. The mobile terminal of claim 1, wherein the user input unit is further configured for receiving an input for setting a search condition for the metadata.

3. The mobile terminal of claim 2, wherein:
the display unit is further configured for outputting an image comprising at least one object;
the user input unit is further configured for receiving input of a selection of a specific object of the at least one object; and
the controller is further configured for setting the search condition to at least the specific object or a property of the specific object.

4. The mobile terminal of claim 2, wherein:
the user input unit is further configured for receiving input of a selection of a specific partial section of the at least one partial section having the searched metadata set thereon; and
the controller is further configured for setting the search condition to the searched metadata.

5. The mobile terminal of claim 1, further comprising:
a memory configured for storing the at least one video or metadata related to each of at least one partial section of each of the at least one video; and
wherein the controller is further configured for searching the stored metadata for the metadata set on each of the at least one partial section.

6. The mobile terminal of claim 1, further comprising:
a wireless communication unit configured for transmitting, under the control of the controller, a metadata search request signal to a metadata managing server;
wherein the controller is further configured for accessing the metadata managing server, when the metadata search request signal is transmitted, and searching the metadata managing server for the metadata set on each of the at least one partial section.

7. The mobile terminal of claim 1, wherein the display unit is further configured for identifiably displaying, under the control of the controller:
an entire indicator corresponding to an entire video of the at least one video; and
a region of the entire indicator corresponding to the at least one partial section as the identification information.

8. The mobile terminal of claim 1, wherein the display unit is further configured for displaying:
an individual indicator for each of the at least one partial section as the identification information, and
time information of each of the individual indicator of the corresponding at least one partial section, a metadata of the individual indicator of each of the corresponding at least one partial section, or type information of the individual indicator of each of the corresponding at least one partial section.

9. The mobile terminal of claim 1, wherein the user input unit is further configured for receiving a selection of a specific partial section of the at least one partial section having the searched metadata set thereon, and
wherein the display unit is further configured for outputting the metadata set on the selected specific partial section or a video corresponding to the selected specific partial section.

10. The mobile terminal of claim 1, further comprising a memory configured for:
storing the generated video under the control of the controller; and
storing the combined metadata of each of the at least one specific metadata as a metadata corresponding to the generated video.

11. The mobile terminal of claim 1, wherein:
the display unit is further configured for displaying, under the control of the controller, a metadata set section indicator for the generated video, and displaying at least one region within the metadata set section indicator as the section information, the at least one region corresponding to the metadata set on the at least one partial section; and
the user input unit is further configured for receiving a selection of a region, of the displayed at least one region, corresponding to the specific section information.

12. The mobile terminal of claim 1, wherein the controller is further configured for:
setting, when a plurality of the specific metadata exist, a divergence related metadata at a random point in the plurality of the specific metadata, and
generating the video when a first of the plurality of specific metadata and a second of the plurality of specific metadata are positioned behind the random point such that a first specific partial section of the at least one partial section corresponding to the first of the plurality of specific metadata and a second specific partial section of the at least one partial section corresponding to the second of the plurality of specific metadata diverge from each other after the random point.

13. The mobile terminal of claim 12, wherein:
the divergence related metadata comprises diverging point information for diverging the plurality of the specific metadata or divergence configuration information indicating a divergence configuration for specific metadata positioned behind the random point; and
the diverging point information for diverging the plurality of the specific metadata is based on at least an auto divergence, a divergence occurring in response to receiving specific input, or a divergence occurring in response to a detection of a specific status.

14. The mobile terminal of claim 1, wherein the section information comprises mark information on the at least one partial section within the corresponding video of the at least one video as the metadata set on the partial section.

15. The mobile terminal of claim 1, wherein the display unit is further configured for displaying, under the control of the controller, the metadata set on each of the at least one partial section as the section information.

16. A method of managing a video in a mobile terminal, the method comprising:
- searching, via a controller, for metadata set on each of at least one partial section of each of at least one video;
- obtaining, via the controller, identification information and section information on each of the at least one partial section having the searched metadata set thereon;
- displaying, on a display unit, the obtained identification information and section information, wherein the obtained section information comprises at least one obtained section information;
- receiving, via a user input unit, a selection of at least one specific section information of the at least one obtained section information;
- receiving, via the user input unit, a prescribed input during playing of at least one input request section of one of the at least one video, the prescribed input corresponding to a selection of either a match or a mismatch based on whether the prescribed input matches a previously designated reference value;
- sequentially combining, via the controller, metadata of each of at least one specific metadata corresponding to each of the selected at least one specific section information;
- setting, via the controller, a metadata for each of the at least one input request section as the match or the mismatch based on whether the prescribed input matches the previously designated reference value;
- displaying, on the display unit, a match indicator or a mismatch indicator on a prescribed region of a screen of the display unit; and
- generating, via the controller in response to a selection of either the match indicator or the mismatch indicator, a video comprising more than one specific partial section of the at least one partial section having the at least one specific metadata set thereon as the match or mismatch;

wherein the at least one partial section corresponds to an object in a corresponding video of the at least one video having the metadata set thereon, a still image in the corresponding video having the metadata set thereon, or a portion of the corresponding video having the metadata set thereon, and wherein the method further comprises:
- selecting, via the controller, a section information of the corresponding input request section as specific section information if the prescribed input corresponds to a selection of the match; and
- selecting, via the controller, a section information of the corresponding input request section as specific section information if the prescribed input corresponds to a selection of the mismatch.

17. The method of claim 16, further comprising:
- receiving an input, via the user input unit, for setting a search condition for the metadata; and
- searching, via the controller, for metadata matching the search condition.

18. The method of claim 16, further comprising:
- receiving, via the user input unit, a selection of at least one specific section information of the obtained section information; and
- generating a video, via the controller, comprising more than one specific partial section of the at least one partial section having at least one specific metadata set thereon by sequentially combining metadata of each of the at least one specific metadata corresponding to each of the selected at least one specific section information.

* * * * *